United States Patent
Haruki et al.

(10) Patent No.: US 9,116,741 B2
(45) Date of Patent: Aug. 25, 2015

(54) COMPUTER PROGRAM PRODUCT, AND INFORMATION PROCESSING APPARATUS AND METHOD

(75) Inventors: Hiroyoshi Haruki, Kanagawa (JP); Mikio Hashimoto, Kanagawa (JP); Fukutomo Nakanishi, Tokyo (JP); Ryotaro Hayashi, Kanagawa (JP); Yurie Fujimatsu, Kanagawa (JP); Tomohide Jokan, Kanagawa (JP); Takeshi Kawabata, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 495 days.

(21) Appl. No.: 13/585,941

(22) Filed: Aug. 15, 2012

(65) Prior Publication Data
US 2013/0219408 A1 Aug. 22, 2013

Related U.S. Application Data

(63) Continuation of application No. PCT/JP2010/052465, filed on Feb. 18, 2010.

(51) Int. Cl.
*H04L 9/00* (2006.01)
*G06F 11/00* (2006.01)
(Continued)

(52) U.S. Cl.
CPC ............. *G06F 9/461* (2013.01); *G06F 21/52* (2013.01)

(58) Field of Classification Search
CPC .............. G06Q 20/35765; G06Q 20/3674; G06F 3/062; G06F 3/0622; G06F 3/0637; G06F 21/121; G06F 9/461; G06F 21/52
USPC ........ 726/26, 27, 30; 711/100, 111, 147, 152, 711/163; 713/189, 193
See application file for complete search history.

(56) References Cited

U.S. PATENT DOCUMENTS 5,473,690 A * 12/1995 Grimonprez et al. ............ 705/66
6,003,113 A * 12/1999 Hoshino ........................ 711/106
(Continued)

FOREIGN PATENT DOCUMENTS

| JP | 63-132334 A | 6/1988 |
| JP | 2002-41168 A | 2/2002 |

(Continued)

OTHER PUBLICATIONS

International Search Report mailed on Oct. 19, 2010, issued for International Application No. PCT/JP2010/052465, filed Feb. 18, 2010 (with English translation).
(Continued)

*Primary Examiner* — Hosuk Song
(74) *Attorney, Agent, or Firm* — Oblon, McClelland, Maier & Neustadt, L.L.P.

(57) ABSTRACT

According to an embodiment, a computer program product includes a computer-readable medium including program, when executed by a computer, to have a plurality of modules run by the computer. The computer includes a memory having a shared area, which is an area accessible to only those modules which run cooperatively and storing therein execution module identifiers. Each of the modules includes a first operation configured to store, just prior to a switchover of operations to an other module that runs cooperatively, an identifier of the other module as the execution module identifier in the shared area; and a second operation configured to execute, when the execution module identifier stored in the shared area matches with an identifier of own module immediately after a switchover of operations from the other module, a function inside the own module.

20 Claims, 40 Drawing Sheets

(51) Int. Cl.
*G06F 9/46* (2006.01)
*G06F 21/52* (2013.01)

(56) References Cited

U.S. PATENT DOCUMENTS

| | | | |
|---|---|---|---|
| 6,983,460 B1* | 1/2006 | Goire et al. | 717/175 |
| 7,155,743 B2 | 12/2006 | Goodman et al. | |
| 7,270,193 B2 | 9/2007 | Hashimoto et al. | |
| 7,299,363 B2 | 11/2007 | Yamaguchi et al. | |
| 7,603,566 B2 | 10/2009 | Hashimoto et al. | |
| 7,657,760 B2 | 2/2010 | Teramoto et al. | |
| 7,721,114 B2 | 5/2010 | Yamaguchi et al. | |
| 8,335,921 B2* | 12/2012 | von Behren et al. | 713/164 |
| 8,789,195 B2* | 7/2014 | Bianco et al. | 726/26 |
| 2003/0126458 A1 | 7/2003 | Teramoto et al. | |
| 2005/0144438 A1 | 6/2005 | Hashimoto et al. | |
| 2007/0136728 A1 | 6/2007 | Saito | |
| 2007/0169068 A1 | 7/2007 | Kanazawa et al. | |

FOREIGN PATENT DOCUMENTS

| | | |
|---|---|---|
| JP | 2005-166051 A | 6/2005 |
| JP | 2005-196257 A | 7/2005 |
| JP | 4115759 B2 | 4/2006 |
| JP | 2007-148962 A | 6/2007 |
| JP | 2007-164595 A | 6/2007 |
| JP | 4226816 B2 | 12/2008 |
| JP | 4282472 B2 | 3/2009 |

OTHER PUBLICATIONS

International Written Opinion mailed on Oct. 19, 2010, issued for International Application No. PCT/JP2010/052465, filed Feb. 16, 2010.

Lie, David et al. "Architectural Support for Copy and Tamper Resistant Software." Proceedings of ASPLOS 2000. Computer Systems Laboratory, Stanford University, Stanford, CA, 94305 pp. 1-10.

* cited by examiner

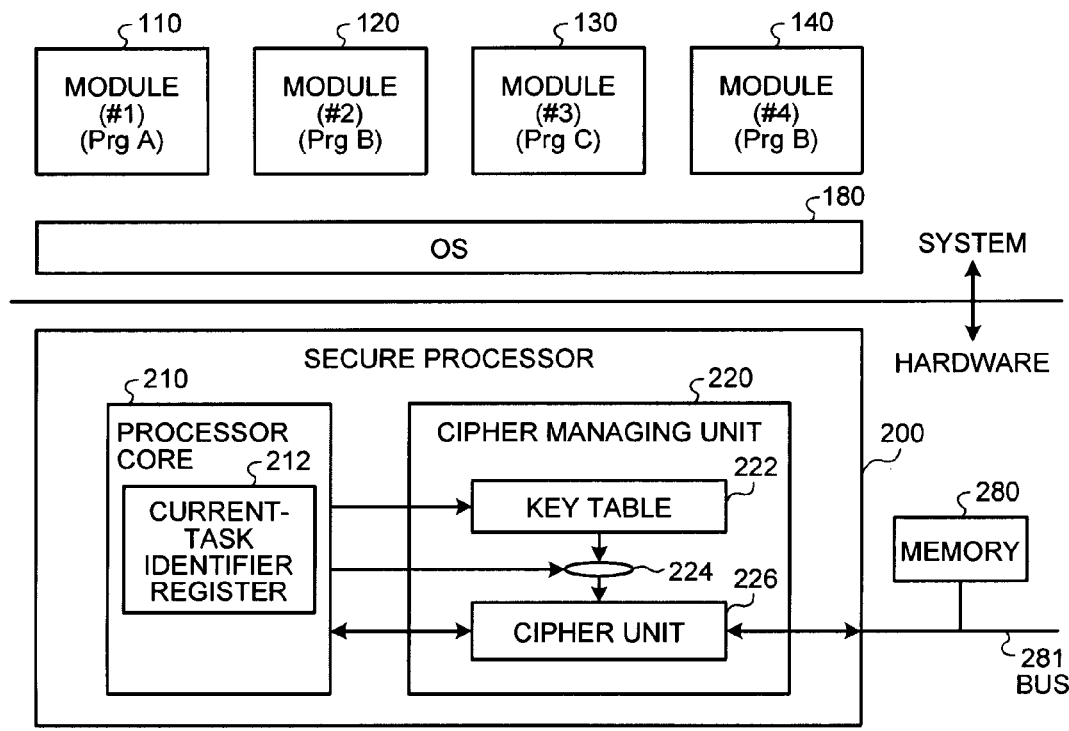

| Idx | MODULE SHARED KEY | EXECUTION MODULE IDENTIFIER | SWITCHOVER SOURCE MODULE IDENTIFIER FIELD | SWITCH-OVER FLAG | SWITCHOVER PARAMETER | V |
|---|---|---|---|---|---|---|
| #1 | | | | | | |
| #2 | | | | | | |
| #3 | | | | | | |
| ... | | | | | | |
| #n | | | | | | |

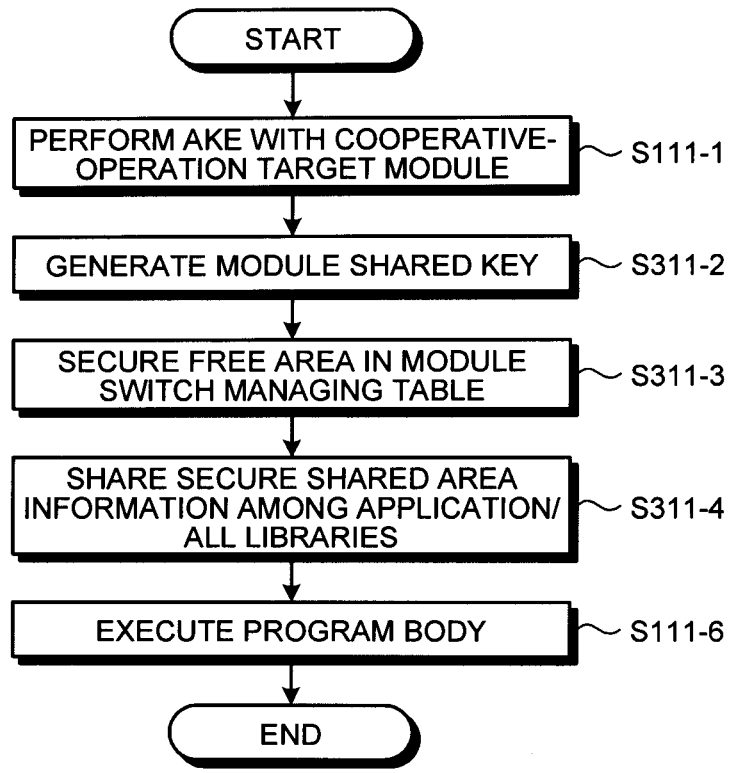
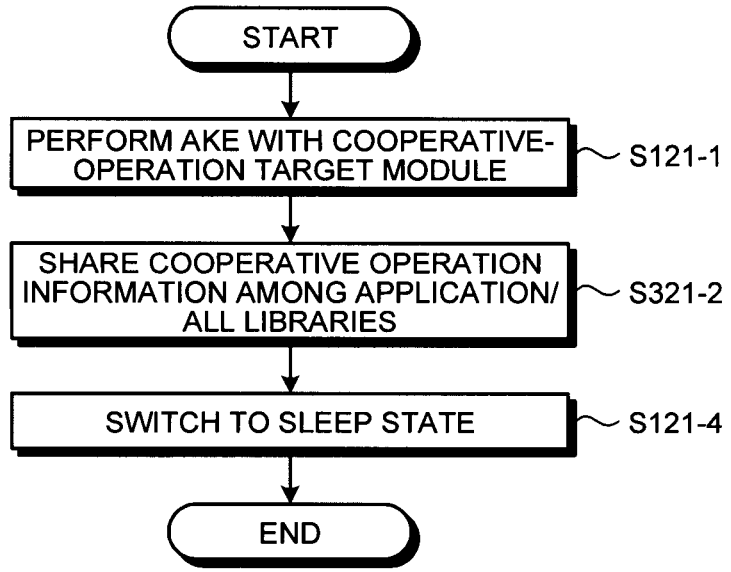

FIG.38

| MODULE IDENTIFIER | CONTEXT NUMBER | CONTEXT INFORMATION (PC, SP, ETC.) |
|---|---|---|
|  |  |  |
|  |  |  |
|  |  |  |
| ... | ... | ... |
|  |  |  |

FIG.46

| CONTEXT NUMBER | CONTEXT INFORMATION (PC, SP, ETC.) |
|---|---|
| #1 | |
| #2 | |
| #3 | |
| ... | ... |
| #n | |

COMPUTER PROGRAM PRODUCT, AND INFORMATION PROCESSING APPARATUS AND METHOD

CROSS-REFERENCE TO RELATED APPLICATION(S)

This application is a continuation of PCT international application Ser. No. PCT/JP2010/052465 filed on Feb. 18, 2010 which designates the United States; the entire contents of which are incorporated herein by reference.

FIELD

The embodiments relate to a technology that prevents execution sequence of a plurality of modules from being changed while the modules are running cooperatively.

BACKGROUND

In an open system, information is disclosed regarding the hardware configuration of a computer or the source code of the operating system (OS) of the computer. That enables a user to change the operating programs so as to create desired programs. Thus, in an open system, there is a possibility that the programs of the OS are changed for the purpose of attacking application programs. Such an attack by a third party is difficult to prevent simply by beefing up the OS for preventing the attack on application programs.

On the other hand, the hardware configuration is difficult to alter by a user. There are proposed secure processors that are configured to prevent an attack on programs, attempted by means of altering the OS. In such secure processors; the programs are encoded in a multitask environment along with the information used in those programs, so as to prevent the programs and the information from leaking to a third party or to prevent the programs from being altered. As a result, the process units generated in the programs can be executed in the correct sequence.

Meanwhile, there are many applications that are configured to include a plurality of modules running cooperatively. In a secure processor, there may be a situation in which each module only trusts a portion of another module. For example, each module is encoded and secured with a different key; each module runs in a different context; and each context is isolated from the OS or from other modules. The data exchanged among modules is not sent to potentially malcious OS or to the modules that are not running cooperatively. In this model, on the one hand, the private data within a particular module is protected by isolating the context thereof from other modules; while on the other hand, a shared area is used to communicate data that is required when modules run cooperatively.

As an application having such a module configuration, it is possible to think of a method of using shared libraries. In the case of using multiprocessing, since each process operates in an independent manner, it becomes necessary to have description about synchronizing the operations among the processes. Meanwhile, in an identical manner of creating a stand-alone application, it is sufficient to write the shared libraries according to the normal calling conventions. Moreover, since the operations are also performed in a sequential manner, there is an advantage that the description does not get difficult.

While using shared libraries in a secure processor, it is necessary to verify whether or not the modules attempting to run cooperatively are appropriate. There is a program for calling shared libraries that verifies the validness of shared libraries by performing authentication key exchange at the time of initializing the shared libraries. Then, at the time of calling a shared library, the program ensures that a particular entry point in that shared library is executed. Meanwhile, there is a technique in which verification of whether or not a caller module and a calling destination module are valid is performed using a key with which those modules are decoded.

Meanwhile, each module holds a context independently, and the execution control is managed by the OS. Hence, any module can start running due to the execution control of the OS. At that time, even a module that is waiting for being called from another module may start running. In this way, even if a particular module is waiting for being called from another module, that particular module starts running due to the execution control of the OS.

According to the techniques described above, although it is possible to verify the validness of a calling destination module, it cannot be determined whether or not the timing is right for the module that has been called to start running. Thus, when a plurality of modules run cooperatively, it becomes possible to change the execution sequence of those modules. That makes it difficult to ensure sequential running of modules in a fixed order such as in the case of shared libraries.

There is need to provide a program that can more reliably prevent changes from being made in the execution sequence by a third party.

BRIEF DESCRIPTION OF DRAWINGS

FIG. 1 is a diagram illustrating a configuration of a system that can be implemented in a first embodiment;

FIG. 2 is a diagram illustrating an exemplary data configuration of a key table;

FIG. 23 is a flowchart for explaining an initialization operation performed by the application module;

FIG. 24 is a flowchart for explaining an initialization operation performed by a library module;

FIG. 38 is a diagram illustrating a data configuration of a context managing table;

FIG. 46 is a diagram illustrating an exemplary data configuration of a context managing table;

DETAILED DESCRIPTION

Figure 3:
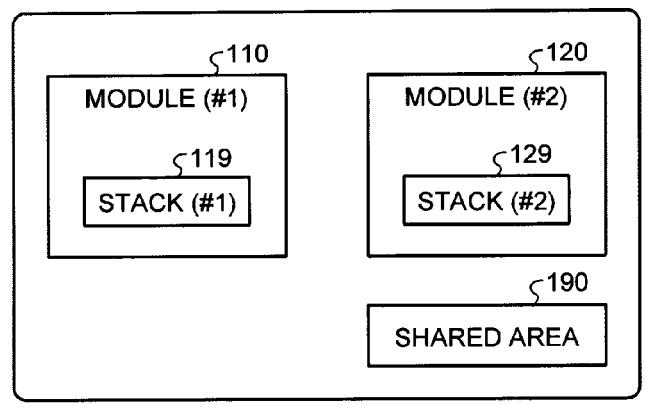
FIG. 3 is a diagram illustrating that a plurality of modules is running in a secure processor.

In an embodiment, a computer program product includes a computer-readable medium including program, when executed by a computer, to have a plurality of modules run by the computer. The computer includes a memory having a shared area, which is an area accessible to only those modules which run cooperatively and storing therein execution module identifiers which serve as identifiers of modules running in an operation system (OS) from among the modules. Each of the modules (a first module) includes a first operation configured to store, just prior to a switchover of operations to an other module (a second module) that runs cooperatively, an identifier of the other module as the execution module identifier in the shared area; and a second operation configured to execute, when the execution module identifier stored in the shared area matches with an identifier of own module immediately after a switchover of operations from the other module, a function inside the own module.

First Embodiment

A first embodiment is explained below with reference to the accompanying drawings. Firstly, the explanation is given for an exemplary system that can be implemented in the first embodiment. FIG. 1 is a schematic diagram of an exemplary configuration of a system that can be implemented in the first embodiment. In FIG. 1, an overall hardware configuration and a system view are illustrated at the same time.

From the hardware perspective, a target system includes a secure processor 200 and a memory 280 that are connected by a bus 281. The secure processor 200 includes a processor core 210 and an cipher managing unit 220. The processor core 210 represents the key component of the secure processor 200 and controls the execution of various programs. The processor core 210 includes a current-task identifier register 212 that is used to store task identifiers of the modules being currently executed in the processor core 210 (thus, referred to as current task identifiers). The cipher managing unit 220 includes a key table 222, a selector 224, and an cipher unit 226. The cipher managing unit 220 operates in synchronization with an access to the outside by the secure processor 200. Under the control of the processor core 210, the selector 224 controls the feeding of values, which are stored in the key table 222, to the cipher unit 226.

In the target system, a stand-alone OS (operating system) 180 runs in the processor core 210 of the secure processor 200, and one or more modules run in the OS 180. In the example illustrated in FIG. 1, a plurality of modules, namely, a module (#1) 110, a module (#2) 120, a module (#3) 130, and a module (#4) 140 are running. Each module running in the OS 180 has a program from which that module is generated. Moreover, each module has a task identifier as the value for uniquely identifying that module in the processor core 210 of the secure processor 200.

In the example illustrated in FIG. 1, it is indicated that the module (#1) 110 has a task identifier "#1" and is generated from a program A (Prg A). The module (#2) 120 has a task identifier "#2" and is generated from a program B (Prg B). The module (#3) 130 has a task identifier "#3" and is generated from a program C (Prg C). The module (#4) 140 has a task identifier "#4" and is generated from the program D (Prg D). As is the case of the module (#2) and the module (#4), a plurality of modules can be generated from a single program, and a plurality of modules having the same origin may have different task identifiers.

FIG. 2 illustrates an exemplary data configuration of the key table 222. In the key table 222, with the task identifiers serving as indices, n number of entries having indices (ID) from "#1" to "#n" are written. Each entry contains a key value field, a start address field, and an end address field. The key value field is used to store a key that is required at the time of encrypting or decrypting performed by the cipher unit 226. The start address field and the end address field are used to store the start address in the memory 280 and the end address in the memory 280, respectively, of the data that is to be encrypting or decrypting with the key stored in the key value field.

The access to the key table 222 by the module (#1) 110 isto the module (#4) 140 is controlled in such a way that each module is able to access the entry corresponding only to the task identifier of itself but is not able to access the entries corresponding to the task identifiers of other modules. For example, the control is performed in such a way that the module (#1) 110 is able to access only the ID "#1" in the key table 222, but cannot access the other IDs "#2" to "#n".

Consider a case of writing a start address P, an end address Q, and a key value K when a particular module (#m) is running in the processor core 210. In this case, the secure processor 200 refers to the current-task identifier register 212 in the processor core 210 and identifies the task identifier of the module (#m) that is running in the processor core 210. Then, with respect to an entry #m corresponding to the identified task identifier in the key table 222, the secure processor 200 writes the key value K, the start address P, and the end address Q.

Given below is the explanation of a method by which the module (#m) accesses data in the memory 280. The following explanation is given for an example in which, of the entries in the key table 222, a start address P, an end address Q, and a key K are already registered for the ID "#m", and the module (#m) accesses data stored at an address X in the memory 280.

At the time when the module (#m) accesses the data stored at the address X in the memory 280, the secure processor 200 obtains data $D_1$ corresponding to the address X from the memory 280. Then, from the key table 222, the cipher managing unit 220 obtains the key value corresponding to the task identifier (#m) that is retrieved from the current-task identifier register 212. If the address X to be read is located in between the start address P and the end address Q specified in the key table 222; the cipher managing unit 220 sends, to the processor core 210, a value that is obtained by decrypting the data $D_1$ using the cipher unit 226. On the other hand, if the address X to be read is not located in between the start address P and the end address Q, the cipher managing unit 220 sends the data $D_1$ back to the processor core 210.

In an identical manner, at the time when the module (#m) writes data $D_2$ in the memory 280, if an address Y to be read is located in between the start address P and the end address Q; the secure processor 200 writes, in the memory 280, the data obtained by encrypting the data $D_2$ using the key value K. On the other hand, if the address Y to be read is not located in between the start address P and the end address Q, the secure processor 200 writes the data $D_2$ in the memory 280.

Herein, the explanation is given about the outline of a module configuration when a plurality of modules runs cooperatively in the secure processor 200. Of the plurality of modules running cooperatively in the secure processor 200, each module is configured to only trust a portion of other modules. Each module is protected by means of encrypting with a different key, and runs in a different context. That is, the context of each module is isolated from the OS or other modules, and the data exchanged among modules is not sent to potentially malicious OS or to the modules not operating cooperatively.

FIG. 3 illustrates on a conceptual basis an exemplary module configuration when a plurality of modules runs cooperatively in the secure processor 200. In the example illustrated in FIG. 3, the module (#1) 110 and the module (#2) 120 hold separate contexts, namely, a stack (#1) 119 and a stack (#2) 129, respectively, in such way that the contexts cannot be viewed directly from other modules.

A shared area 190 is provided to enable communication of data between the module (#1) 110 and the module (#2) 120. That is, in the case of running a plurality of modules in the secure processor 200, the context of each module is isolated from other modules so that the private data in each module is protected, and the data among the modules running cooperatively is communicated using the shared area 190.

Figure 4:
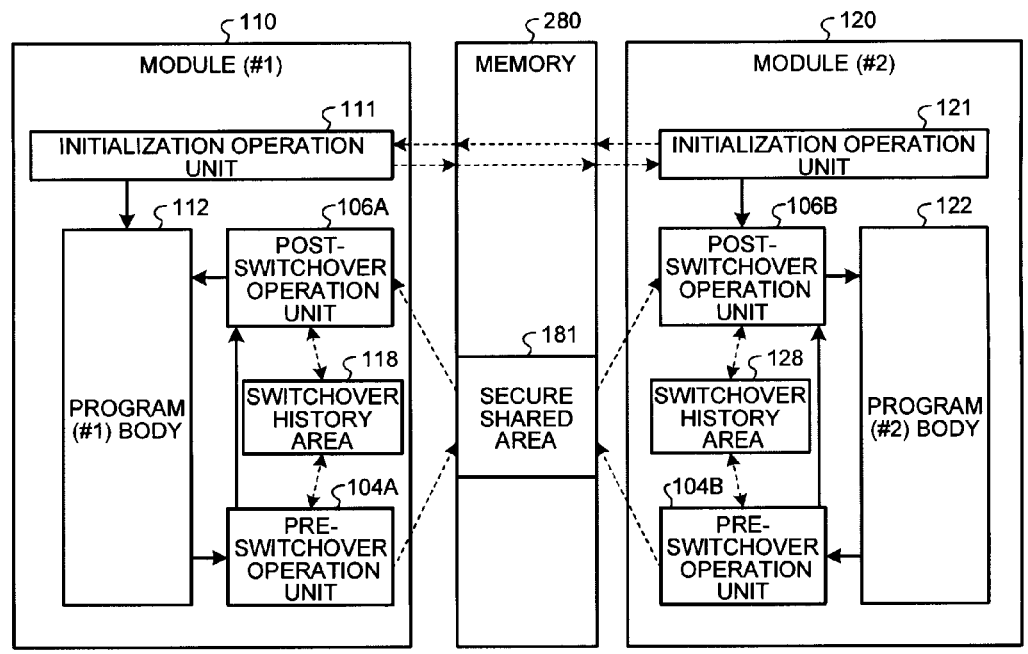
FIG. 4 is a functional block diagram of a module configuration according to the first embodiment.

FIG. 4 is a functional block diagram of an exemplary module configuration according to the first embodiment. With respect to the configuration illustrated in FIG. 4, the secure processor 200 that is explained with reference to FIG. 1 is implemented in common. However, in FIG. 4, the secure processor 200 is not illustrated.

In FIG. 4, it is illustrated that the module (#1) 110 as well as the module (#2) 120 includes a module switch mechanism according to the first embodiment. Herein, it is assumed that the module (#1) 110 is an application module and the module (#2) 120 is a library module. The module (#1) 110 and the module (#2) 120 run cooperatively. Meanwhile, an application module points to a module that executes the program body after the initialization operation; and a library module points to a module that waits for being called from another module after the initialization operation.

The module (#1) 110 includes an initialization operation unit 111, a program (#1) body 112, a pre-switchover operation unit 104A, a post-switchover operation unit 106A, and a switchover history area 118. In an identical manner, the module (#2) 120 includes an initialization operation unit 121, a program (#2) body 122, and a switchover history area 128; as well as includes a pre-switchover operation unit 104B and a post-switchover operation unit 106B that respectively perform the same operations as the pre-switchover operation unit 104A and the post-switchover operation unit 106A. Moreover, a secure shared area 181 in the memory 280 is shared between the module (#1) 110 and the module (#2) 120 that run cooperatively. The secure shared area 181 is a part of the shared area 190 that is shared between the module (#1) 110 and the module (#2) 120.

The initialization operation units 111 and 121 perform operations to build the secure shared area 181 that is used by the pre-switchover operation units 104A and 104B and by the post-switchover operation units 106A and 106B. The pre-switchover operation units 104A and 104B perform operations just prior to a switchover to another module.

The post-switchover operation units 106A and 106B perform operations immediately after a switchover to another module. The switchover history area 118 represents the area that is used to store the information required by the pre-switchover operation unit 104A and the post-switchover operation unit 106A for returning due to a switchover. In an identical manner, the switchover history area 128 represents the area that is used to store the information required by the pre-switchover operation unit 104B and the post-switchover operation unit 106B for returning due to a switchover.

The secure shared area 181 represents the area that is used to store the information to be shared only among the module (#1) 110 and the module (#2) 120 that run cooperatively. The secure shared area 181 is configured in such a way that no module other than the modules running cooperatively can perform normal reading and writing with respect to the secure shared area 181.

Figure 5:
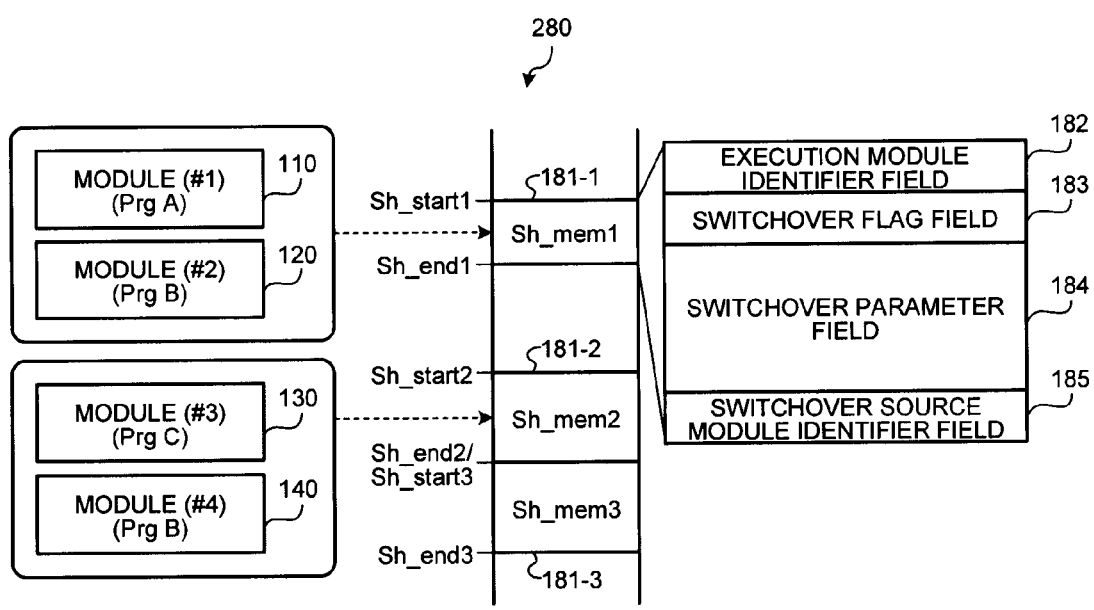
FIG. 5 is a diagram illustrating a memory map of a memory that has a secure shared area built therein.

FIG. 5 illustrates an exemplary memory map of the memory 280 that is used for the module switch mechanism according to the first embodiment and that has the secure shared area 181 built therein. For each set of modules running cooperatively, the secure shared area 181 is built and shared.

In the example illustrated in FIG. 5, the module (#1) 110 and the module (#2) 120 running cooperatively share a secure shared area 181-1 (Sh_mem1); while the module (#3) 130 and the module (#4) 140 running cooperatively share a secure shared area 181-2 (Sh_mem2). The secure shared area 181-1 has the range starting from a start address Sh_start1 to an end address Sh_end1 in the memory 280. Similarly, the secure shared area 181-2 has the range starting from a start address Sh_start2 to an end address Sh_end2 in the memory 280.

Each secure shared area 181-1, 181-2, . . . contains an execution module identifier field 182 for storing an execution module identifier, contains a switchover flag field 183 for storing a switchover flag, contains a switchover parameter field 184 for storing a switchover parameter, and contains a switchover source module identifier field 185 for storing a switchover source module identifier. An execution module identifier points to the module identifier of a module that runs in the OS. A switchover source module identifier points to the module identifier of a module that was running in the OS before being switched to a module identified by the execution module identifier. Meanwhile, module identifiers are values that enable the modules running cooperatively to uniquely identify each other.

As the module identifiers, it is possible to use the task identifiers used in the secure processor 200. However, that is not the only possible case. Alternatively, as the module identifiers, it is also possible to use values that enable the modules running cooperatively to uniquely identify each other. A switchover flag points to a value that indicates whether a module switch has occurred due to calling of a module or due to returning to the caller module. Regarding switchover parameters, in the case of calling a module, switchover parameters indicate the function name and the parameter of the calling destination; and, in the case of returning to a module, switchover parameters indicate the execution result.

Explained below is an example of the operations performed by each module using a module switch function according to the first embodiment. Herein, it is assumed that the task identifiers are considered as the module identifiers. Moreover, it is assumed that the module (#1) 110 is an application module having a module identifier "#1" and being generated from the program A; while the module (#2) 120 is a library module having a module identifier "#2" and being generated from the program B.

The following explanation is given for an example in which the module (#1) 110 and the module (#2) 120 run cooperatively; the module (#2) 120 is called from the module (#1) 110; and the module (#2) 120 is later switched back to the module (#1) 110.

Figure 6:
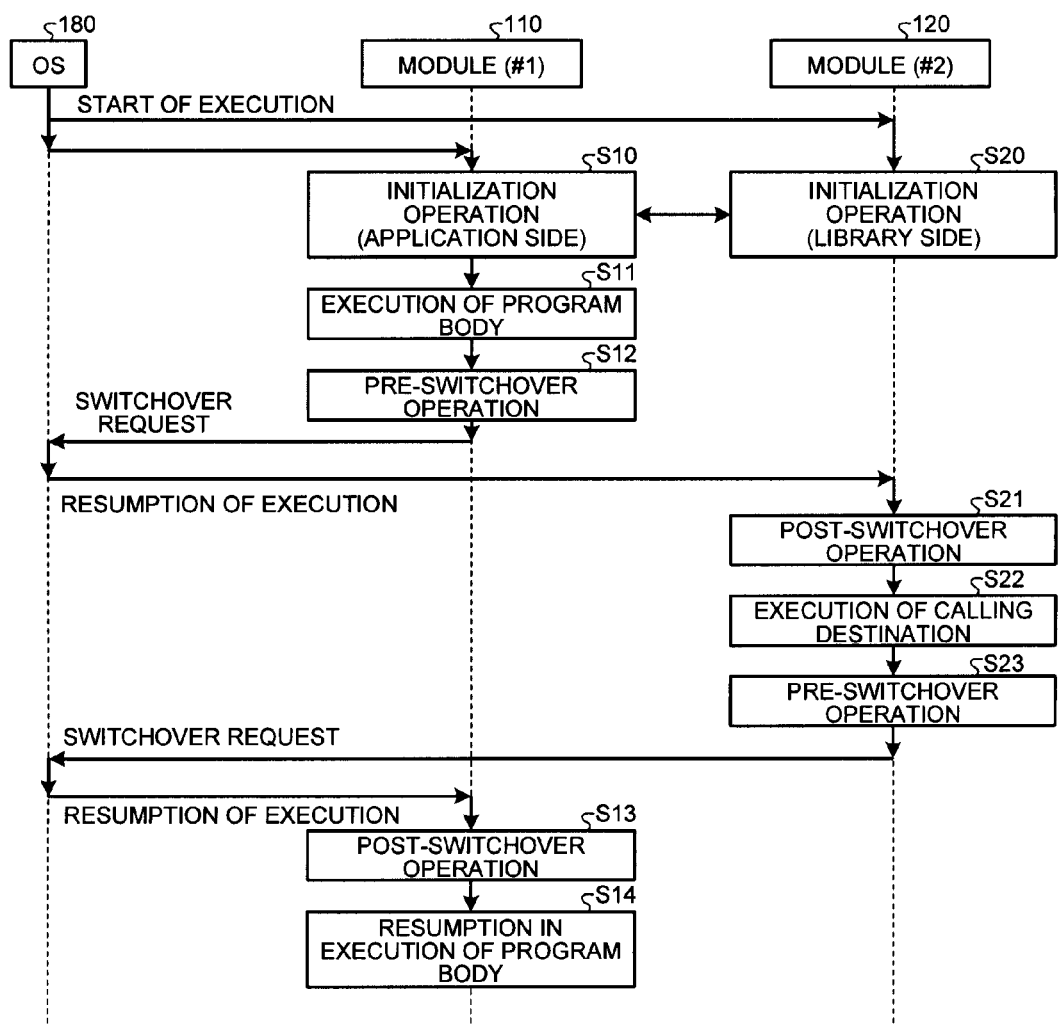
FIG. 6 is a diagram illustrating the overall sequence of operations performed to switch over among modules.

FIG. 6 illustrates the overall sequence of operations performed to switch over among the module (#1) 110 and the module (#2) 120. The OS 180 starts running the module (#1) 110 and the module (#2) 120. Then, in the module (#1) 110 functioning as the application module, the initialization operation unit 111 performs an initialization operation (Step S10). Similarly, in the module (#2) 120 functioning as the library module, the initialization operation unit 121 performs an initialization operation (Step S20).

Once the initialization operations are completed, the module (#2) 120 goes into a sleep state and waits for being called. In the module (#1) 110, the program (#1) body 112 is executed (Step S11).

In the program (#1) body 112 of the module (#1) 110; at the time of calling the module (#2) 120, the pre-switchover operation unit 104A performs a pre-switchover operation with respect to the module (#1) 110 (Step S12). Then, a switchover request is issued to the OS 180 from the module (#1) 110. Upon receiving the switchover request, the OS 180 calls the module (#2) 120 and starts running it again. Thus, the OS 180 makes the module (#2) 120 resume from the sleep state. On the other hand, the module (#1) 110 goes into the sleep state and waits for being called.

Once the module (#2) 120 is run again by the OS 180 to resume from the sleep state, the post-switchover operation unit 106B performs a post-switchover operation (Step S21). Then, in the module (#2) 120, the calling destination, that is, the program (#2) body 122 is executed at Step S22.

In the program (#2) body 122 of the module (#2) 120; at the time of calling the module (#1) 110, the pre-switchover operation unit 104B performs a pre-switchover operation with respect to the module (#2) 120 (Step S23). Then, a switchover request is issued to the OS 180 from the module (#2) 120. Upon receiving the switchover request, the OS 180 calls the module (#1) 110 and starts running it. Thus, the OS 180 makes the module (#1) 110 resume from the sleep state.

Once the module (#1) 110 resume from the sleep state by being called by the OS 180, the post-switchover operation unit 106A performs a post-switchover operation (Step S13). Then, in the module (#1) 110, the program (#1) body 112 is executed (Step S14).

In this way, in the first embodiment, for example, in the module (#1) 110, after the initialization operation unit 111 performs an initialization operation, the execution of the program (#1) body 112 starts. Moreover, in the module (#1) 110, at the time of calling another module, the pre-switchover operation unit 104A performs a pre-switchover operation. Furthermore, when the module (#1) 110 is called by another module, the post-switchover operation unit 106A performs a post-switchover operation, followed by the execution of the program (#1) body 112.

Given below is the detailed explanation regarding the operations illustrated in FIG. 6.

Figure 7:
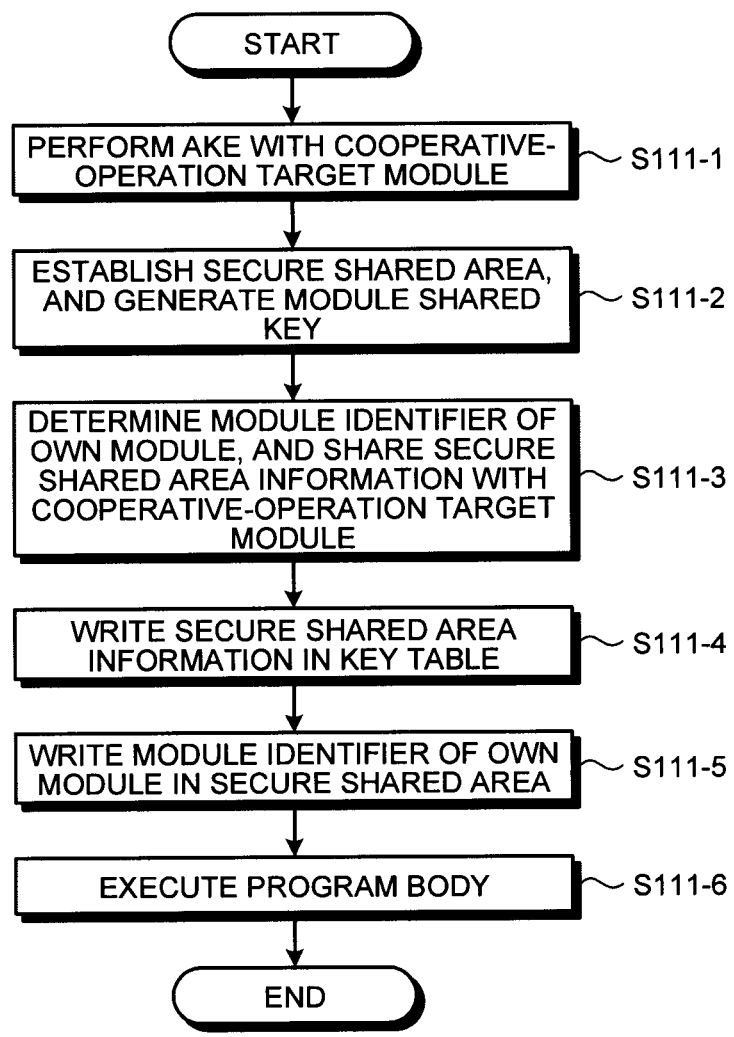
FIG. 7 is a flowchart for explaining an initialization operation performed by an application module.
Figure 8:
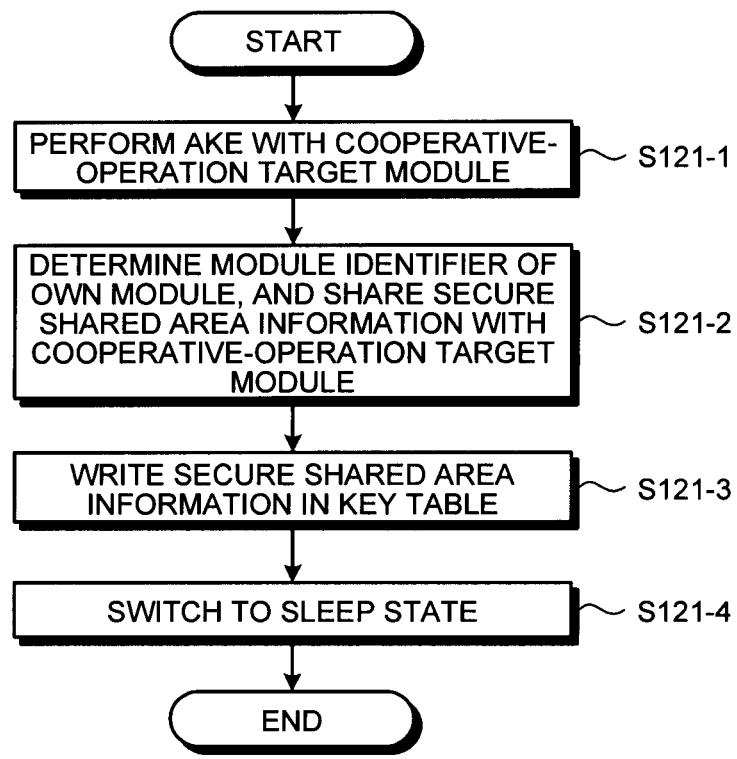
FIG. 8 is a flowchart for explaining an initialization operation performed by a library module.

Firstly, the explanation is given for the initialization operation of modules. When the execution of the module (#1) 110 and the module (#2) 120 is started by the OS 180, the initialization operation is performed by each of those modules so as to enable the modules to run cooperatively. FIG. 7 is a flowchart for explaining an example of the initialization operation performed by the application module. FIG. 8 is a flowchart for explaining an example of the initialization operation performed by the library module. The operations performed in the application module as illustrated in FIG. 7 are performed cooperatively with the operations performed in the library module as illustrated in FIG. 8. The following explanation is given with the focus on the flowchart illustrated in FIG. 7, and the explanation with reference to the flowchart illustrated in FIG. 8 is given when necessary.

Once the execution by the OS 180 starts, at Step S111-1 illustrated in FIG. 7 and at Step S121-1 illustrated in FIG. 8, AKE (Authentication and Key Exchange) is performed among the module (#1) 110 and the module (#2) 120 attempting to run cooperatively. As a result of AKE, the module (#1) 110 and the module (#2) 120 verify the validness of each other as well as share a temporary key Key_AB. In this way, by performing AKE, the modules running cooperatively share such a key that can be known only to the appropriate cooperative-operation target programs but cannot be known to other modules.

Then, at Step S111-2, the module (#1) 110 secures an area that is to be used as the secure shared area 181 in the memory 280, and generates a module shared key Key_shared. The module shared key is shared among the modules running cooperatively and is used in encrypting the secure shared area 181. As long as the module shared key has a value that cannot be known to a module that is not running cooperatively, it serves the purpose. That value of the module shared key can be determined by the application module (in this example, the module (#1) 110) or can be generated from random numbers.

Subsequently, at Step S111-3 and at Step S121-2 that is illustrated in FIG. 8, the module (#1) 110 and the module (#2) 120 exchange secure shared area information that is used in establishing, as the secure shared area 181-1, the area secured in the memory 280 by the module (#1) 110 at Step S111-2. More particularly, firstly, the module (#1) 110 encodes the secure shared area information as well as encodes the module task identifier of itself with the temporary key Key_AB, and sends the encoded data to the module (#2) 120 via the memory 280.

Herein, the secure shared area information contains the start address, the end address, and the module shared key of the area secured in the memory 280 by the module (#1) 110 at Step S111-2. In this example, to the module (#2) 120, the module (#1) 110 sends, as the secure shared area information, the start address Sh_start1, the end address Sh_end1, and the module shared key Key_shared of the area secured in the memory 280 at Step S111-2. Along with that, the module (#1) 110 sends the module identifier of itself (in the example, the task identifier "#1") to the module (#2) 120.

The module (#2) 120 uses the temporary key Key_AB to decode the data received from the module (#1) 110, and obtains the secure shared area information (the start address Sh_start1, the end address Sh_end1, and the module shared key Key_shared) as well as obtains the module identifier of the module (#1) 110.

Besides, the module (#2) 120 refers to the task identifier of itself and sets the module identifier of itself to "#2", and then encodes that module identifier with the temporary key Key_AB. Then, the module (#2) 120 sends the data of the encoded module identifier to the module (#1) 110 via the memory 280. The module (#1) 110 can use the temporary key Key_AB to decode the data received from the module (#2) 120 and can obtain the module identifier of the module (#2) 120 (in this case, the task identifier "#2").

As a result of the operations performed at Step S111-3 illustrated in FIG. 7 and at Step S121-2 illustrated in FIG. 8, a specific memory area as well as a key for encrypting that specific memory area can be shared among the modules running cooperatively, and module identifiers can be determined. Each module identifier is a value that enables unique identification of a module from among the modules running cooperatively.

Then, at Step S111-4, the module (#1) 110 refers to the secure shared area information and performs encrypting settings with respect to the secure shared area 181-1. In parallel to that, at Step S121-3 illustrated in FIG. 8, the module (#2) 120 refers to the secure shared area information and performs encrypting settings with respect to the secure shared area 181-1. More particularly, with respect to the secure processor 200, the module (#1) 110 and the module (#2) 120 perform encrypting settings by providing the start address Sh_start1, the end address Sh_end1, and the module shared key Key_shared of the secure shared area information.

Once encrypting settings in the secure processor 200 is performed by the module (#1) 110 as well as by the module (#2) 120, the secure processor 200 refers to the key table 222 and writes the start address, the end address, and the key value in the entry corresponding to the current task identifier.

More particularly, as a result of the encrypting settings performed by the module (#1) 110, the secure processor 200 writes the start address Sh_start1, the end address Sh_end1, and the module shared key Key_shared with respect to the index "#1" corresponding to the module (#1) 110 in the key table 222. In an identical manner, as a result of the encrypting settings performed by the module (#2) 120, the secure processor 200 writes the start address Sh_start1, the end address Sh_end1, and the module shared key Key_shared with respect to the index "#2" corresponding to the module (#1) 110 in the key table 222.

With such settings, when the module (#1) 110 or the module (#2) 120 writes a value in the area Sh_mem1 in the memory 280, the secure processor 200 writes a value that is encoded with the key Key_shared in the secure shared area 181. Moreover, when the module (#1) 110 or the module (#2) 120 reads a value from the area Sh_mem1 in the memory 280, the secure processor 200 sends, to the processor core 210, the value obtained by decrypting the data that is read from the area Sh_mem1 with the key Key_shared.

Upon completing the writing of the secure shared area information in the key table 222, in order to wait for being called from the module (#1) 110, the module (#2) 120 stops performing operations just prior to the operations at calling destination (described later) and goes into the sleep state (Step S121-4 illustrated in FIG. 8).

On the other hand, upon completing the writing of the secure shared area information in the key table 222 at Step S111-4, the module (#1) 110 writes the module identifier of itself (in this case, the task identifier "#1") as the execution module identifier in the execution module identifier field 182 of the secure shared area 181-1 at Step S111-5. Then, at Step S111-6, the execution of the program (#1) body 112 starts in the module (#1) 110.

In this way, in the first embodiment, the module (#1) 110 as well as the module (#2) 120 performs encrypting settings with respect to the same area in the memory 280 using the same key. That enables the module (#1) 110 and the module (#2) 120 to read plaintext values from that particular area. However, the other modules that are not running cooperatively with the module (#1) 110 and the module (#2) 120 can read only the encrypted values from that particular area. Thus, the modules running cooperatively (in this case, the module (#1) 110 and the module (#2) 120) can establish a secure shared area in the area Sh_mem in the memory 280 in such a way that the plaintext values in that secure shared area can be accessed only by those modules running cooperatively.

Figure 9:
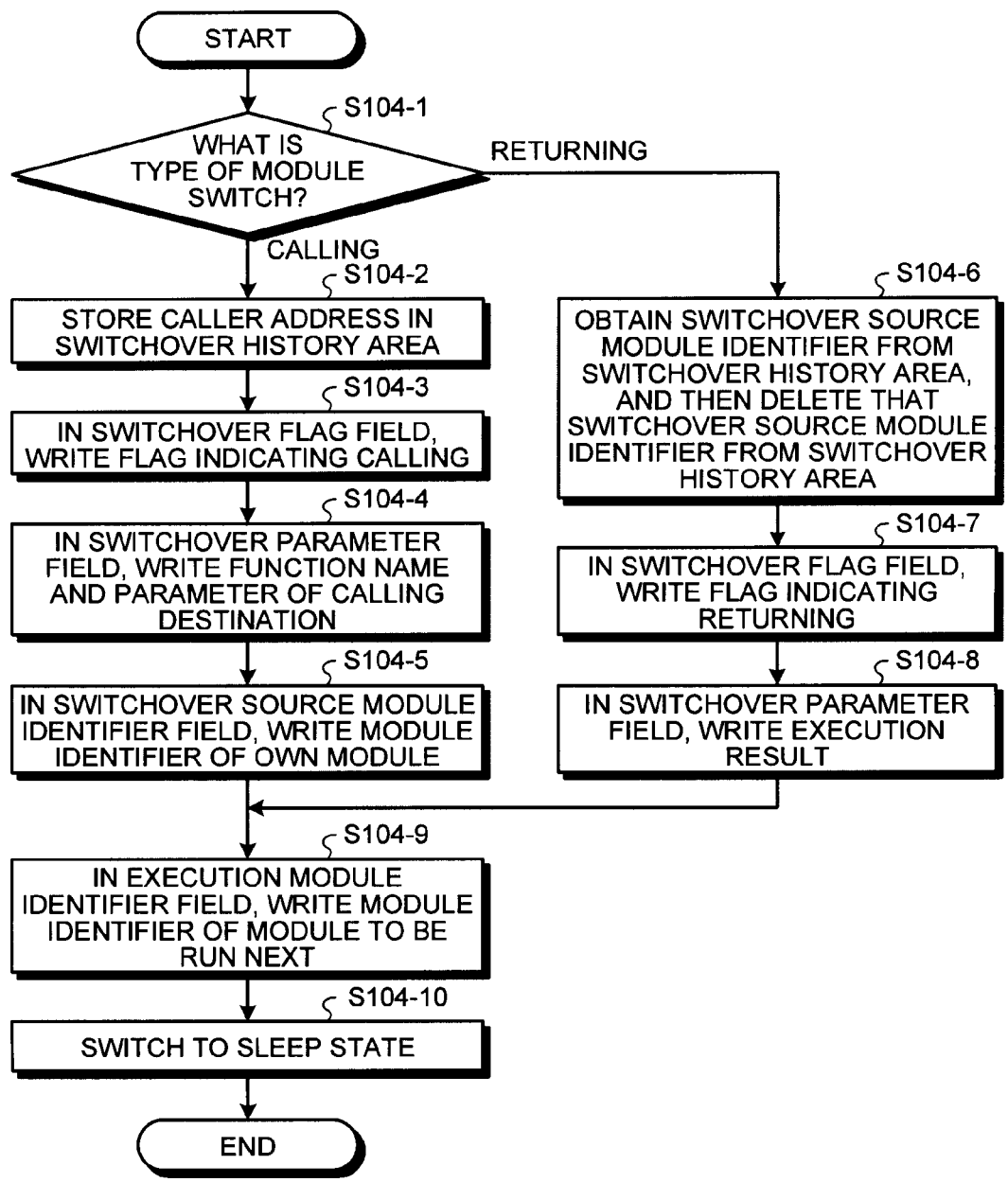
FIG. 9 is a flowchart for explaining a pre-switchover operation.
Figure 10:
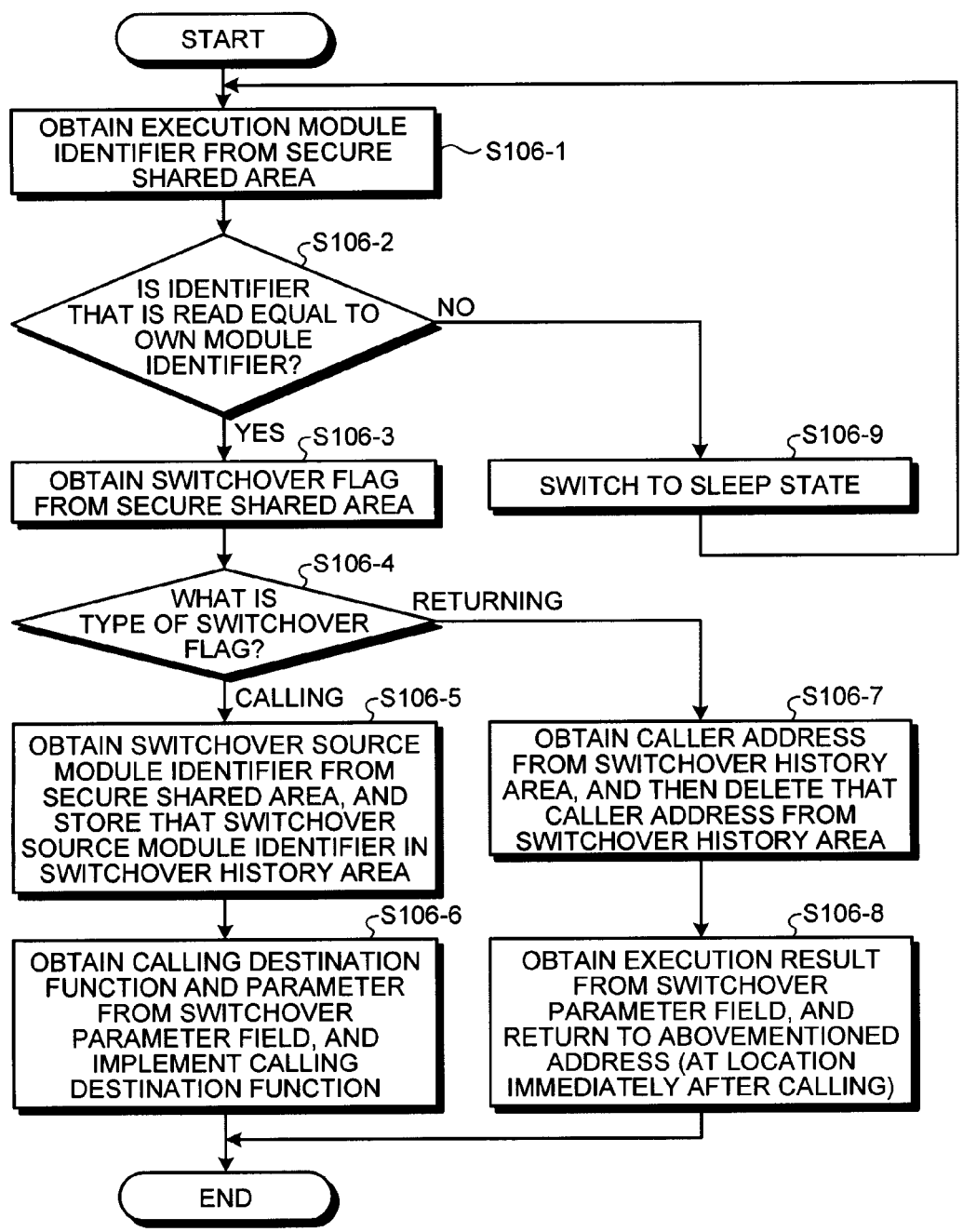
FIG. 10 is a flowchart for explaining a post-switchover operation.
Figure 11:
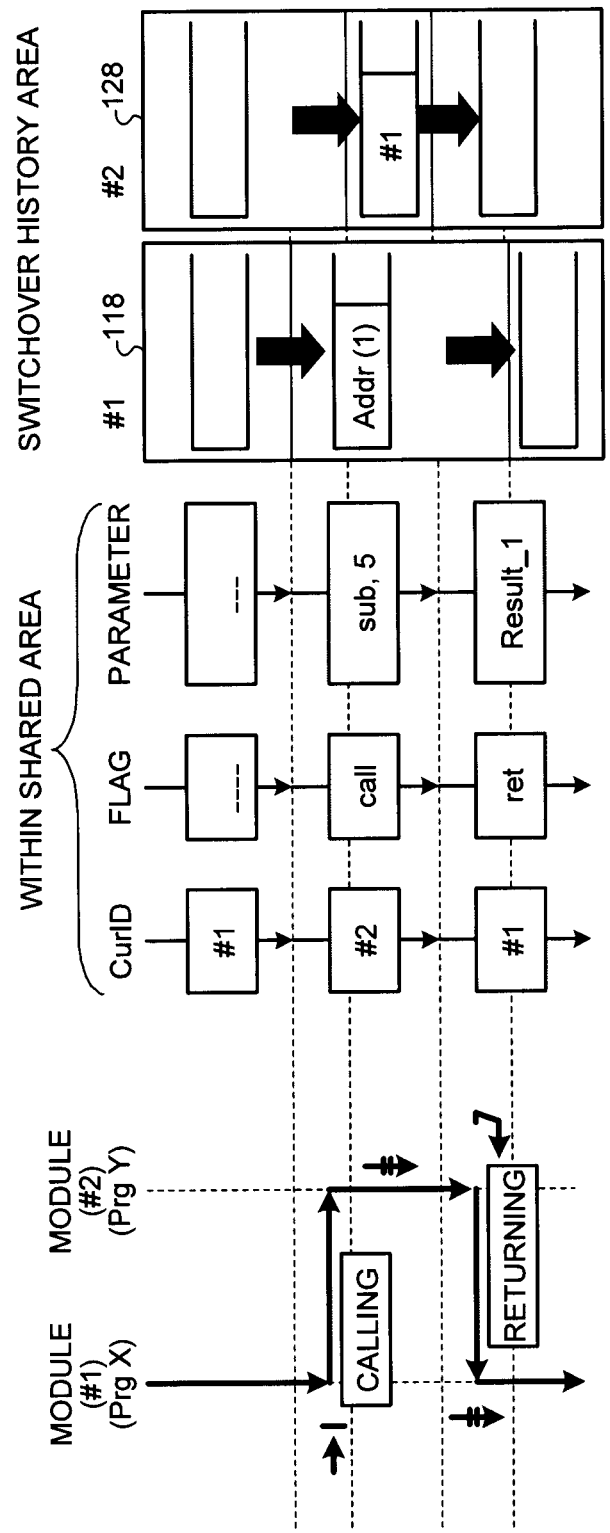
FIG. 11 is a diagram illustrating changes occurring in the state of a secure shared area and in the states of switchover history areas.

Explained below with reference to FIG. 9 to FIG. 11 is an operation of calling a module from another module. As explained with reference to FIG. 6, at the time when a module (caller module) calls another module (calling destination module), the pre-switchover operation unit 104A or the pre-switchover operation unit 104B performs a pre-switchover operation with respect to the caller module and then the post-switchover operation unit 106A or the post-switchover operation unit 106B performs a post-switchover operation with respect to the calling destination module.

The following explanation is given for an example in which the module (#1) 110 calls a function sub(5) written in the program (#2) body 122 of the module (#2) 120. In the function sub(5), "sub" represents the function name and the numerical value "5" written into the parenthesis represents the parameter passed to the function sub( ).

FIG. 9 is a flowchart for explaining an example of the pre-switchover operation. FIG. 10 is a flowchart for explaining an example of the post-switchover operation. Regarding the pre-switchover operation and the post-switchover operation, a calling operation in which the caller module calls the calling destination module has different operation details than a returning operation in which the calling destination module calls the caller module and makes the caller module resume from the sleep state.

FIG. 11 schematically illustrates an overview of the changes occurring in the state of the secure shared area 181 and in the states of the switchover history areas 118 and 128 as a result of performing the calling operation and the returning operation (described later). In FIG. 11, "ID", "flag", and "parameter" specified in the secure shared area 181 respectively represent the execution module identifiers, the switchover flags, and the switchover parameters. Immediately after the initialization operation is performed as described above; only an execution module identifier "#1", which is written at Step S111-5 illustrated in FIG. 7, is stored in the secure shared area 181. Moreover, no information is stored in the switchover history areas 118 and 128.

Firstly, the explanation is given regarding the calling operation. In the module (#1) 110, just prior to calling the module (#2) 120, the pre-switchover operation unit 104A determines the type of module switch (Step S104-1). Herein, it is determined that calling of a module is the reason for module switch, and the system control proceeds to Step S104-2. In order to ensure that, when making a return from the calling destination module, the return occurs to the address of the correct caller module; a caller address Addr1 is stored in the switchover history area 118 of the module (#1) 110.

Then, at Step S104-3, in the switchover flag field 183 of the secure shared area 181, the pre-switchover operation unit 104A writes a switchover flag "call" indicating that the reason for module switch is "calling".

Subsequently, at Step S104-4, in the switchover parameter field 184, the pre-switchover operation unit 104A writes the function name "sub" and the corresponding parameter "5" of the calling destination module as the calling information required in module switch. Moreover, at Step S104-5, the pre-switchover operation unit 104A writes the module identifier "#1" of itself in the switchover source module identifier field 185.

Then, the system control proceeds to Step S104-9 that is common to the calling operation and the returning operation. In the execution module identifier field 182 of the secure shared area 181, the pre-switchover operation unit 104A writes the module identifier "#2" of the calling destination module (in this example, the module (#2) 120). Subsequently, the system control proceeds to Step S104-10, at which the module (#1) 110 goes into the sleep state. With that, the module (#1) 110 prepares itself for a case when it is made to return from the calling destination module or prepares itself for being called by another module. As far as going into the sleep state is concerned, the module (#1) 110 stops performing operations just prior to the post-switchover operation.

When an execution module identifier is written in the execution module identifier field 182, it can be reckoned that the module running rights are transferred to the module identified by that execution module identifier. Hence, it is preferable that the time period starting from the time of writing the execution module identifier at Step S104-9 up to the time of stopping module operations at Step S104-10 is shortened as much as possible; and it is desirable to avoid an operation related to the information protection resources of that module during the particular time period.

Once the module (#1) 110 goes into the sleep state at Step S104-10, the module running rights are switched over to the OS 180. Then, because of a scheduler of the OS 180, the module running rights are transferred to the module (#2) 120. With that, the module (#2) 120 resumes running.

Once the module running rights are switched over, the post-switchover operation is performed according to the sequence illustrated in FIG. 10. When there is a change in the running module from the module (#1) 110 to the module (#2) 120, the post-switchover operation unit 106B in the module (#2) 120 obtains the execution module identifier from the secure shared area 181 (Step S106-1). Then, it is determined whether or not the value of the execution module identifier that is obtained matches with the value of the module identifier of the module (#2) 120 (Step S106-2).

At Step S106-2, if it is determined that the value of the execution module identifier does not match with the value of the module identifier of the module (#2) 120; the system control proceeds to Step S106-9 indicating the sleep state, and the state of the module (#2) 120 returns to the state just prior to performing the calling operation. On the other hand, if it is determined that the value of the execution module identifier matches with the value of the module identifier of the module (#2) 120, the system control proceeds to Step S106-3.

In this example, in the execution module identifier field 182 of the secure shared area 181, the module identifier "#2" is written. Hence, it is determined that the value of the execution module identifier matches with the module identifier of the module (#2) 120. Consequently, the post-switchover operation unit 106B gets to know that the module (#2) 120 is to be run. Thus, the system control proceeds to Step S106-3, and the post-switchover operation is continued.

At Step S106-3, the post-switchover operation unit 106B obtains the switchover flag from the switchover flag field 183 of the secure shared area 181. Then, at Step S106-4, it is determined whether the value of the switchover flag that is obtained indicates "calling" or "returning". If it is determined that the value of the switchover flag indicates "calling", the system control proceeds to Step S106-5. On the other hand, if it is determined that the value of the switchover flag indicates "returning", the system control proceeds to Step S106-7.

In this example, as described above, at Step S104-3 illustrated in FIG. 9, the switchover flag "call" indicating "calling" is written in the switchover flag field 183. Hence, it can be seen that the value of the switchover flag is determined to be indicating "calling" and that a function call is requested. Consequently, the system control proceeds to Step S106-5.

At step S106-5, the post-switchover operation unit 106B retrieves the switchover source module identifier from the switchover source module identifier field 185 of the secure shared area 181 and stores that switchover source module identifier in the switchover history area 128 of the module (#2) 120. By storing in advance the module identifier indicating the switchover source module, the module (#2) 120 can make the caller module return after the execution of the function.

In this example, as described above, at Step S104-5 illustrated in FIG. 9, the module identifier "#1" is written in the switchover source module identifier field 185. Hence, that module identifier "#1" is retrieved as the switchover source module identifier and is stored in the switchover history area 128.

Then, at Step S106-6, from the switchover parameter field 184 of the secure shared area 181, the post-switchover operation unit 106B obtains the function name "sub" and the parameter "5" written as calling information. According to the function name "sub" and the parameter "5", the execution of the function sub(5) in the program (#2) body 122 starts.

As illustrated in FIG. 11, at the point of time when the calling operation is complete, in the secure shared area 181 are stored an execution module identifier "#2", the switchover flag "call", and the switchover parameters "sub" and "5" that are written during the pre-switchover operation at Step S104-3, Step S104-4, and Step S104-9, respectively, illustrated in FIG. 9. Moreover, in the switchover history area 118 of the module (#1) 110, is stored the caller address Addr1 that is written at Step S104-2. Furthermore, in the switchover history area 128 of the module (#2) 120 is stored the module identifier "#1" that is written during the post-switchover operation at Step S106-5 illustrated in FIG. 10.

Given below is the explanation regarding the returning operation. In this example, the operation is performed so that the execution is returned from the module (#2) 120, which functions as the calling destination module, to the module (#1) 110, which functions as the caller module that had called the module (#2) 120.

Just prior to making the return from the module (#2) 120 to the caller module, the pre-switchover operation unit 104B of the module (#2) 120 determines the type of module switch at Step S104-1. Herein, it is determined that a module switch has occurred due to a return to the caller module, and consequently the system control proceeds to Step S104-6.

At Step S104-6, from the switchover history area 128, the pre-switchover operation unit 104B obtains the module identifier "#1" that was stored at the time when the module (#2) 120 was called by the switchover source module (Step S106-5 illustrated in FIG. 9). Then, at Step S104-7, in the switchover flag field 183 of the secure shared area 181, the pre-switchover operation unit 104B writes a switchover flag "ret" indicating that the reason for module switch is "returning". Moreover, at Step S104-8, in the switchover parameter field 184 of the secure shared area 181, the pre-switchover operation unit 104B writes, as returning-from-calling information required in the returning operation, an execution result Result_1 that is the result of execution by the pre-switchover operation unit 104B.

The system control then proceeds to Step S104-9 and the pre-switchover operation unit 104B writes the module identifier "#1" of the caller module (in this example, the module (#1) 110) in the execution module identifier field 182 of the secure shared area 181. Then, the system control proceeds to Step S104-10 indicating the sleep state and the operations are stopped just prior to the post-switchover operation.

Once the module (#2) 120 goes into the sleep state at Step S104-10, the module running rights are switched over to the OS 180. Then, because of the scheduler of the OS 180, the module running rights are transferred to the module (#1) 110. With that, the module (#1) 110 resumes running.

Once the module running rights are switched over, the post-switchover operation is performed according to the sequence illustrated in FIG. 10. When switchover of the running module occurs over from the module (#2) 120 to the module (#1) 110, the post-switchover operation unit 106A in the module (#1) 110 obtains the execution module identifier from the execution module identifier field 182 of the secure shared area 181 (Step S106-1). Since the value of the execution module identifier matches with the module identifier of the module (#1) 110, the post-switchover operation is continued (Step S106-2).

At Step S106-3, the post-switchover operation unit 106A obtains the switchover flag from the switchover flag field 183 of the secure shared area 181. In this example, at Step S104-7 explained above with reference to FIG. 9, the switchover flag "ret" written in the switchover flag field 183 is obtained. Hence, it can be seen that the value of the switchover flag is determined to be indicating "returning" (Step S106-4) and a function call return is requested. Consequently, the system control proceeds to Step S106-7.

At Step S106-7, from the switchover history area 118, the post-switchover operation unit 106A obtains the caller address Addr1 stored at Step S104-2 described above, and then deletes the caller address Addr1 from the switchover history area 118. Subsequently, at Step S106-8, the post-switchover operation unit 106A obtains the returning-from-calling information from the switchover parameter field 184 of the secure shared area 181. Then, the module (#1) 110 refers to the execution result Result_1 specified in the returning-from-calling information and resumes the execution by returning to the caller address Addr1.

As illustrated in FIG. 11, at the point of time when the calling operation is complete, in the secure shared area 181 is stored the switchover flag "ret", the switchover parameter "Result_1", and the execution module identifier "#1" that are written during the pre-switchover operation at Step S104-7, Step S104-8, and Step S104-9, respectively, illustrated in FIG. 9. Besides, in the switchover history area 118 of the module (#1) 110, no information is stored as a result of deleting the caller address Addr1 during the post-switchover operation at Step S106-7 illustrated in FIG. 10. In an identical manner, in the switchover history area 128 of the module (#2) 120, no information is stored as a result of deleting the module identifier of the caller module during the pre-switchover operation at Step S104-6.

In this way, an area is secured that is accessible only by the modules running cooperatively; and, just prior to the switchover of execution from the caller module to another module, the module identifier of the calling destination module is written in that area. Then, immediately after the switchover of execution from the caller module to the calling destination module, it becomes possible for the calling destination module to ensure the appropriateness of the execution sequence by comparing the module identifier of itself with the value of the module identifier of the calling destination module written in the abovementioned area. A specific example illustrating the case of ensuring the appropriateness of the execution sequence is described later.

Explained below with reference to FIG. 12 to FIG. 18 is the case of ensuring the appropriateness of the execution sequence. Herein, it is assumed that three modules, namely, a module #1 that functions as an application module and that is based on a program X (Prg X); a module #2 that functions as a library module and that is based on a program Y (Prg Y); and a module #3 that functions as a library module and that is based on a program Z (Prg Z), are run cooperatively. At that time, the configuration is such that the module #1 calls the module #2, and the module #3 calls the module #2.

Figure 12:
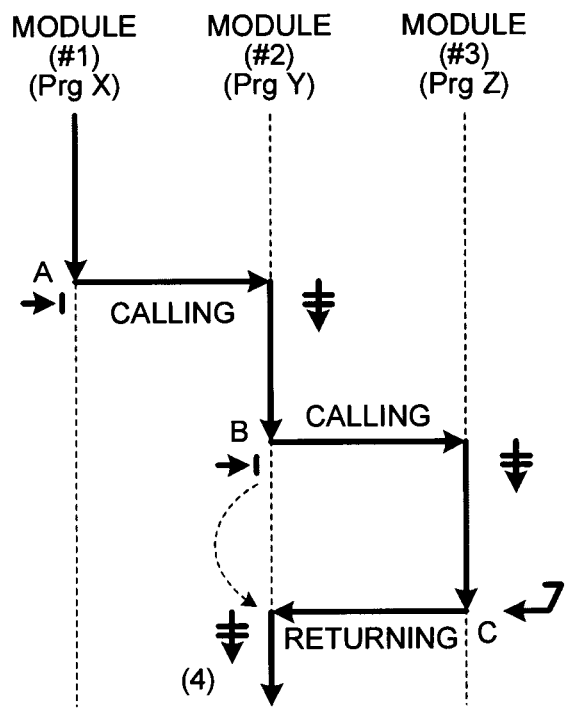
FIG. 12 is a diagram illustrating an example of a legitimate execution sequence of a plurality of modules running cooperatively.

FIG. 12 illustrates an example of a legitimate execution sequence. When the modules #1 to #3 start running, the module #2 and the module #3 put into the sleep state. At a timing A, switchover of the running module occurs. That is, the module #1 calls the module #2 and itself goes into the sleep state. Then, at a timing B, switchover of the running module occurs again. That is, the module #2 calls the module

3, and itself goes into the sleep state. Subsequently, at a timing C, switchover of the running module occurs again. That is, the module #3 makes the module #2 resume from the sleep state, but itself goes into the sleep state.

Figure 13:
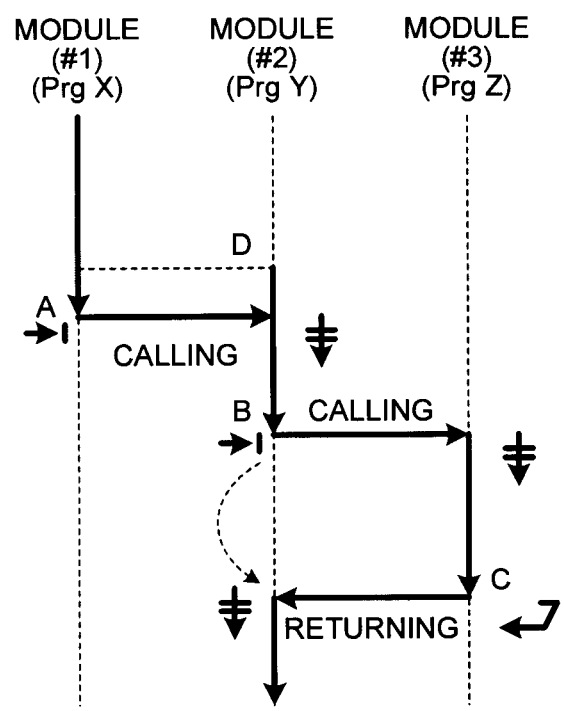
FIG. 13 is a diagram illustrating a first example of an execution sequence attack.
Figure 14:
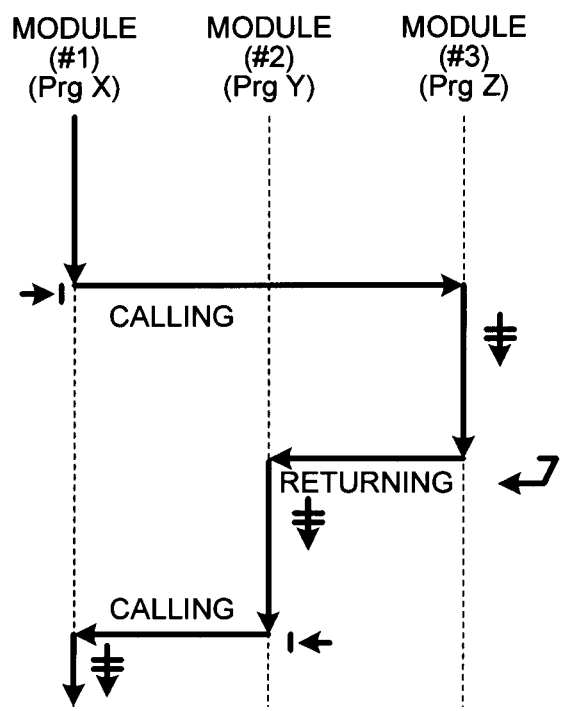
FIG. 14 is a diagram illustrating a second example of the execution sequence attack.
Figure 15:
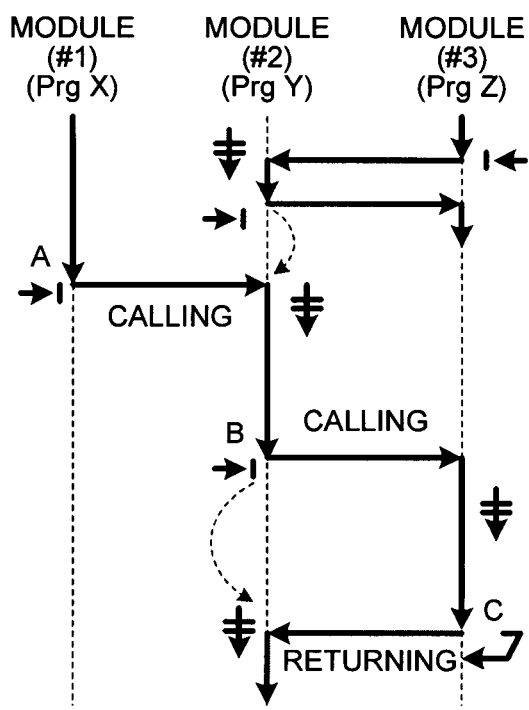
FIG. 15 is a diagram illustrating a third example of the execution sequence attack.

Explained below with reference to FIG. 13 to FIG. 15 are examples of execution sequence attacks made on the execution sequence illustrated in FIG. 12. Such execution sequence attacks are usually made by changing the execution sequence of modules by means of using or altering the OS or programs.

FIG. 13 illustrates a first example of the execution sequence attack. In the first example, a module that has gone into the sleep state is forced to run before being called by the legitimate caller module. In FIG. 13, an attack is illustrated in which the module #2, which is supposed to be called by the module #1 at the timing A, is forced to run at a timing D that is prior to the timing A using the scheduler of the OS. In that case, at the timing A at which the module #1 calls the module #2, the start portion of the module #2 is already executed. As an example, if the start portion of the module #2 contains an authentication operation, it becomes possible to execute the remaining portion of the module #2 without performing authentication. This first example is referred to as a timing attack.

FIG. 14 illustrates a second example of the execution sequence attack. In the second example, the module calling sequence is changed from the legitimate sequence. In the legitimate sequence illustrated in FIG. 12, the module #1 calls the module #2, and the module #2 then calls the module #3. In contrast, in FIG. 14, an attack is illustrated by which, at the timing A at which the module #1 calls the module #2, the module #3 is forced to run instead of the module #2. As an example, if the configuration is such that the module #3 can run after being authenticated by the module #2 by means of the authentication operation, the attack forces the module #3 to run without authentication by the module #2. This second example is referred to as a calling sequence attack.

FIG. 15 illustrates a third example of the execution sequence attack. In the third example, the OS starts running in advance a module #5 and the module #2 that are different than the module #1. Then, the OS calls the module #2 via the module #5. For example, after executing only the beginning portion of the module #2, the OS 180 returns the execution to the module #5 while the module #2 is in an intermediate state. Then, the module #2 goes into the sleep state. At that time, the OS stores the intermediate state of the module #2. Later, at the timing A, the module #2 in the intermediate state can be called from the module #1. In this case too, if the beginning portion of the module #2 contains an authentication operation, it becomes possible to execute the remaining portion of the module #2 without performing authentication. This third example is referred to as an intermediate-state module inserting attack.

Figure 16:
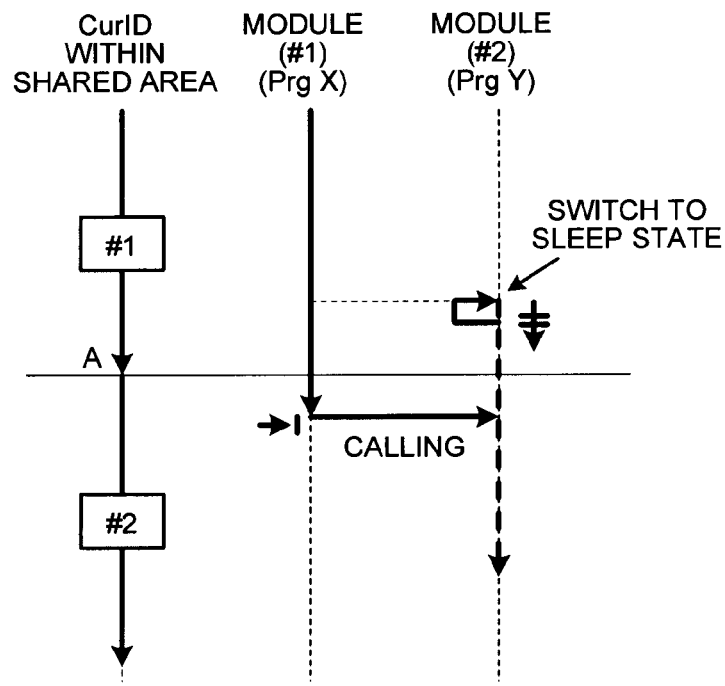
FIG. 16 is a diagram illustrating an example in which the first embodiment is applied to the first example of the execution sequence attack.
Figure 17:
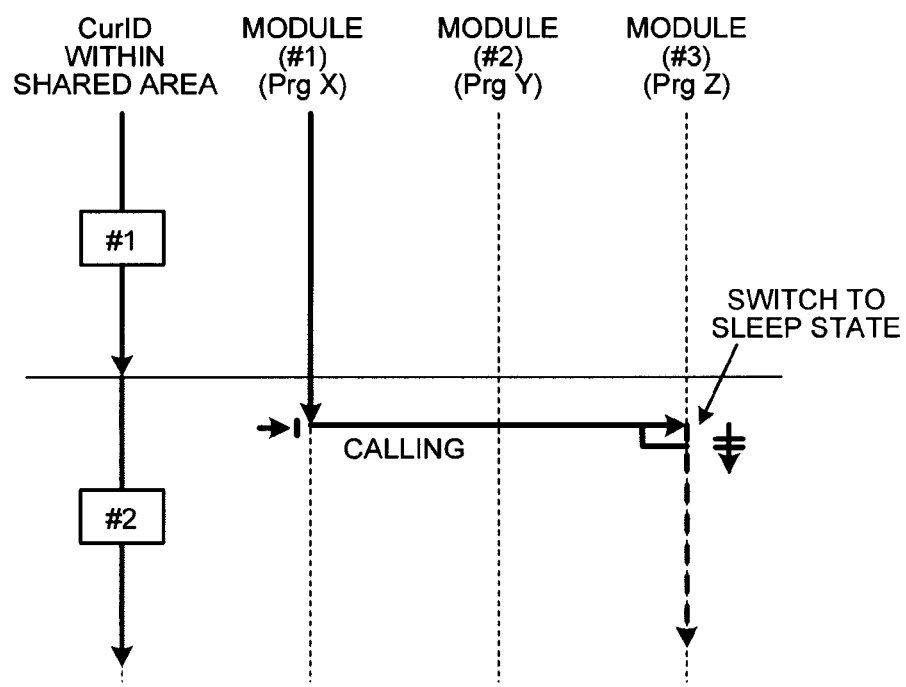
FIG. 17 is a diagram illustrating an example in which the first embodiment is applied to the second example of the execution sequence attack.
Figure 18:
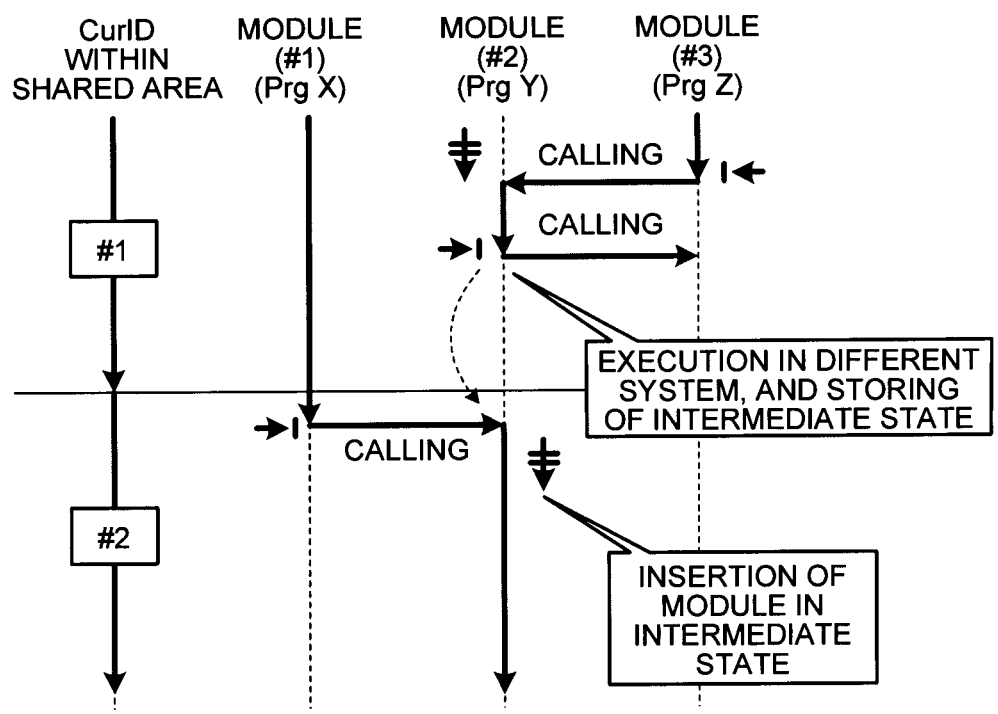
FIG. 18 is a diagram illustrating an example in which the first embodiment is applied to the third example of the execution sequence attack.

Explained below with reference to FIG. 16 to FIG. 18 is the examination of whether or not the first to third examples of the execution sequence attacks described above can be avoided by implementing the configuration according to the first embodiment. In FIG. 16 to FIG. 18, "CurID" within the shared area represents the execution module identifier stored in the secure shared area 181.

FIG. 16 illustrates an example in which the first embodiment is applied to the first example, that is, to the timing attack described with reference to FIG. 13. In this case, until the module #2 is called from the module #1 at the timing A, the secure shared area 181 is storing "#1" as the execution module identifier that indicates the module #1. On the other hand, when the module #2 resumes running from the sleep state, the module #2 performs the post-switchover operation described above and determines whether or not the module identifier of itself matches with the execution module identifier stored in the secure shared area 181 (Step S106-2 illustrated in FIG. 10).

If the module #2 is forced to resume running at the timing D illustrated in FIG. 13, then the execution module identifier stored in the secure shared area 181 has the value "#1" but the module identifier of the module #2 has the value "#2". Thus, the two values are not matching. As a result, the system control proceeds to Step S106-9 and the module #3 goes into the sleep state. Hence, the timing attack is avoided.

FIG. 17 illustrates an example in which the first embodiment is applied to the second example, that is, to the calling sequence attack described with reference to FIG. 14. In this case, the module #3 that is called from the module #1 has a module identifier "#3". However, in the secure shared area 181, the value "#2" is stored as the value of the execution module identifier of the module that is supposed to be run next at Step S104-9 illustrated in FIG. 9 during the pre-switchover operation. Thus, during the post-switchover operation, at Step S106-2 illustrated in FIG. 10, the module #3 determines that the module identifier of itself does not match with the execution module identifier stored in the secure shared area 181. As a result, the system control proceeds to Step S106-9 and the module #2 goes into the sleep state. Hence, the calling sequence attack is avoided.

FIG. 18 illustrates an example in which the first embodiment is applied to the third example, that is, to the intermediate-state module inserting attack described with reference to FIG. 15. In this case, the module #2 and the module #5 are initialized according to a different system than the running of the module #1, and share a module shared key Key_shared_1. On the other hand, the module #1 holds a module shared key Key_shared 2 as a result of initialization. Thus, the module shared key Key_shared_1 that is shared among the module #2 and the module #5 is not shared by the module #1. As a result, when the module #2 is called from the module #1, the module #2 reads the information stored in the secure shared area 181 in a non-plaintext condition.

In this way, since the module #1 and the module #2 cannot share the information written in the secure shared area 181, those modules cannot run cooperatively. Hence, a module that is in an intermediate state can be avoided from being inserted.

As described above, in the first embodiment, upon resuming running, a module can perform the post-switchover operation to determine whether or not the module identifier of itself matches with the execution module identifier that is stored in the secure shared area 181 and that indicates a module which is supposed to be run. That makes it possible to avoid execution sequence attacks.

Meanwhile, without deviating from the scope, various modifications other than the abovementioned configuration are also possible. For example, in the description given above, the secure shared area 181 is established in the memory 280 that is connected to the secure processor 200 by the bus 281. However, the memory 280 is only an exemplary memory device that can be used. For example, as the secure shared area 181, it is possible to use a cache memory installed in the secure processor 200 or to use a nonvolatile memory such as a flash memory. Moreover, the secure shared area 181 is not limited to a semiconductor memory. Alternatively, for example, it is also possible to use a hard disk.

In an identical manner, in the description given above, it is explained that, during the initialization operation, the exchange of AKE or secure shared area information is performed using the memory 280. However, the memory 280 is only an exemplary memory device that can be used. Alternatively, the exchange of AKE or secure shared area information can also be performed using a cache memory, a flash memory, a hard disk, or the like.

In the description given above, it is explained that the secure processor 200 includes only the processor core 210 and the cipher managing unit 220. However, that is not the only possible case. Alternatively, for example, the secure processor 200 can also include an internal memory and a DMA (Direct Memory Access) controller. Moreover, in the description given above, the key table 222 in the cipher managing unit 220 is set in a dynamic manner. However, that is not the only possible case. Alternatively, the keys can be created in advance and be embedded in a nonvolatile memory area in the secure processor 200.

In the first embodiment described above, AKE is started from the application module. However, alternatively, AKE can also be started from the library module.

In the first embodiment described above, it is explained that the initialization operation is performed at the start of running of each module. However, that is not the only possible case. That is, in the embodiment, performing the initialization operation is not limited to the start of running of a program. For example, it is also possible to perform the initialization operation just prior to the moment when the application module and the library module run cooperatively. Moreover, until just prior to the moment when the modules run cooperatively, the initialization operation can be performed at any point of time.

In the first embodiment described above, the explanation is given in which the number of library modules, which run cooperatively with the application module, is limited to two to three. However, that is not the only possible case. Alternatively, the first embodiment is applicable even when four or more library modules run cooperatively with the application module.

Thus, the first embodiment is applicable in the following cases: when the application module runs cooperatively with a plurality of library modules; when a library module is called from another library module; and when the application module is called from a library module. In any one of those cases, all modules can share the same key, and the secure shared area can be built using that key. With that, four or more modules become able to share the same secure shared area.

In the first embodiment described above, a single secure shared area is secured for a single application module. However, alternatively, it is also possible to secure a plurality of secure shared areas for a single application module. For example, a particular module that runs cooperatively with the application module can be sharing a secure shared area Sh_mem3 with the application module; while another module that runs cooperatively with the application module can be sharing a secure shared area Sh_mem4 with the application module. Moreover, when the module #1, the module #2, and the module #3 run cooperatively; the module #1 and the module #2 can have a separate secure share area therebetween, the module #2 and the module #3 can have a separate secure share area therebetween, and the module #1 and the module #3 can have a separate secure share area therebetween.

In the first embodiment described above, it is explained that the cipher managing unit 220 is configured as an independent constituent element. However, that is not the only possible case. Alternatively, for example the cipher managing unit 220 can also be incorporated in a constituent element such as a BIU (Bus Interface Unit) or a DMA controller that accesses the outside of the processor.

In the first embodiment described above, a data encrypting mechanism of the secure processor 200 is used in building the secure shared area 181 that is accessible only by the modules running cooperatively. However, that is not the only possible case. Alternatively, as long as it is possible to take the support of the secure processor 200 and build an area that is accessible only by the modules running cooperatively, any other method other than using the data encrypting mechanism can be implemented to build the secure shared area.

In the first embodiment described above, the switchover of modules is performed by taking the support of the OS 180. However, that is not the only possible case. Alternatively, for example, the embodiment is also applicable when the hardware mechanism is used to perform the switchover of modules in a direct manner (see Japanese Patent No. 4226816).

In the first embodiment described above, the switchover history areas 118 and 128 are managed as independent data areas. However, that is not the only possible case. That is, the switchover history areas 118 and 128 need not necessarily have independent configurations. Alternatively, the switchover history areas 118 and 128 can be configured to be incorporated in the stack included in each module.

In the first embodiment described above, task identifiers are considered as the module identifiers. However, that is not the only possible case. That is, as long as the module identifiers are unique values among the modules running cooperatively, other values can also be used. For example, each module can have a module identifier generated from random numbers. Moreover, a case can also be considered in which the secure processor 200 has a plurality of processors, each of which having a unique identifier assigned thereto. In that case, each module can have a module identifier generated as a value by combining a core identifier, which is used in identifying the processor core, and a task identifier. Still alternatively, a method can be implemented by which, depending on an agreement between the modules running cooperatively, only one of the modules uses the task identifier as the module identifier and the other module uses a value generated from random numbers as the module identifier.

Second Embodiment

Given below is the explanation of a second embodiment according to the embodiment. In the first embodiment described above, the secure shared area 181, with respect to which reading and writing can be performed only by the modules running cooperatively, is built in an area of the memory 280. In contrast, in the second embodiment, a secure shared area is configured as hardware in a secure processor.

Figures 19, 20:
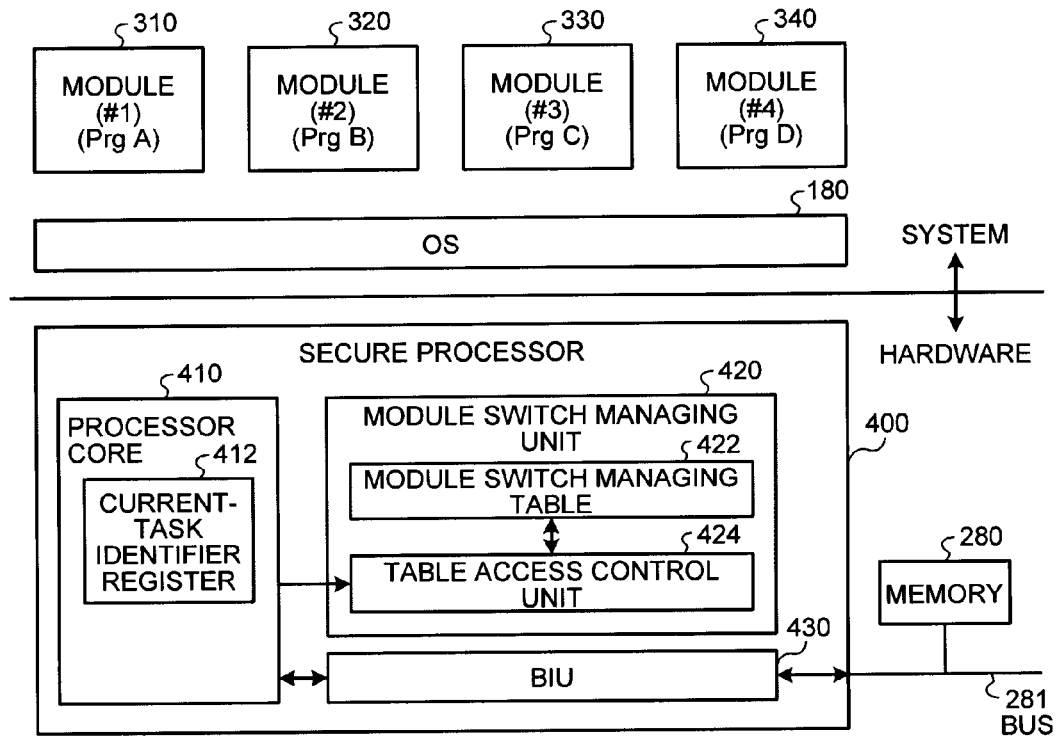
FIG. 19 is a diagram of a configuration of a system that can be implemented in a second embodiment.
FIG. 20 is a diagram illustrating a data configuration of a module switch managing table.

FIG. 19 is a schematic diagram of an exemplary configuration of a system that can be implemented in the second embodiment. In FIG. 19, an overall hardware configuration and a system view are illustrated at the same time. Meanwhile, in the description with reference to FIG. 19, the constituent elements identical to those illustrated in FIG. 1 are referred to by the same reference numerals and the explanation thereof is not repeated.

As illustrated in FIG. 19, according to the second embodiment, a secure processor 400 includes a processor core 410, a BIU 430, and a module switch managing unit 420. In addition, the module switch managing unit 420 includes a module switch managing table 422 and a table access control unit 424.

The table access control unit 424 determines whether or not the processor core 410 is to be allowed to access the module switch managing table 422. If the access is not to be allowed, the table access control unit 424 throws an exception. The BIU 430 is connected to the external bus 281 and serves as a bus interface unit for establishing a connection from the inside of the secure processor 400 with the bus 281. The processor core 410 is connected to the bus 281 via the BIU 430 and, for example, is capable of accessing the memory 280.

Meanwhile, in contrast to the secure processor 200 according to the first embodiment described above, the secure processor 400 according to the second embodiment does not hold a key table or does not include an cipher managing unit having an cipher unit.

FIG. 20 illustrates an exemplary data configuration of the module switch managing table 422. In the module switch managing table 422, with shared area numbers serving as indices, n number of entries having indices (Idx) from "#1" to "#n" are written. Each entry contains a module shared key value field, an execution module identifier field, a switchover source module identifier field, a switchover flag field, a switchover parameter field, and a valid bit. In FIG. 20, the valid bit is expressed as "V". Of these contents of each entry, the execution module identifier field, the switchover source module identifier field, the switchover flag field, and the switchover parameter field are identical to the fields having the same names in the secure shared area 181 explained earlier with reference to FIG. 5.

The module shared key value field is used to store a value that can be known only to those modules which can access the module shared key value field. The valid bit represents the flag indicating whether a particular entry is valid or invalid.

Figure 21:
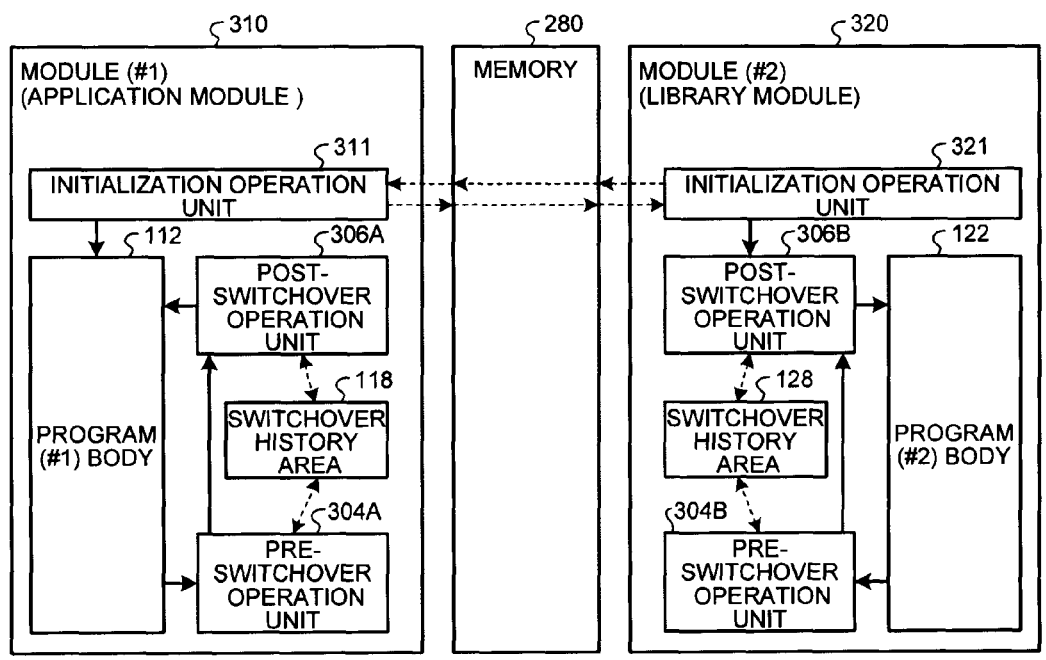
FIG. 21 is a functional block diagram of a module configuration according to the second embodiment.

FIG. 21 is a functional block diagram of an exemplary module configuration according to the second embodiment. In the description with reference to FIG. 21, the constituent elements identical to those illustrated in FIG. 4 are referred to by the same reference numerals and the explanation thereof is not repeated.

As illustrated in FIG. 21, a module (#1) 310 functioning as an application module includes an initialization operation unit 311, the program (#1) body 112, a pre-switchover operation unit 304A, a post-switchover operation unit 306A, and the switchover history area 118. Moreover, a module (#2) 320 functioning as a library module includes an initialization operation unit 321, the program (#2) body 122, and the switchover history area 128; as well as includes a pre-switchover operation unit 304B and a post-switchover operation unit 306B that respectively perform the same operations as the pre-switchover operation unit 304A and the post-switchover operation unit 306A of the module (#1) 310.

Herein, in contrast to the first embodiment, in the memory 280 according to the second embodiment, no secure shared area is established that could be shared by the module (#1) 310 and the module (#2) 320.

Explained below is an example of the operations performed by each module using a module switch function according to the second embodiment. Herein, it is assumed that the task identifiers are considered as the module identifiers. Moreover, it is assumed that the module (#1) 310 is an application module having a module identifier "#1" and being generated from the program A; while the module (#2) 320 is a library module having a module identifier "#2" and being generated from the program B.

The following explanation is given for an example in which the module (#1) 310 and the module (#2) 320 run cooperatively; the module (#2) 320 is called from the module (#1) 310; and the module (#2) 320 is later switched back to the module (#1) 310.

Herein, for example, as compared to the initialization operation unit 111, the pre-switchover operation unit 104A, and the post-switchover operation unit 106A according to the first embodiment described above; the initialization operation unit 311, the pre-switchover operation unit 304A, and the post-switchover operation unit 306A in the module (#1) 310 differ in the fact that they access the module switch managing table using a secure shared number and a module shared key that are shared as a result of the initialization operation. The same is the case regarding the module (#2) 320.

Figure 22:
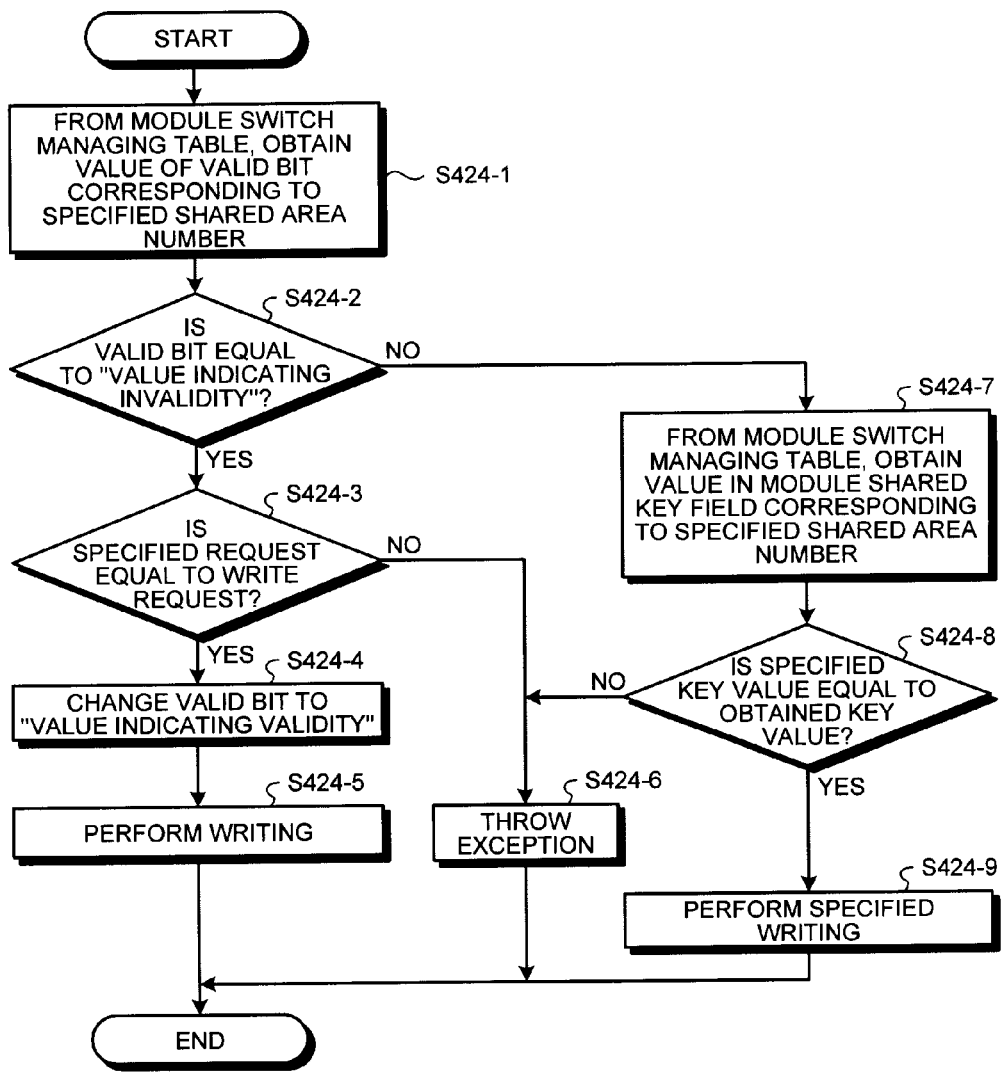
FIG. 22 is a flowchart for explaining operations performed by a module switch managing unit.

FIG. 22 is a flowchart for explaining exemplary operations performed by the table access control unit 424. At the time when the module switch managing table 422 is accessed, the table access control unit 424 performs operations according to the flowchart illustrated in FIG. 22.

In the case when the module (#1) 310 or the module (#2) 320 accesses the fields in the module switch managing table 422, the processor core 410 specifies the shared area number and the module shared key of the address destination. For example, when the module (#1) 310 accesses the module switch managing table 422; firstly, the processor core 410 specifies the shared area number and the module shared key of the address destination to the table access control unit 424 of the module switch managing unit 420.

At Step S424-1, the table access control unit 424 refers to the module switch managing table 422 and obtains the value of the valid bit corresponding to the specified shared area number. Then, at Step S424-2, the table access control unit 424 determines whether or not the obtained valid bit is a "value indicating invalidity" (Step S424-2).

If the obtained valid bit is determined to be a "value indicating invalidity", then the system control proceeds to Step S424-3. Thereat, the table access control unit 424 determines whether or not the access request specified by the processor core 410 is a write request. As a result of determination, if it is determined that the access request is a request other than a write request, the system control proceeds to Step S424-6 and the table access control unit 424 throws an exception.

On the other hand, at Step S424-3, if it is determined that the access request is a write request, the system control proceeds to Step S424-4. Then, at Step S424-4, the table access control unit 424 rewrites the valid bit corresponding to the specified shared area number with a "value indicating validity". Subsequently, at Step S424-5, specified writing is performed at the specified area number in the specified module switch managing table 422.

Meanwhile, at Step S424-2 mentioned above, if it is determined that the valid bit is not a "value indicating invalidity", the system control proceeds to Step S424-7. Then, at Step S424-7, from the module switch managing table 422, the table access control unit 424 obtains the module shared key corresponding to the specified shared area number.

Subsequently, at Step S424-8, the table access control unit 424 determines whether or not the value of the module shared key that has been obtained matches with the module shared key specified by the module (#1) 310 or by the module (#2) 320. If it is determined that the module shared keys are matching, the system control proceeds to Step S424-9 and the table access control unit 424 executes the specified reading/writing with respect to the module switch managing table 422. On the other hand, if it is determined that the module shared keys are not matching, the system control returns to Step S424-6 and the table access control unit 424 throws an exception.

Given below is the explanation regarding the initialization operation of modules performed according to the second embodiment. When the execution of the module (#1) 310 and the module (#2) 320 is started by the OS 180, the initialization operation is performed by each of those modules so as to enable the modules to run cooperatively. FIG. 23 is a flowchart for explaining an example of the initialization operation performed by the module (#1) 310 that functions as the application module. FIG. 24 is a flowchart for explaining an example of the initialization operation performed by the module (#2) 320 that functions as the library module. The operations performed in the application module as illustrated in FIG. 23 are performed cooperatively with the operations performed in the library module as illustrated in FIG. 24.

The following explanation is given with the focus on the flowchart illustrated in FIG. 23, and the explanation with reference to the flowchart illustrated in FIG. 24 is given when necessary. Moreover, the steps that are identical to the steps explained with reference to FIG. 7 and FIG. 8 are referred to by the same step numbers and the explanation thereof is not repeated.

Once the execution by the OS 180 starts, at Step S111-1 illustrated in FIG. 23 and at Step S121-1 illustrated in FIG. 24, AKE is performed among the module (#1) 310 and the module (#2) 320. As a result of AKE, the module (#1) 310 and the module (#2) 320 verify the validness of each other as well as share a temporary key Key_AB.

Then, at Step S311-2 illustrated in FIG. 23, the initialization operation unit 311 of the module (#1) 310 generates, from random numbers, the module shared key Key_shared that is used in allowing an access to a particular entry (hereinafter, referred to as "shared area") in the module switch managing table 422.

Subsequently, at Step S311-3, the initialization operation unit 311 specifies the module shared key Key_shared and the module identifier (having the value "#1") of itself with respect to a particular shared area number (such as "#1"). Herein, a shared area number points to the index of an entry that is specified in the module switch managing table 422 and that is shared among the modules. As a result, a free area in the module switch managing table 422 is secured. That is, a shared area to be shared with the module (#2) 320 is secured in the module switch managing table 422.

At Step S311-3 explained above, since the module switch managing table 422 is accessed, the module switch managing unit 420 performs access control according to the flowchart illustrated in FIG. 22. In this case, the valid bit corresponding to the specified shared area number is a "value indicating invalidity" and the access request is a write request. Therefore, the module switch managing unit 420 writes the specified module shared key and the specified module identifier into the module shared key value field and the execution module identifier field, respectively, in the module switch managing table 422; as well as sets the valid bit to a "value indicating validity".

Subsequently, at Step S311-4, the module (#1) 310 encodes the secure shared area information as well as encodes the module task identifier of itself with the temporary key Key_AB, and sends the encoded data to the module (#2) 320 via the memory 280. Herein, the secure shared area information contains the shared area number of the shared area secured at Step S311-3 and contains the module shared key Key_shared.

In this example, to the module (#2) 320, the module (#1) 310 sends a shared area number "#1" of the shared area, which is secured at Step S311-3, in the encoded form and the shared key Key_shared in the encoded form as the secure shared area information. Along with that, to the module (#2) 320, the module (#1) 310 sends the task identifier "#1" in the encoded form as the module identifier of itself.

At Step S321-2 illustrated in FIG. 24, the module (#2) 320 uses the temporary key Key_AB to decode the data sent by the module (#1) 310 and obtains the information related to the secure shared area (i.e., obtains the shared area number "#1" and the shared key Key_shared) and obtains the module identifier "#1". That enables the module (#2) 320 to share the information of the module (#1) 310.

Similarly, as the module identifier of itself, the module (#2) 320 encodes the task identifier "#2" with the key Key_AB and sends the encoded task identifier "#2" to the module (#1) 310 via the memory 280. Then, the module (#1) 310 decodes the data that is sent by the module (#2) 320 with the temporary key Key_AB and obtains the module identifier "#2" indicating the module (#2) 320. That enables the module (#1) 310 to share the information of the module (#2) 320.

At Step S121-4 illustrated in FIG. 24, the module (#2) 320 stops the operations just prior to the operations at calling destination (described later) and goes into the sleep state, and waits for being called from the module (#1) 310. Moreover, at Step S111-6 illustrated in FIG. 23, the execution of the program (#1) body 112 starts in the module (#1) 310.

Figure 25:
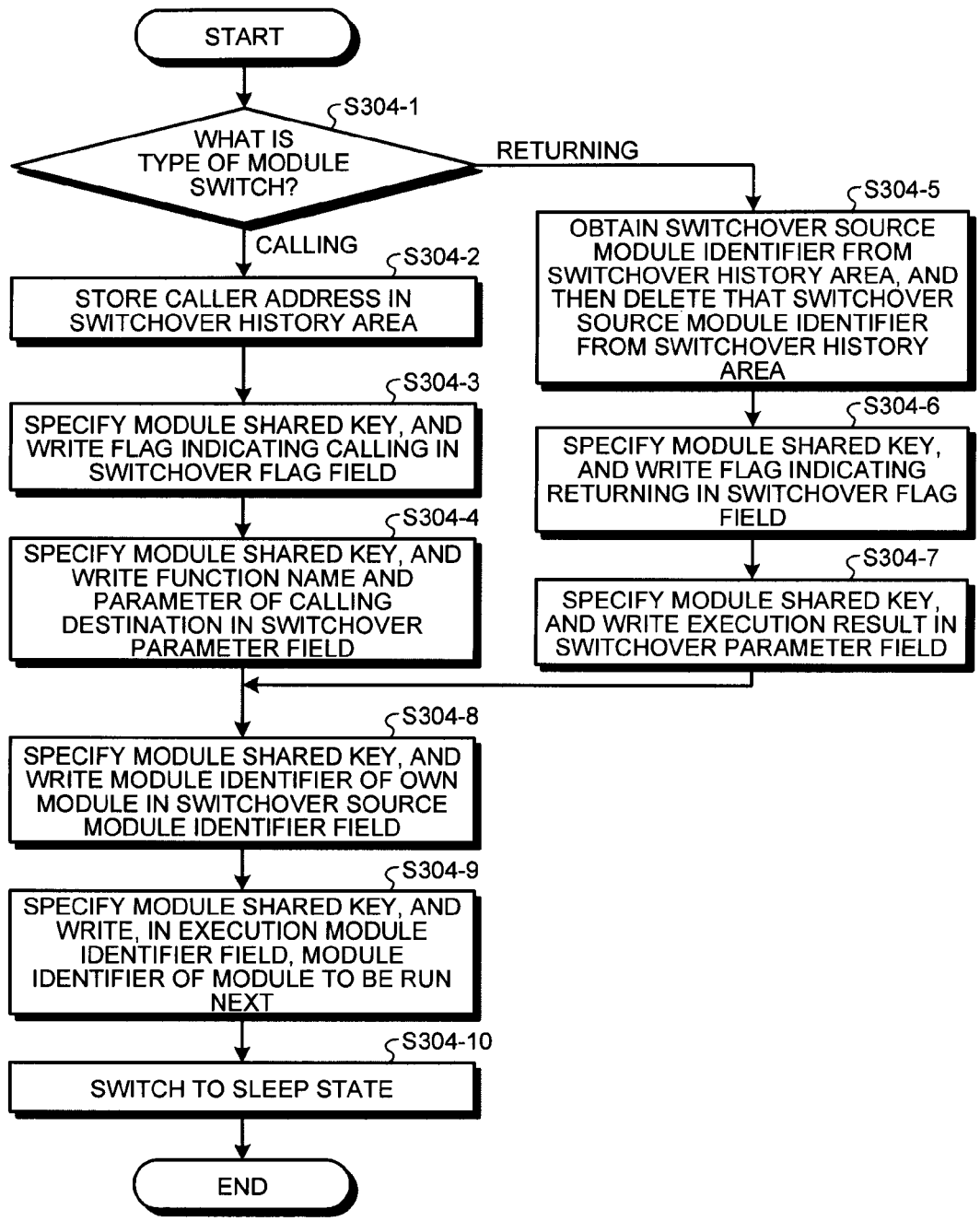
FIG. 25 is a flowchart for explaining a pre-switchover operation.
Figure 26:
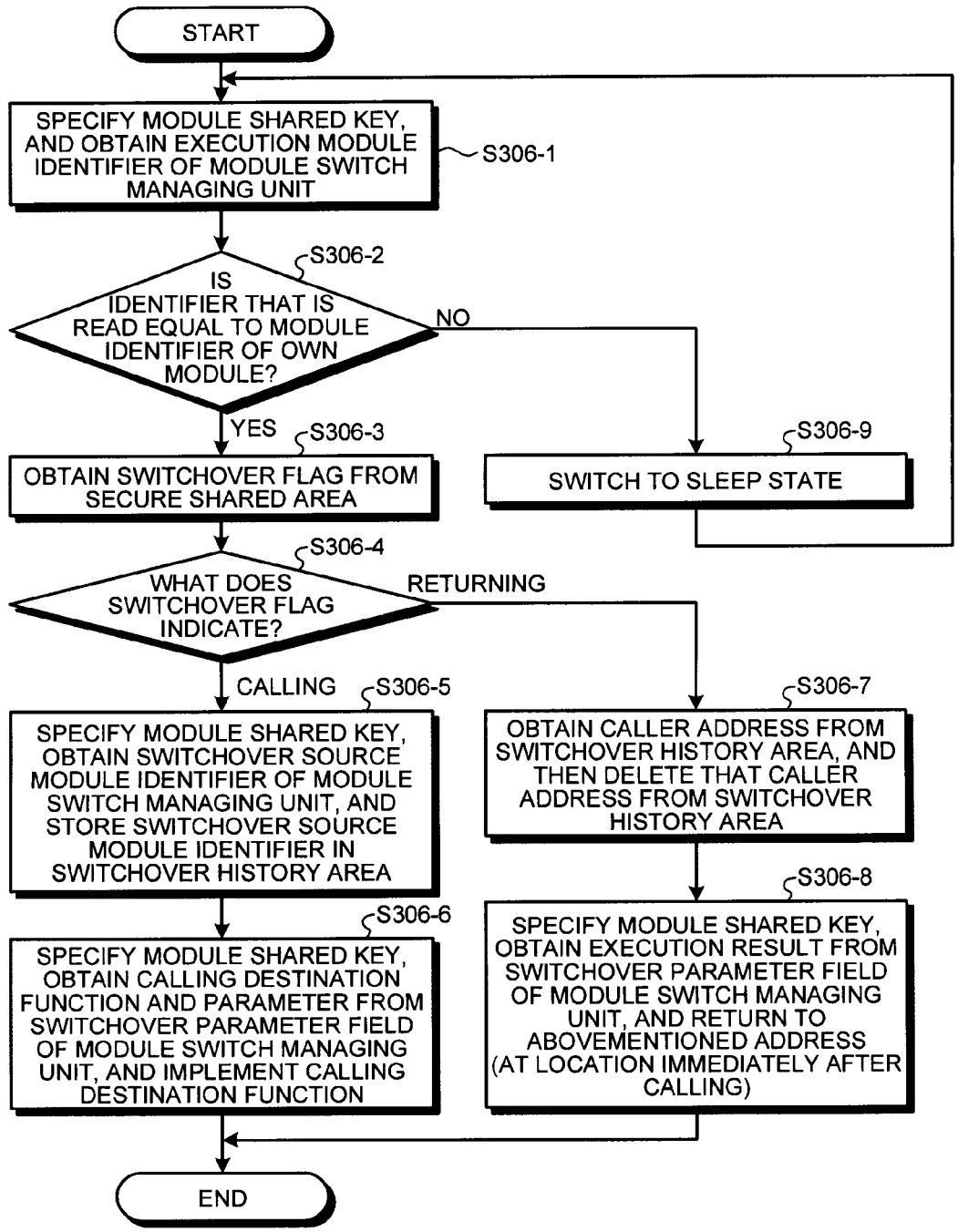
FIG. 26 is a flowchart for explaining a post-switchover operation.
Figure 27:
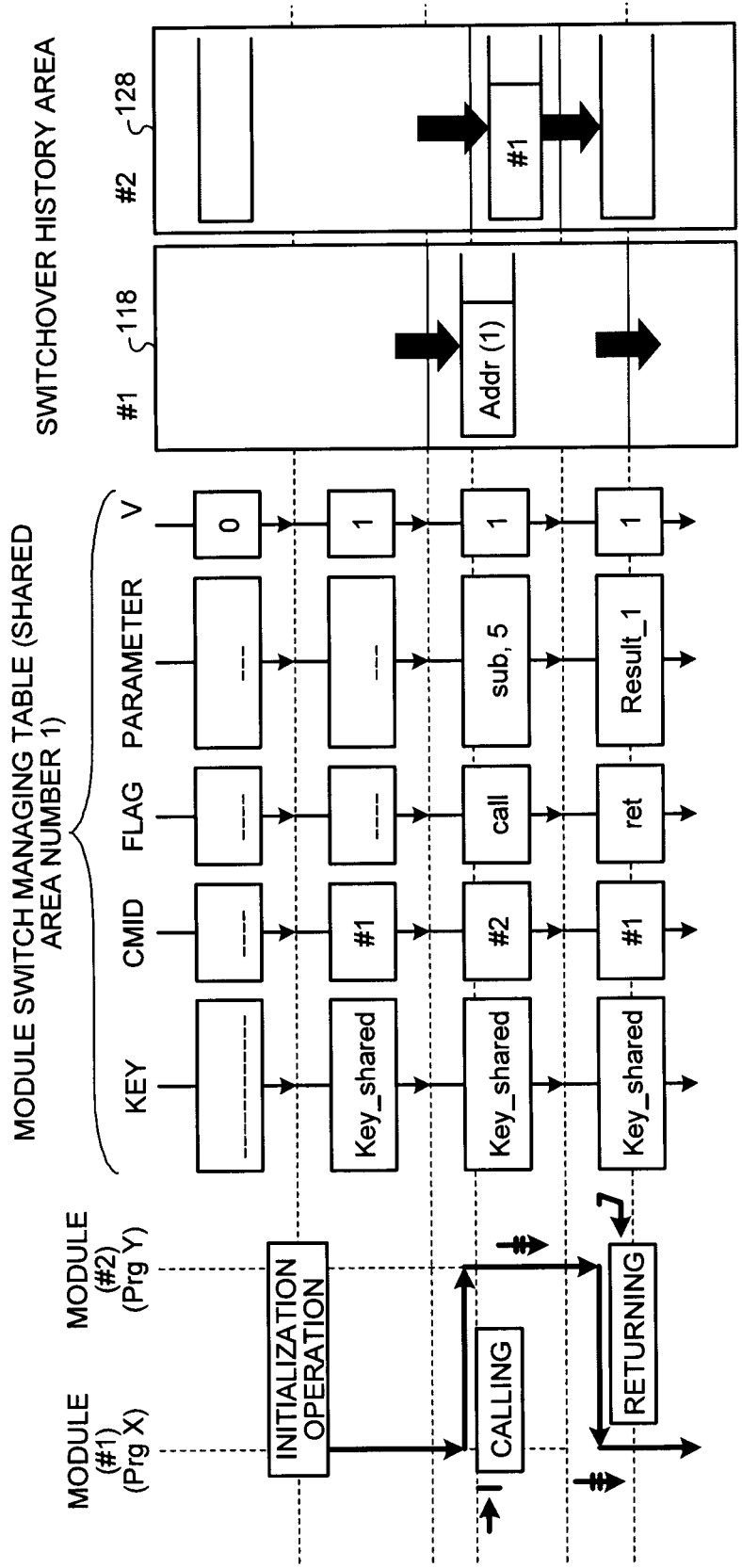
FIG. 27 is a diagram illustrating changes occurring in the state of a secure shared area and in the states of switchover history areas.

Explained below with reference to FIG. 25 to FIG. 27 is an operation of calling a module from another module. In an identical manner to that described in the first embodiment, at the time when a module (caller module) calls another module (calling destination module), the pre-switchover operation unit 304A or the pre-switchover operation unit 304B performs a pre-switchover operation with respect to the caller module and then the post-switchover operation unit 306A or the post-switchover operation unit 306B performs a post-switchover operation with respect to the calling destination module.

The following explanation is given for an example in which the module (#1) 310 calls the function sub(5) written in the program (#2) body 122 of the module (#2) 320. In the function sub(5), "sub" represents the function name and the numerical value "5" written into the parenthesis represents the parameter passed to the function sub( ).

FIG. 25 is a flowchart for explaining an example of the pre-switchover operation according to the second embodiment.

FIG. 26 is a flowchart for explaining an example of the post-switchover operation according to the second embodiment. Regarding the pre-switchover operation and the post-switchover operation, a calling operation in which the caller module calls the calling destination module has different operation details than a returning operation in which the calling destination module calls the caller module and makes the caller module resume from the sleep state.

FIG. 27 schematically illustrates an overview of the changes occurring in the state of the module switch managing table 422 and in the states of the switchover history areas 118 and 128 as a result of performing the calling operation and the returning operation (described later). In FIG. 27, "Key", "CMID", "flag", "parameter", and "V" specified in the module switch managing table 422 respectively represent the module shared keys, the execution module identifiers, the switchover flags, the switchover parameters, and the valid flags. Herein, in the module switch managing table 422, the states of entries corresponding to the shared area number "#1" are illustrated.

Just prior to the initialization operation described above, no information is stored in the fields for the module shared key, the execution module identifier, the switchover flag, and the switchover parameter. In the valid bit field, a value "0" is stored as the "value indicating invalidity". By performing the initialization operation, the module shared key Key_shared gets stored in the module shared key filed of the module switch managing table 422, and the execution module identifier "#1" gets stored in the execution module identifier field of the module switch managing table 422. Moreover, in the valid bit field, a value "1" gets stored as the "value indicating validity".

Firstly, the explanation is given regarding the calling operation. In the module (#1) 310, just prior to calling the module (#2) 320, the pre-switchover operation unit 304A determines the type of module switch (Step S304-1). Herein, it is determined that calling of a module is the reason for module switch, and the system control proceeds to Step S304-2. In order to ensure that, when making a return from the calling destination module, the return occurs to the address of the correct caller module; a caller address Addr1 is stored in the switchover history area 118 of the module (#1) 310.

Then, at Step S304-3, in the switchover flag field of the module switch managing table 422, the pre-switchover operation unit 304A writes a switchover flag "call" indicating that the reason for module switch is "calling". At that time, according to the flowchart illustrated in FIG. 22, the module switch managing unit 420 performs determination using the valid bit and the module shared key, and controls the writing with respect to the module switch managing table 422.

That is, firstly, the module (#1) 310 specifies the shared area number "#1", the module shared key Key_shared, and the switchover flag "call". According to the flowchart illustrated in FIG. 22, the secure processor 400 (the module switch managing unit 420) obtains, from the module switch managing table 422, the valid bit that is stored in the entry corresponding to the shared area number "#1" specified by the module (#1) 310 (Step S424-1 illustrated in FIG. 22). During the initialization operation explained with reference to FIG. 23, the valid bit is already rewritten to a "value indicating validity" (Step S424-4). Consequently, at Step S424-7 illustrated in FIG. 22, the module switch managing unit 420 obtains, from the module switch managing table 422, the module shared key that is stored in the entry corresponding to the shared area number "#1".

The module switch managing unit 420 determines whether or not the module shared key obtained from the module switch managing table 422 matches with the module shared key Key_shared specified by the module (#1) 310. In this example, since the obtained module shared key matches with the module shared key Key_shared; the module switch managing unit 420 writes a switchover flag "call" in the switchover flag field of the entry corresponding to the shared area number "#1" in the module switch managing table 422.

Subsequently, at Step S304-4, in the switchover parameter field of the module switch managing table 422, the pre-switchover operation unit 304A writes the function name "sub" and the corresponding parameter "5" of the calling destination module as the calling information required in module switch. In this case too, in an identical manner to that described above, the module switch managing unit 420 controls the writing with respect to the module switch managing table 422 based on the determination result regarding the valid bit and the module shared key.

Then, the system control proceeds to Step S304-8 that is common to the calling operation and the returning operation. In the switchover source module identifier field of the module switch managing table 422, the pre-switchover operation unit 304A writes the module identifier "#1" of itself. Moreover, at Step S304-9, in the execution module identifier field of the module switch managing table 422, the pre-switchover operation unit 304A writes the module identifier "#2" of the calling destination module (in this example, the module (#2) 320).

In the operations performed at Step S304-8 and Step S304-9 too, in an identical manner to that described above, the module switch managing unit 420 controls the writing with respect to the module switch managing table 422 based on the determination result regarding the valid bit and the module shared key.

Then, the system control proceeds to Step S304-10, and the module (#1) 310 goes into the sleep state. With that, the module (#1) 310 prepares itself for a case when it is made to return from the calling destination module or prepares itself for being called by another module. As far as going into the sleep state is concerned, the module (#1) 310 stops performing operations just prior to the post-switchover operation.

Once the module (#1) 310 goes into the sleep state at Step S304-10, the module running rights are switched over to the OS 180. Then, because of the scheduler of the OS 180, the module running rights are transferred to the module (#2) 320. With that, the module (#2) 320 resumes running.

Once the module running rights are switched over, the post-switchover operation is performed according to the sequence illustrated in FIG. 26. When the running module is switched from the module (#1) 310 to the module (#2) 320, the post-switchover operation unit 306B in the module (#2) 320 specifies number of the shared area number "#1" and the module shared key Key_shared, and requests the secure processor 400 to obtain the execution module identifier (Step S306-1).

That is, firstly, the module (#2) 320 specifies the shared area number "#1" and the module shared key Key_shared. According to the flowchart illustrated in FIG. 22, the secure processor 400 (the module switch managing unit 420) obtains, from the module switch managing table 422, the valid bit that is stored in the entry corresponding to the shared area number "#1" specified by the module (#1) 320 (Step S424-1 illustrated in FIG. 22). During the initialization operation explained with reference to FIG. 23, the valid bit is already rewritten to a "value indicating validity" (Step S424-4). Consequently, at Step S424-7 illustrated in FIG. 22, the module switch managing unit 420 obtains, from the module switch managing table 422, the module shared key that is stored in the entry corresponding to the shared area number "#1".

The module switch managing unit 420 determines whether or not the module shared key obtained from the module switch managing table 422 matches with the module shared key Key_shared specified by the module (#1) 320. In this example, since the obtained module shared key matches with the module shared key Key_shared; the module switch managing unit 420 obtains the execution module identifier "#2" from the execution module identifier field of the entry corresponding to the shared area number "#1" in the module switch managing table 422. Then, the execution module identifier "#2" is sent to the module (#2) 320.

In the module (#2) 320, the post-switchover operation unit 306B determines whether or not the value "#2" of the execution module identifier sent by the secure processor 400 matches with the value of the module identifier of the module (#2) 320 (Step S306-2).

If it is determined at Step S306-2 that the value of the execution module identifier does not match with the value of the module identifier of the module (#2) 320, the system control proceeds to Step S306-9 indicating the sleep state, and the state of the module (#2) 320 returns to the state just prior to performing the calling operation. On the other hand, if it is determined at Step S306-2 that the value of the execution module identifier matches with the value of the module identifier of the module (#2) 320, the system control proceeds to Step S306-3.

In this example, in the execution module identifier field of the entry corresponding to the shared area number "#1" in the module switch managing table 422, the module identifier "#2" is written. Hence, it is determined that the value of the execution module identifier matches with the module identifier of the module (#2) 320. Consequently, the post-switchover operation unit 306B gets to know that the module (#2) 320 is to be run. Thus, the system control proceeds to Step S306-3 and the post-switchover operation is continued.

At Step S306-3, the post-switchover operation unit 306B specifies the shared area number "#1" and the module shared key Key_shared, and obtains the switchover flag from the module switch managing table 422. In this case too, in an identical manner to that described above, the module switch managing unit 420 controls the reading from the module switch managing table 422 based on the determination result regarding the valid bit of the entry corresponding to the shared area number "#1" and based on the module shared key.

Then, at Step S306-4, it is determined whether the value of the switchover flag that is obtained indicates "calling" or "returning". If it is determined that the value of the switchover flag indicates "calling", the system control proceeds to Step S306-5. On the other hand, if it is determined that the value of the switchover flag indicates "returning", the system control proceeds to Step S306-7.

In this example, as described above, at Step S304-3 illustrated in FIG. 25, the switchover flag "call" indicating "calling" is written in the switchover flag field of the module switch managing table 422. Hence, it can be seen that the value of the switchover flag is determined to be indicating "calling" and that a function call is requested. Consequently, the system control proceeds to Step S306-5.

At step S306-5, in order to make the caller module return, the post-switchover operation unit 306B specifies the shared area number "#1" and the module shared key Key_shared, and retrieves the switchover source module identifier from the switchover source module identifier field of the module switch managing table 422. In this case too, in an identical manner to that described above, the module switch managing unit 420 controls the reading from the module switch managing table 422 based on the determination result regarding the valid bit of the entry corresponding to the shared area number "#1" and based on the module shared key. The retrieved switchover source module identifier is stored in the switchover history area 128 of the module (#2) 320.

Subsequently, at Step S306-6, the post-switchover operation unit 306B specifies the shared area number "#1" and the module shared key Key_shared; and retrieves, from the switchover parameter field of the module switch managing table 422, the function name "sub" and the parameter "5" written as calling information. In this case too, in an identical manner to that described above, the module switch managing unit 420 controls the reading from the module switch managing table 422 based on the determination result regarding the valid bit of the entry corresponding to the shared area number "#1" and based on the module shared key. According to the function name "sub" and the parameter "5", the execution of the function sub(5) in the program (#2) body 122 starts.

As illustrated in FIG. 27, at the point of time when the calling operation is complete, in the module switch managing table 422 are stored the execution module identifier "#2", the switchover flag "call", and the switchover parameters "sub" and "5" that are written during the pre-switchover operation at Step S304-3, Step S304-4, and Step S304-9, respectively, illustrated in FIG. 25. The value in the valid bit field remains unchanged at "1". Moreover, in the switchover history area 118 of the module (#1) 310 is stored the caller address Addr1 that is written at Step S304-2. Furthermore, in the switchover history area 128 of the module (#2) 320 is stored the module identifier "#1" that is written during the post-switchover operation at Step S306-5 illustrated in FIG. 26.

Given below is the explanation regarding the returning operation. In this example, the operation is performed so that the execution is returned from the module (#2) 320, which functions as the calling destination module, to the module (#1) 310, which functions as the caller module that had called the module (#2) 320.

In the module (#2) 320, just prior to returning to the caller module from the module (#2) 320, the pre-switchover operation unit 304B of the module (#2) 320 determines the type of module switch (Step S304-1). Herein, it is determined that returning to a module is the reason for module switch, and the system control proceeds to S304-5. Then, at Step S304-5, the pre-switchover operation unit 304B obtains, from the switchover history area 128, the module identifier "#1" that was stored at the time when the module (#2) 320 was called by the switchover source module (at Step S306-5 illustrated in FIG. 26).

Then, at Step S304-6, the pre-switchover operation unit 304B specifies the shared area number "#1" and the module shared key Key_shared, and writes a switchover flag "ret" indicating "returning" in the switchover flag field of the module switch managing table 422. In this case too, in an identical manner to that described above, the module switch managing unit 420 controls the writing with respect to the module switch managing table 422 based on the determination result regarding the valid bit of the entry corresponding to the shared area number "#1" and based on the module shared key.

Then, at Step S304-7, the pre-switchover operation unit 304B specifies the shared area number "#1" and the module shared key Key_shared; and writes, as returning-from-calling information required in the returning operation, the execution result "Result_1", which is the result of running of the module (#2), in the switchover parameter field of the module switch managing table 422.

The system control then proceeds to Step S304-8 that is common to the calling operation and the returning operation. In the switchover source module identifier field of the module switch managing table 422, the pre-switchover operation unit 304A writes the module identifier "#2" of itself. Moreover, at Step S304-9, in the execution module identifier field of the module switch managing table 422, the pre-switchover operation unit 304A writes the module identifier "#1" of the calling destination module (in this example, the module (#1) 310).

In the operations performed at Step S304-8 and Step S304-9 too, in an identical manner to that described above, the module switch managing unit 420 controls the writing with respect to the module switch managing table 422 based on the determination result regarding the valid bit and the module shared key.

Then, the system control proceeds to Step S304-10, and the module (#2) 320 goes into the sleep state. With that, the module (#2) 320 prepares itself for a case when it is made to return from the calling destination module or prepares itself for being called by another module. As far as going into the sleep state is concerned, the module (#2) 320 stops performing operations just prior to the post-switchover operation.

Once the module (#2) 320 goes into the sleep state at Step S304-10, the module running rights are switched over to the OS 180. Then, because of the scheduler of the OS 180, the module running rights are transferred to the module (#1) 310. With that, the module (#1) 310 resumes running.

Once the module running rights are switched over, the post-switchover operation is performed according to the sequence illustrated in FIG. 26. When the running module is switched from the module (#2) 320 to the module (#1) 310, the post-switchover operation unit 306A in the module (#1) 310 specifies the shared area number "#1" and the module shared key Key_shared, and requests the secure processor 400 to obtain the execution module identifier. In response, the secure processor 400 retrieves the execution module identifier "#1" from the execution module identifier field of the module switch managing table 422, and sends the execution module identifier "#1" to the module (#1) 310.

That is, firstly, the module (#1) 310 specifies the shared area number "#1" and the module shared key Key_shared. According to the flowchart illustrated in FIG. 22, the secure processor 400 (the module switch managing unit 420) obtains, from the module switch managing table 422, the valid bit that is stored in the entry corresponding to the shared area number "#1" specified by the module (#1) 310 (Step S424-1 illustrated in FIG. 22). During the initialization operation explained with reference to FIG. 23, the valid bit is already rewritten to a "value indicating validity" (Step S424-4). Consequently, at Step S424-7 illustrated in FIG. 22, the module switch managing unit 420 obtains, from the module switch managing table 422, the module shared key that is stored in the entry corresponding to the shared area number "#1".

The module switch managing unit 420 determines whether or not the module shared key obtained from the module switch managing table 422 matches with the module shared key Key_shared specified by the module (#1) 310. In this example, since the obtained module shared key matches with the module shared key Key_shared; the module switch managing unit 420 obtains the execution module identifier "#1" from the execution module identifier field of the entry corresponding to the shared area number "#1" in the module switch managing table 422.

Once the secure processor 400 sends the execution module identifier "#1", the post-switchover operation unit 306A determines whether or not the value "#1" of the execution module identifier sent by the secure processor 400 matches with the value of the module identifier of the module (#1) 310 (Step S306-2).

If it is determined at Step S306-2 that the value of the execution module identifier does not match with the value of the module identifier of the module (#1) 310, the system control proceeds to Step S306-9 indicating the sleep state, and the state of the module (#1) 310 returns to the state just prior to performing the calling operation. On the other hand, if it is determined at Step S306-2 that the value of the execution module identifier matches with the value of the module identifier of the module (#1) 310, the system control proceeds to Step S306-3.

In this example, in the execution module identifier "#1" from the execution module identifier field of the entry corresponding to the shared area number "#1" in the module switch managing table 422, the module identifier "#1" is written. Hence, it is determined that the value of the execution module identifier matches with the module identifier of the module (#1) 310. Consequently, the post-switchover operation unit 306A gets to know that the module (#1) 310 is to be run. Thus, the system control proceeds to Step S306-3 and the post-switchover operation is continued.

At Step S306-3, the post-switchover operation unit 306A specifies the shared area number "#1" and the module shared key Key_shared, and obtains the switchover flag from the module switch managing table 422. In this case too, in an identical manner to that described above, the module switch managing unit 420 controls the reading from the module switch managing table 422 based on the determination result regarding the valid bit of the entry corresponding to the shared area number "#1" and based on the module shared key.

Then, at Step S306-4, it is determined whether the value of the switchover flag that is obtained indicates "calling" or "returning". If it is determined that the value of the switchover flag indicates "calling", the system control proceeds to Step S306-5. On the other hand, if it is determined that the value of the switchover flag indicates "returning", the system control proceeds to Step S306-7.

In this example, at Step S304-6 explained above with reference to FIG. 25, since the switchover flag "ret" is written in the switchover flag field of the module switch managing table 422, it can be seen that the value of the switchover flag is determined to be indicating "returning" and a function call is requested. Consequently, the system control proceeds to Step S306-7.

At Step S306-7, the post-switchover operation unit 306A obtains, from the switchover history area 118, the caller address Addr1 that is stored at Step S304-2 described earlier, and then deletes the caller address Addr1 from the switchover history area 118. Subsequently, at Step S306-8, the post-switchover operation unit 306A specifies the shared area number "#1" and the module shared key Key_shared, and obtains the returning-from-calling information from the switchover parameter field of the module switch managing table 422. Then, the module (#1) 310 refers to the execution result Result_1 specified in the returning-from-calling information and resumes the execution by returning to the caller address Addr1.

In this way, in the second embodiment, the module (#1) 310 and the module (#2) 320 share a module shared key, and the module switch managing unit 420 makes use of the module shared key and performs access control with respect to the entries in the module switch managing table 422. As a result, it becomes possible to ensure that reading/writing with respect to the entries written in the module switch managing table 422 can be performed only from the module (#1) 310 and the module (#2) 320, but not from the OS 180 or other modules. Hence, the values written in the module switch managing table 422 cannot be rewritten by the OS 180 or another module that has been altered with ill intent. Because of that, it can be said that the module switch managing unit 420 fulfills the role that is equivalent to the role fulfilled by the secure shared area 181 according to the first embodiment.

As illustrated in FIG. 27, at the point of time when the returning operation is complete, in the module switch managing table 422 are stored the switchover flag "ret", the switchover parameter "Result_1", and the execution module identifier "#1" that are written during the pre-switchover operation at Step S304-6, Step S304-7, and Step S304-9, respectively, illustrated in FIG. 25. Moreover, since the caller address Addr1 is deleted from the switchover history area 118 of the module (#1) 310 during the post-switchover operation unit at Step S306-7 illustrated in FIG. 26, no information is stored in the switchover history area 118 of the module (#1) 310. In an identical manner, since the module identifier of the caller is deleted from the switchover history area 128 of the module (#2) 320 during the pre-switchover operation unit at Step S304-5, no information is stored in the switchover history area 128 of the module (#2) 320.

Figure 28:
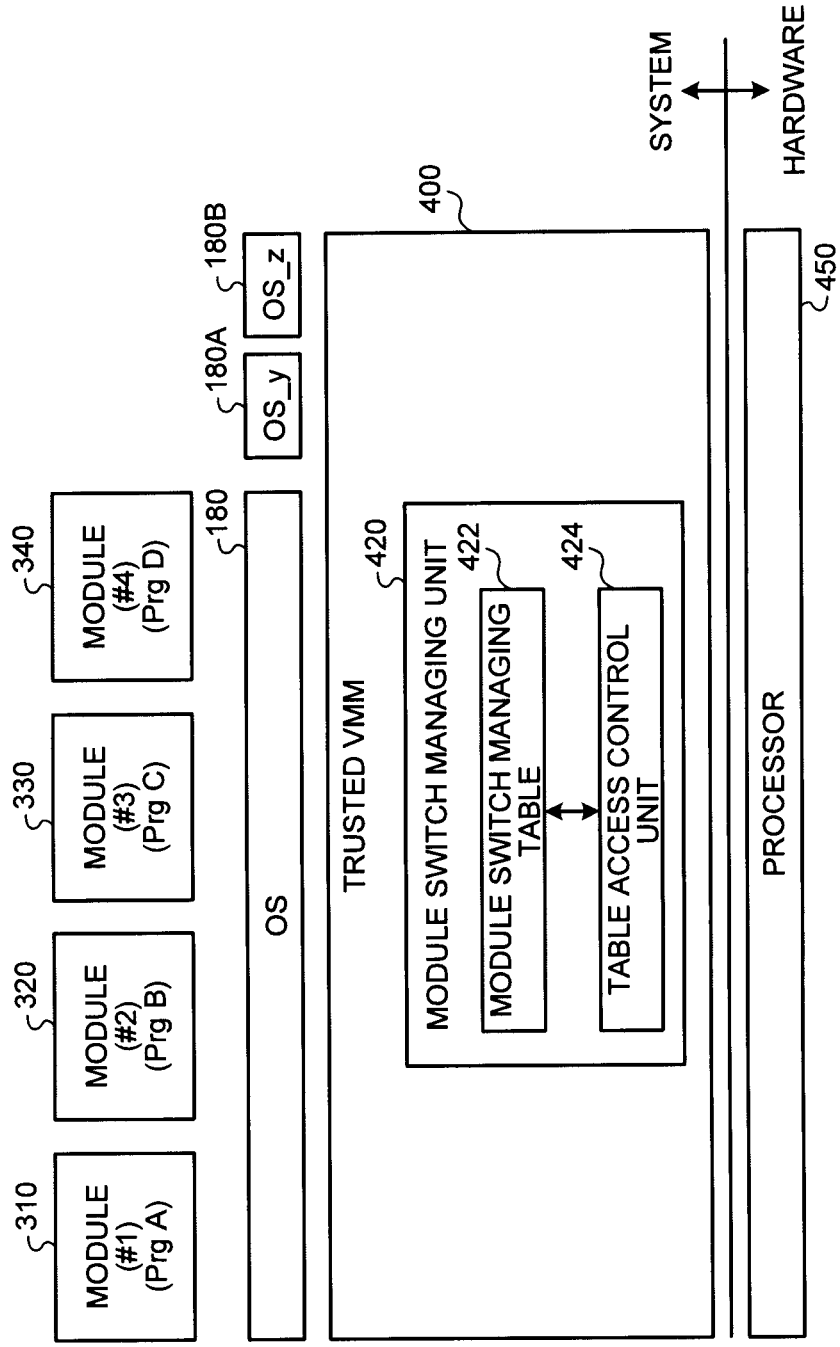
FIG. 28 is a diagram illustrating a configuration in which a virtual machine monitor is used.

Meanwhile, in the second embodiment, although the module switch managing unit 420 is disposed in the secure processor 400, that is not the only possible case. Alternatively, as illustrated in FIG. 28, a trusted virtual machine monitor (Trusted VMM) 440 can also be disposed with an identical configuration.

For example, it is possible to think of a configuration in which a processor 450 can be disposed as a commonly-used processor not including the module switch managing unit 420 that is unique to the second embodiment, and the module switch managing unit 420 is disposed inside the virtual machine monitor 440. Then, the module (#1) 310, the module (#2) 320, a module (#3) 330, and a module (#4) 340 can make use of the module switch managing unit 420 so that module switch can be performed in an identical manner to that described in the second embodiment. In the example illustrated in FIG. 28, a plurality of OSs (the OS 180, an OS_y 180A, and an OS_z 180B) run in the virtual machine monitor 440; and each module runs in the OS 180. Meanwhile, the module switch managing unit 420 need not be configured as hardware, but can also be configured in the OS.

Moreover, in the second embodiment, it is explained that all the values written in the module switch managing table 422 are stored in the secure processor 400. However, that is not the only possible case. Alternatively, only a part of the information written in the module switch managing table 422 can be stored in the secure processor 400, while the remaining part can be stored in the secure shared area 181 established in the memory 280 according to the first embodiment.

Furthermore, in the second embodiment, it is explained that, while accessing the module switch managing table 422, reading/writing is performed with respect to one field at a time. However, that is not the only possible case. For example, it is also possible to perform reading/writing with respect to a plurality of fields at one time.

Third Embodiment

Given below is the explanation regarding a third embodiment. According to the first and second embodiments described above, modules are called by performing a commonly-used calling operation. In contrast, in the third embodiment, the explanation is given for an example in which modules are called using language exceptions.

Herein, the explanation regarding language exceptions is given first. In the field of computers, the term "exceptions" points to two types, namely, hardware exceptions and language exceptions. A hardware exception points to an event such as a hardware interrupt or an unauthorized instruction. A hardware exception is handled by means of a processor mechanism such as transferring the control to an interrupt handler that handles hardware exceptions.

In contrast, a language exception points to an exceptional event such as not being able to find a file. Language exceptions are provided in programming language environments of C++, Java (registered trademark), or the like. A language exception is processed using a mechanism in which a caller function is traced from the function in which the language exception has occurred, and the control is transferred to an exception handler such as a library capable of handling that language exception. In the third embodiment, the explanation is given about the language exceptions.

Herein, a mechanism that handles such language exceptions is called a language exception handling mechanism. More particularly, in a language exception handling mechanism, the description of handling language exceptions is given not in a calling destination module but in a caller module, so that error handling can be performed in a manner tailored to the caller module. Such a mechanism is explained in "The Design and Evolution of C++" written by Bjarne Stroustrup. In a programming language environment of C or C++, the description is given in the try-catch format and is used in a number of applications. Thus, the language exception handling mechanism is a well-known mechanism.

Figure 29:
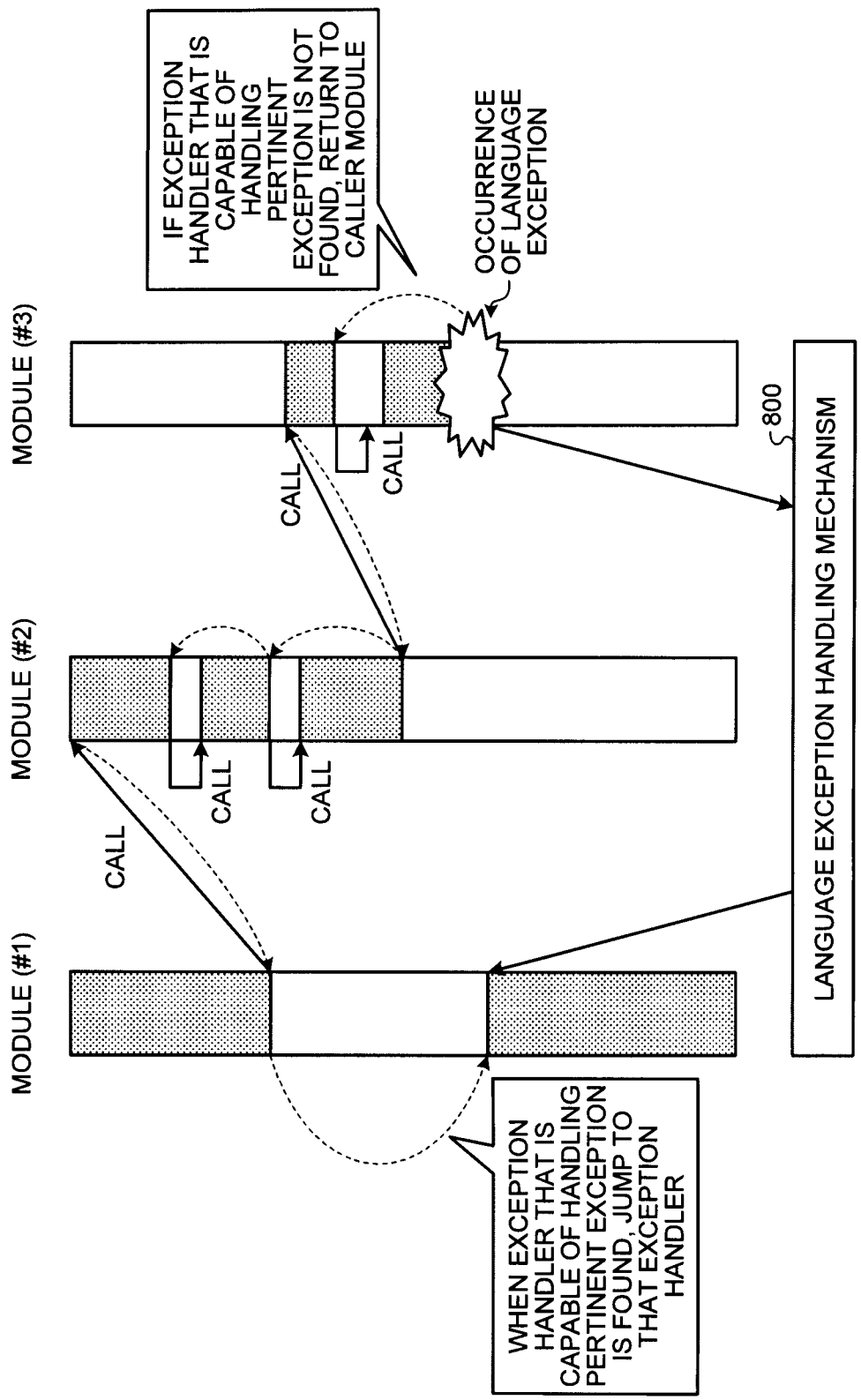
FIG. 29 is a diagram illustrating operations performed by a language exception handing mechanism.

FIG. 29 schematically illustrates operations performed by a language exception handling mechanism 800. When a language exception occurs in a function that is written in a module, the language exception handling mechanism 800 calls an exception handling library. Then, the exception handling library firstly searches for the exception handler capable of handling the language exception that has occurred. A search for the exception handler can be performed, for example, based on the type of language exception. If the intended exception handler is found, then the control is transferred to that exception handler. However, if the intended exception handler is not found, then function unwinding is performed.

Function unwinding points to the operation performed for returning to the caller function. Based on frame information specified in a stack; the stack is returned to a pre-calling state, the address of the caller is identified, and the control is transferred to that address. Upon returning to the caller function, the exception handling library searches for the exception handler capable of handling language exceptions. In this way, by performing function unwinding until the exception handler capable of handling language exceptions is found, the exception handling library tracks back to the caller function.

In the example illustrated in FIG. 29, the explanation is given for the following case: three modules, namely, a module #1, a module #2, and a module #3 are running; the module #2 and the module #3 are called in that order from the module #1; a language exception occurs while the module #3 is running; and the exception handler capable of catching that language exception is present in the module #1. In FIG. 29, solid lines represent the flow of execution of programs, and wavy lines represent the sequence of functions that are retrieved during function unwinding performed by the language exception handling mechanism 800.

When a language exception occurs in the module #3, the handling thereof is given over to the language exception handling mechanism 800. Firstly, the language exception handling mechanism 800 searches for the exception handler, which is a function written in the module #3 in which the language exception has occurred and which is capable of handling the language exception. In this example, since the exception handler capable of handling the language exception is not found, the language exception handling mechanism 800 performs function unwinding and returns to the caller function specified in the module #3. Then, in an identical manner, the language exception handling mechanism 800 searches for the exception handler in the caller function. Until the intended exception handler is found, the language exception handling mechanism 800 repeats the same operation.

In the example illustrated in FIG. 29, the language exception handling mechanism 800 returns from the module #3 to the module #2, and searches for the exception handler in the module #2. If the intended exception handler is not found in the module #2, then the language exception handling mechanism 800 returns from the module #2 to the module #1, and searches for the exception handler is performed in the module #1. In this example, after returning to the functions specified in the module #1, the exception handler capable of handling the language exception is retrieved. Once the exception handler is retrieved, the language exception handling mechanism 800 transfers the execution control to the exception handler that has been retrieved.

Consider the case when the handling of language exceptions by the language exception handling mechanism 800 is applied to the first embodiment or the second embodiment described above. As explained with reference to FIG. 3, in the secure processor, each module manages a separate stack. Hence, if function unwinding is performed within a module, the handling is different than the handling done when performing function unwinding across the modules. In the case of performing function unwinding within a module, the caller function of a particular function can be identified by inspecting the stack of that module as per normal. In contrast, in the case of performing function unwinding across the modules, since a stack in a different module cannot be directly inspected, it is not possible to identify the caller function. Consequently, in the secure processor assumed in the embodiment, if the configuration has a plurality of modules, then there are times when function unwinding performed by the language exception handling mechanism 800 of the conventional type does not function in a proper manner.

Figure 30:
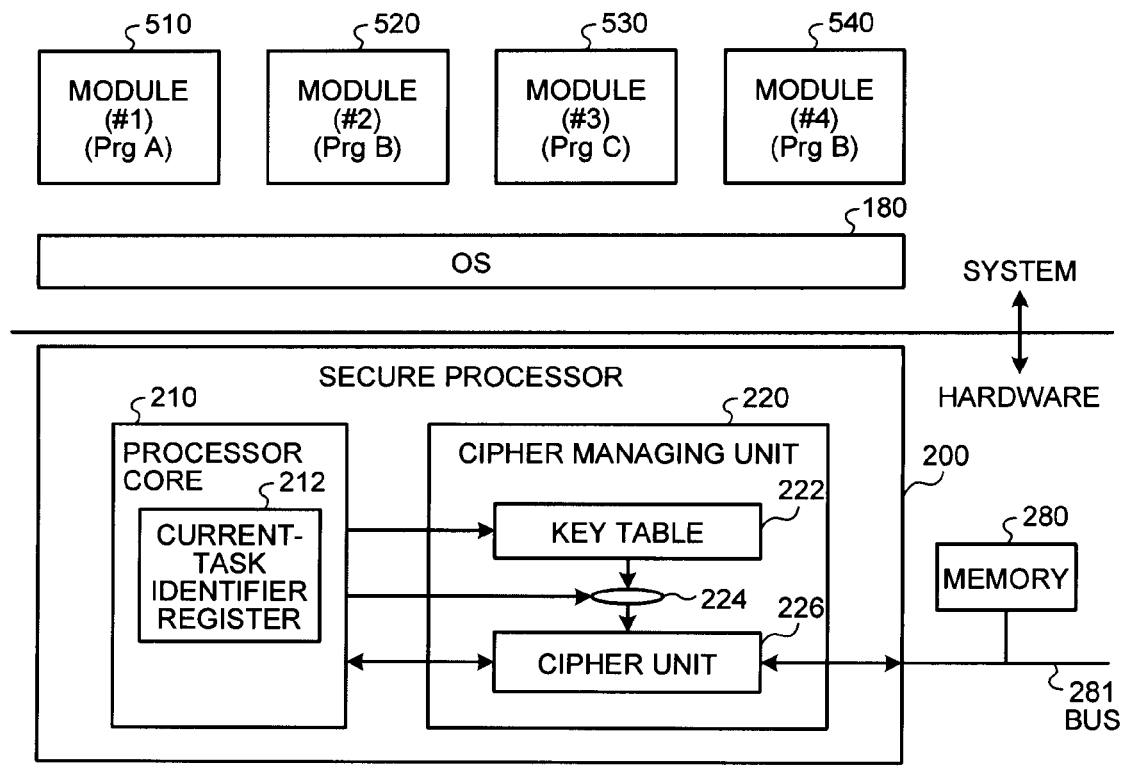
FIG. 30 is a diagram illustrating a configuration of a system that can be implemented in a third embodiment.

FIG. 30 is a schematic diagram of an exemplary configuration of a system that can be implemented in the third embodiment. In FIG. 30, an overall hardware configuration and a system view are illustrated at the same time. Meanwhile, in the description with reference to FIG. 30, the constituent elements identical to those illustrated in FIG. 1 are referred to by the same reference numerals and the explanation thereof is not repeated.

From the hardware perspective, a target system can have the same configuration as that explained with reference to FIG. 1. Hence, the explanation thereof is not repeated. In the target system, the single OS (operating system) 180 runs in the processor core 210 of the secure processor 200, and one or more modules run in the OS 180. In the example illustrated in FIG. 30, a plurality of modules, namely, a module (#1) 510, a module (#2) 520, a module (#3) 530, and a module (#4) 540 is running.

In the example illustrated in FIG. 30, it is indicated that the module (#1) 510 has a task identifier "#1" and is generated from a program A (Prg A). The module (#2) 520 has a task identifier "#2" and is generated from a program B (Prg B). The module (#3) 530 has a task identifier "#3" and is generated from a program C (Prg C). The module (#4) 540 has a task identifier "#4" and is generated from the program B (Prg B).

Figure 31:
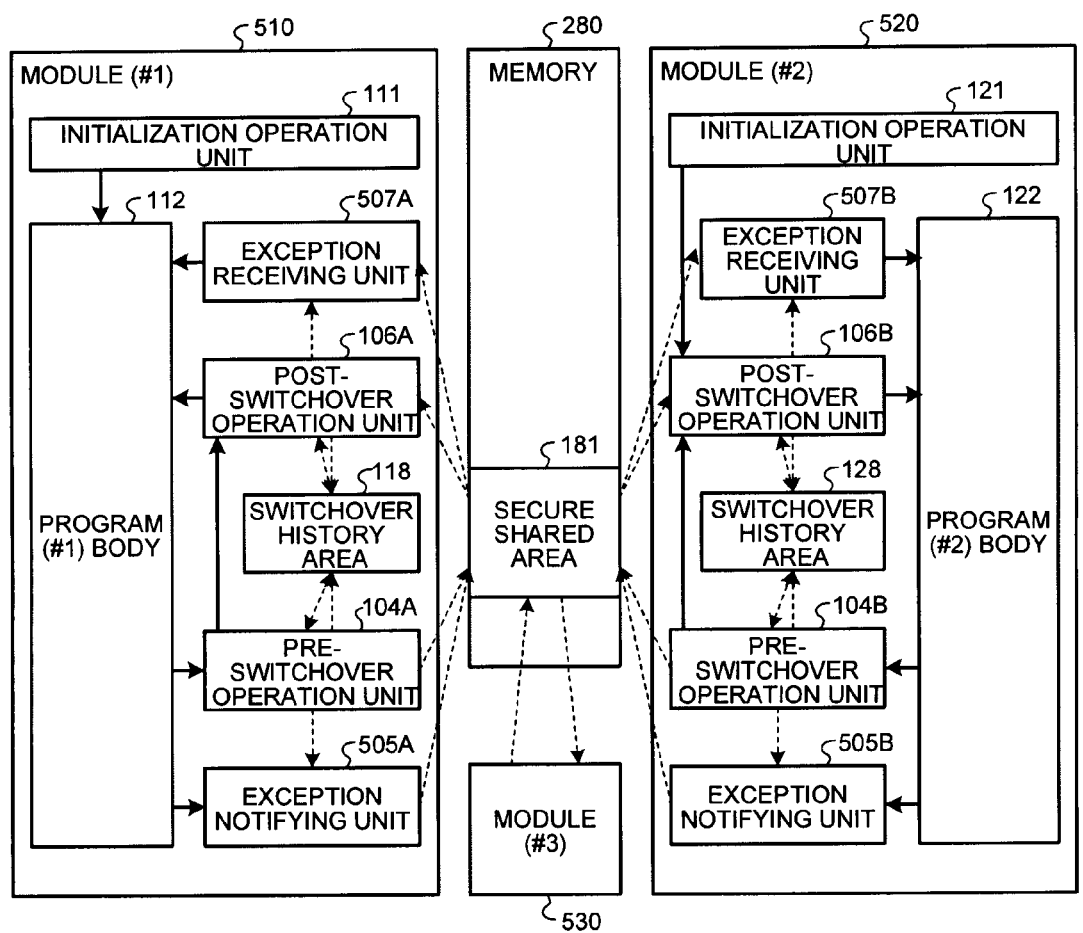
FIG. 31 is a functional block diagram of a module configuration according to the third embodiment.

FIG. 31 is a functional block diagram of an exemplary module configuration according to the third embodiment. In FIG. 31, the module (#1) 510, the module (#2) 520, and the module (#3) 530 run cooperatively, and each module includes a module switch mechanism according to the third embodiment. Herein, it is assumed that the module (#1) 510 is an application module, while the module (#2) 520 and the module (#3) 530 are library modules.

In an identical manner to the configuration illustrated in FIG. 4, the module (#1) 510 includes the initialization operation unit 111, the program (#1) body 112, the pre-switchover operation unit 104A, the post-switchover operation unit 106A, and the switchover history area 118. In addition, the module (#1) 510 also includes an exception notifying unit 505A and an exception receiving unit 507A. Similarly, the module (#2) 520 includes the initialization operation unit 121, the program (#2) body 122, the pre-switchover operation unit 104B, the post-switchover operation unit 106B, and the switchover history area 128. In addition, the module (#2) 520 also includes an exception notifying unit 505B and an exception receiving unit 507B, which respectively perform the same operations as the operations performed by the exception notifying unit 505A and the exception receiving unit 507A of the module (#1) 510. Moreover, the secure shared area 181 in the memory 280 is shared between the module (#1) 510 and the module (#2) 520 that run cooperatively.

Although not illustrated in detail in FIG. 31, the module (#3) 530 also has the same configuration as that of the module (#1) 510 and the module (#2) 520. Besides, the module (#3) also shares the secure shared area 181 in the memory 280 with the module (#1) 510 and the module (#2) 520.

Figure 32:
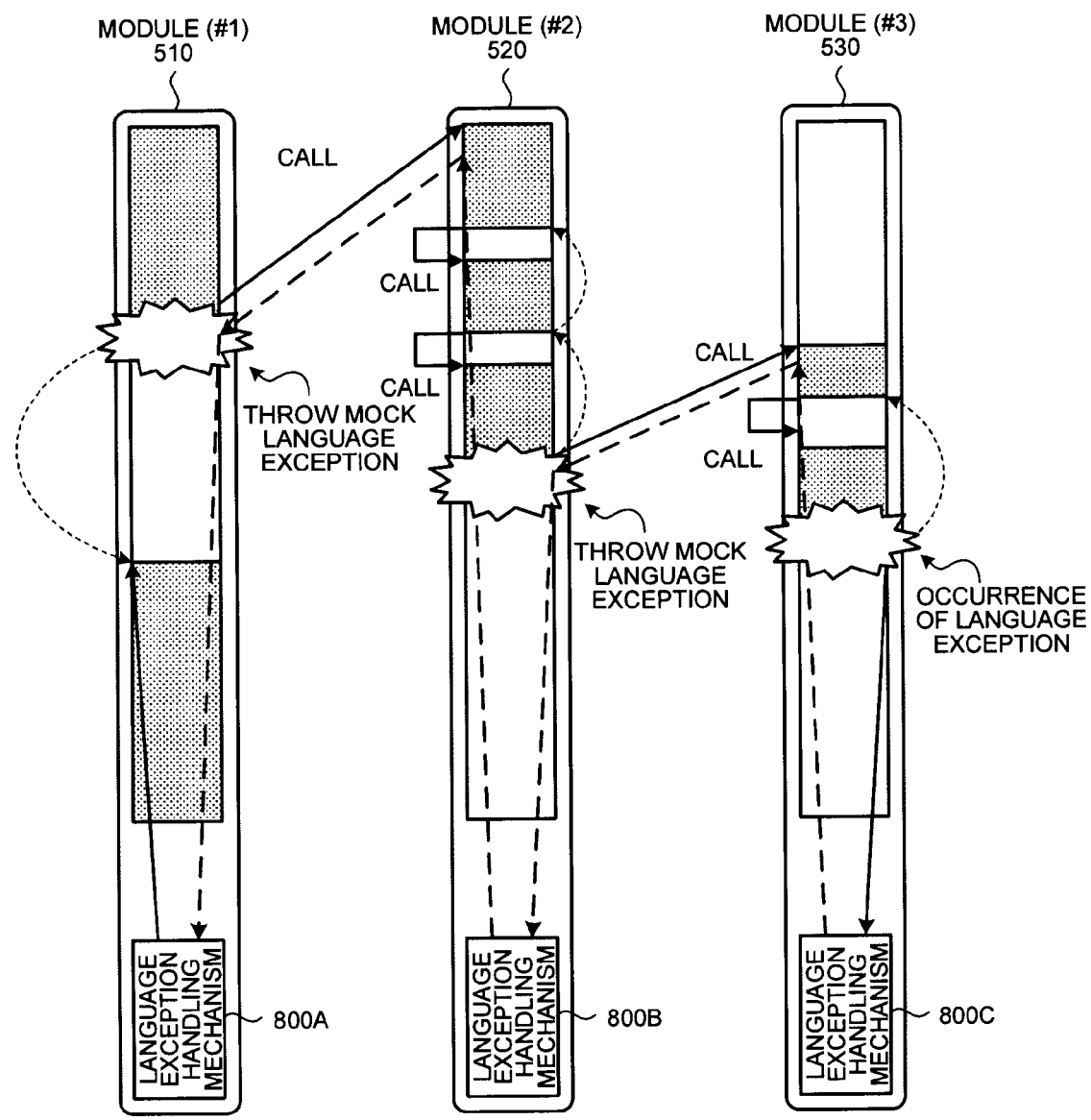
FIG. 32 is a diagram illustrating the handling of a language exception according to the third embodiment.

FIG. 32 schematically illustrates an example of the handling of a language exception that occurs among the modules to which the third embodiment is applied. In FIG. 32, long-dashes lines illustrate the flow of execution of programs that are generated by applying the third embodiment.

In the following explanation with reference to FIG. 32, the module (#1) 510, the module (#2) 520, and the module (#3) 530 run cooperatively; and the module (#1) 510 calls the module (#3) 530 via the module (#2) 520. Herein, the explanation is given for the following example: a language exception occurs in the module (#3) 530 that has been called by the module (#2) 520; and function unwinding is performed until an exception handler is found in the module (#1) 510. Meanwhile, the module (#1) 510, the module (#2) 520, and the module (#3) 530 respectively include a language exception handling mechanism 800A, a language exception handling mechanism 800B, and a language exception handling mechanism 800C.

In the third embodiment, function unwinding across the modules is carried out by performing an operation that is slightly modified from the operation of switching modules according to the first embodiment. As far as the initialization operation is concerned, the operations explained with reference to FIG. 7 and FIG. 8 can be performed without modification. Hence, that explanation is not repeated. As a result of performing the initialization operation, the module (#1) 510, the module (#2) 520, and the module (#3) become able to share the secure shared area 181 that is established in the memory 280.

Moreover, in the third embodiment, in a normal state when no language exception has occurred, regarding the operations performed while a module calls another module and regarding the operations performed while the module that had called the other module returns to running, the operations explained with reference to FIG. 6 to FIG. 10 according to the first embodiment can be performed without modification. Hence, that explanation is not repeated.

Figure 33:
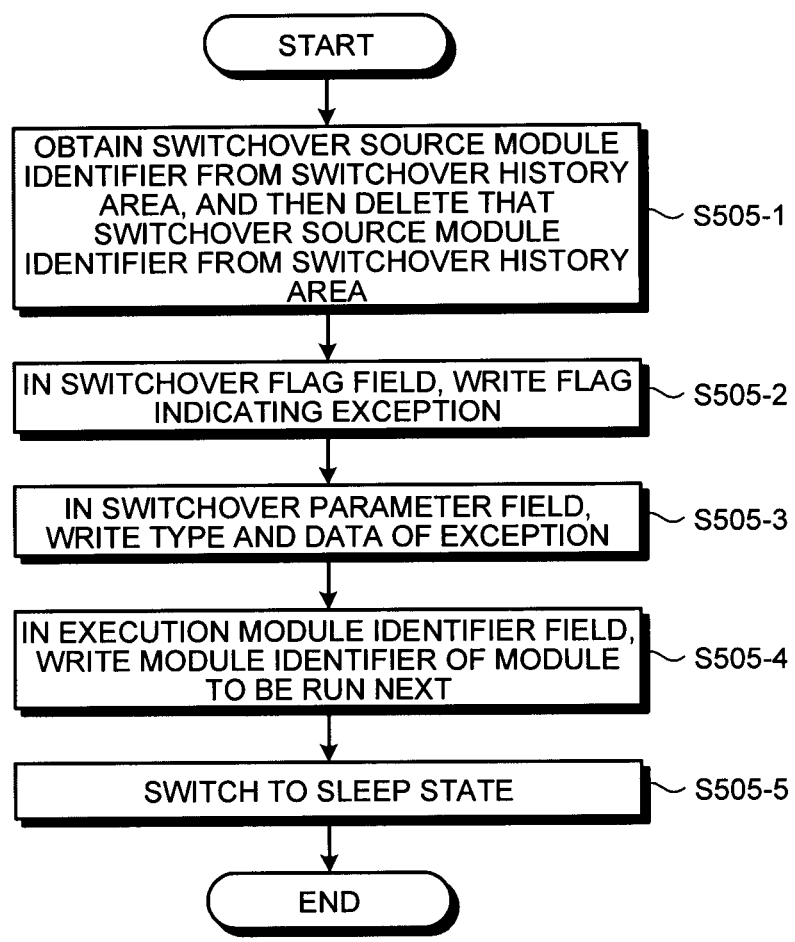
FIG. 33 is a flowchart for explaining an exception notifying operation according to the third embodiment.
Figure 34:
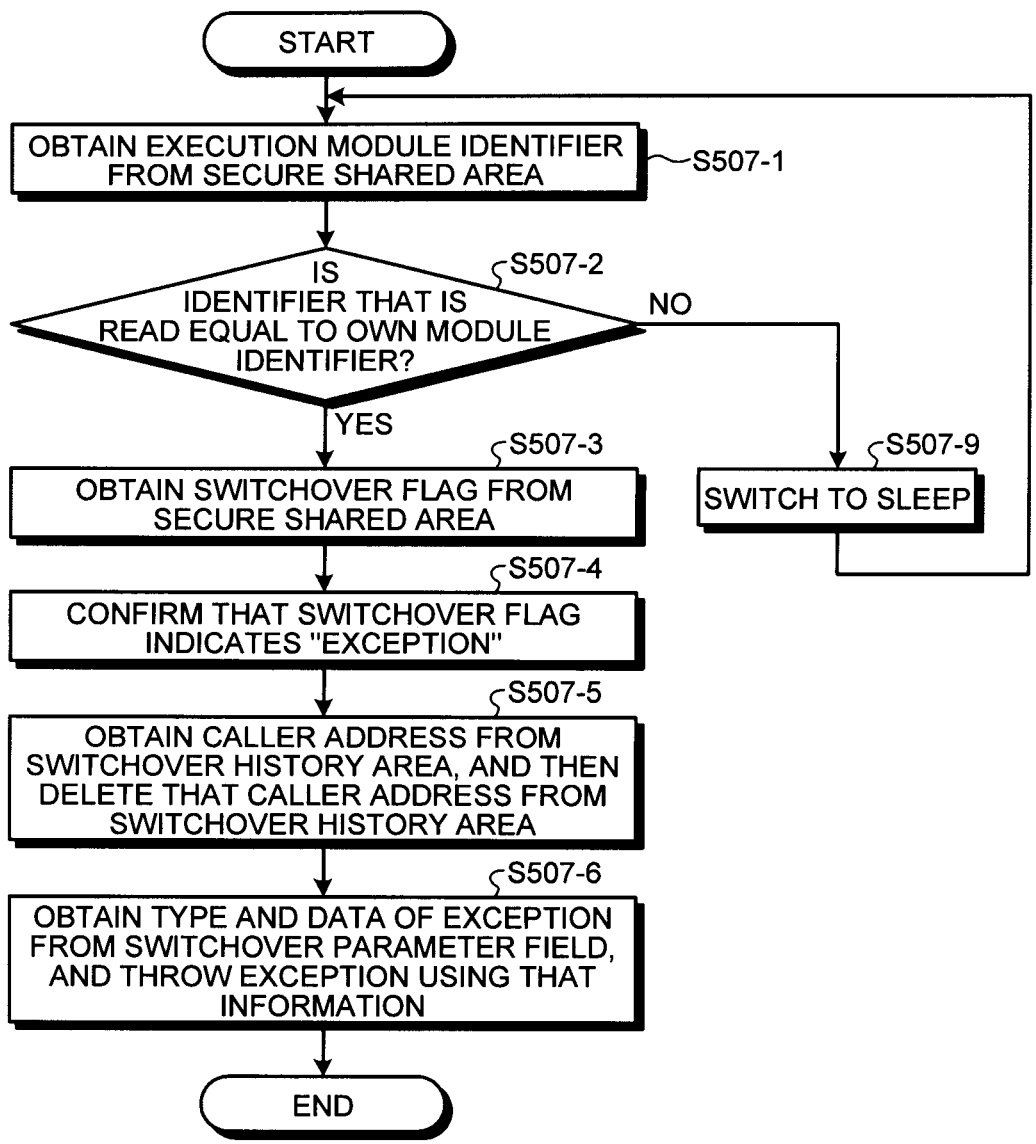
FIG. 34 is a flowchart for explaining an exception receiving operation according to the third embodiment.
Figure 35:
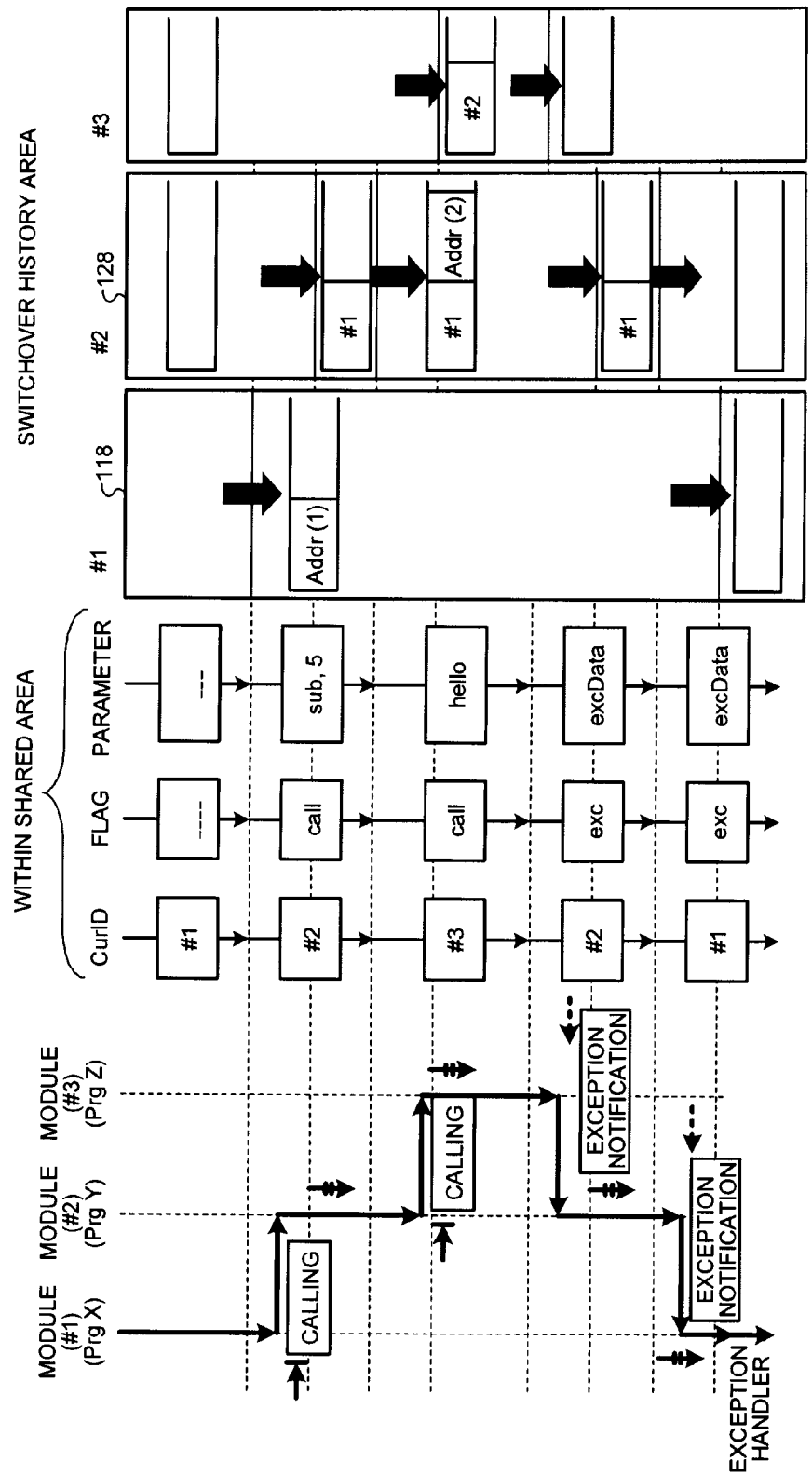
FIG. 35 is a diagram illustrating changes occurring in the state of a secure shared area and in the states of switchover history areas.

Given below with reference to FIG. 33 to FIG. 35 is the explanation of the operations performed while performing function unwinding across the modules. FIG. 33 is a flowchart for explaining an exemplary exception notifying operation according to the third embodiment. FIG. 34 is a flowchart for explaining an exemplary exception receiving operation according to the third embodiment.

FIG. 35 corresponds to FIG. 11 described above and schematically illustrates an overview of the changes occurring in the state of the secure shared area 181 and in the states of the switchover history areas of the module (#1) 510, the module (#2) 520, and the module (#3) 530 as a result of performing the calling operation, the returning operation, the language exception notifying operation, and the language exception receiving operation in the case when a language exception occurs.

Since the time of sequential calling of modules from the module (#1) 510 up to the transfer of execution rights to the module (#3) 530, the state of the secure shared area 181 and the states of the switchover history areas change in an identical manner to that explained with reference to FIG. 11 according to the first embodiment. In the example illustrated in FIG. 35, immediately after the initialization operation is performed, only the execution module identifier "#1" is stored in the secure shared area 181. Moreover, no information is stored in any switchover history area.

In such a state, when the module (#2) 520 is called, the execution module identifier "#2" gets stored in the execution module identifier field 182 of the secure shared area 181; the switchover flag "call" gets stored in the switchover flag field 183 of the secure shared area 181; and the switchover parameters "sub" and "5" get stored in the switchover parameter field 184 of the secure shared area 181. Besides, the caller address Addr1 gets stored in the switchover history area 118, and the module identifier "#1" gets stored in the switchover history area 128. However, no information is stored in the switchover history area of the module (#3) 530.

When the module (#3) 530 is called, the execution module identifier "#3" gets stored in the execution module identifier field 182 of the secure shared area 181; the switchover flag "call" gets stored in the switchover flag field 183 of the secure shared area 181; and a function name "hello" gets stored as the switchover parameter in the switchover parameter field 184 of the secure shared area 181. Besides, the caller address Addr1 get stored in the switchover history area 118; the module identifier "#1" and a caller address Addr2 gets stored in the switchover history area 128; and the module identifier "#2" gets stored in the switchover history area of the module (#3) 530.

With reference to FIG. 33, when a language exception occurs in the module (#3) 530, in an identical manner to the case of a normal language exception, the control is transferred to the language exception handling mechanism 800C of the module (#3) 530. Then, starting from the function in which the language exception has occurred, the language exception handling mechanism 800C searches for the exception handler capable of handling that language exception. As an example, the language exception handling mechanism 800C can search for the exception handler based on the type of language exception that has occurred.

In the example illustrated in FIG. 32, the language exception handling mechanism 800C cannot find the exception handler in the function in which the language exception has occurred. Hence, the language exception handling mechanism 800C performs function unwinding to return to the caller function within the module (#3) 530 and searches for the exception handler in the caller function. In this example, since the exception handler is not found in the caller function as well, the language exception handling mechanism 800C transfers the control to the exception notifying unit of the module (#3) 530. Then, the exception notifying unit 505 performs an operation to return to the module (#2) 520 that had called the module (#3) 530.

In FIG. 33, at Step S505-1, from the switchover history area of the module (#3) 530, the exception notifying unit of the module (#3) 530 obtains the module identifier "#2" that was stored at the time when the module (#3) 530 was called by the switchover source module (i.e., the unwinding destination module). Then, the exception notifying unit of the module (#3) 530 deletes the module identifier "#2" from the switchover history area of the module (#3) 530.

Subsequently, at Step S505-2, in the switchover flag field 183 of the secure shared area 181, the module (#3) 530 writes a switchover flag "exception" indicating that the reason for switching over to the module (#2) 520 is "language exception". In other words, it can be said that the switchover flag "exception" represents a value indicating a case other than a normal call or a normal return.

Then, at Step S505-3, in the switchover parameter field 184 of the secure shared area 181, the module (#3) 530 writes language exception information "excData", which contains the type of language exception, contains the contents of language exception, and contains a message. That is, the language exception information "excData" represents information that indicates the details regarding the reason for module switch.

Subsequently, at Step S505-4, in the execution module identifier field 182 of the secure shared area 181, the module (#3) 530 writes the module identifier "#2" indicating the unwinding destination module. Then, at Step S505-5, the module (#3) 530 prepares itself for a case of being called again later, stops performing operations just prior to the post-switchover operation, and goes into the sleep state.

Once the module (#3) 530 goes into the sleep state at Step S505-5, the module running rights are switched over to the OS 180. Then, because of the scheduler of the OS 180, the module running rights are transferred to the module (#2) 520. With that, the module (#2) 520 resumes running.

At that point of time, as illustrated in FIG. 35, the execution module identifier "#2", the switchover flag "exception" (in FIG. 35, abbreviated as "exc"), and the switchover parameter "excData" are stored in the secure shared area 181. Moreover, the caller module address Addr1 is stored in the switchover history area 118; while the caller module address Addr2 and the module identifier "#1" are stored in the switchover history area 128. However, no information is stored in the switchover history area of the module (#3) 530.

Once the module (#2) 520 receives, by means of an interrupt, an exception notification from the exception notifying unit of the module (#3) 530; the control is transferred to the exception receiving unit 507B of the module (#2) 520.

With reference to FIG. 34, the exception receiving unit 507B obtains the execution module identifier from the execution module identifier field 182 of the secure shared area 181 (Step S507-1). Then, at Step S507-2, it is determined whether or not the value of the execution module identifier that is obtained matches with the module identifier "#2" of the module (#2) 520. If it is determined that the value of the execution module identifier does not match with the module identifier "#2" of the module (#2) 520, the system control proceeds to Step S507-9, and the module (#2) 520 goes into the sleep state and waits for being called again later. When the module (#2) 520 is called, the system control returns to Step S507-1 and the operations are started again.

On the other hand, if it is determined that the value of the execution module identifier matches with the module identifier "#2" of the module (#2) 520, the system control proceeds to Step S507-3. In this example, the execution module identifier "#2" is stored in the execution module identifier field 182 of the secure shared area 181. Since that value matches with the module identifier "#2" of the module (#2) 520, it can be determined that the module (#2) 520 is to be run. Thus, the system control proceeds to Step S507-3.

At Step S507-3, from the switchover flag field 183 of the secure shared area 181, the module (#2) 520 retrieves the switchover flag. Then, at Step S507-4, the module (#2) 520 confirms whether or not the switchover flag has the value "exception" indicating an exception.

Once it is confirmed that the switchover flag has the value "exception" indicating an exception; then, at Step S507-5, the module (#2) 520 obtains the caller address Addr2 from the switchover history area 128, and then deletes the caller address Addr2 from the switchover history area 128.

Subsequently, at Step S507-6, the module (#2) 520 obtains the language exception information "excData" from the switchover parameter field 184 of the secure shared area 181 and throws a mock language exception to the caller address Addr2 using the language exception information "excData".

Upon issuing the language exception, the module (#2) 520 transfers the control to the language exception handling mechanism 800B of the module (#2) 520. Then, within the module (#2) 520, the language exception handling mechanism 800B searches for the exception handler capable of handling the language exception that has occurred. If the exception handler is found, the language exception is handled by that exception handler. On the other hand, if the exception handler is not found, function unwinding is performed. In this example, since the language exception handling mechanism 800B cannot find the exception handler within the module (#2) 520, the control is transferred to the exception notifying unit 505B.

Then, in an identical manner to the case of notifying the occurrence of a language exception from the module (#3) 530 to the module (#2) 520, the exception notifying unit 505B notifies the occurrence of a language exception from the module (#2) 520 to the module (#1) 510. Once the occurrence of a language exception is notified to the module (#1) 510, the execution control is transferred to the module (#1) 510. In the exception receiving unit 507A of the module (#1) 510, a mock language exception is thrown.

At that point of time, as illustrated in FIG. 35, the execution module identifier "#1", the switchover flag "exception", and the switchover parameter "excData" that are written during the exception notifying operation are stored in the secure shared area 181. However, no information is stored in any switchover history area.

Once the language exception is thrown, the control is transferred to the language exception handling mechanism 800A of the module (#1) 510. Then, in an identical manner as described above, the language exception handling mechanism 800A searches for the exception handler capable of handling the language exception that has occurred. When the exception handler is found, the control is transferred to that exception handler.

In this way, even among the modules that are protected with separate contexts and even if the context in other modules cannot be directly manipulated; by adding a language exception handling operation before and after switching over to a module, it becomes possible to perform function unwinding for language exceptions.

Meanwhile, in the third embodiment, the exception notifying unit and the pre-switchover operation unit are configured to be independent of each other. However, that is not the only possible case. Alternatively, it is possible to configure the pre-switchover operation unit to also have the functions of the exception notifying unit. That is, in the pre-switchover operation unit, in the case of normal calling, the normal pre-switchover operation is performed; and in the case of calling due to a language exception, the operations are performed according to the functions of the exception notifying unit.

Similarly, in the third embodiment, the exception receiving unit and the post-switchover operation unit are configured to be independent of each other. However, that is not the only possible case. Alternatively, it is possible to configure the post-switchover operation unit to also have the functions of the exception receiving unit. That is, during the post-switchover operation, in the case of normal calling, the normal post-switchover operation is performed; and in the case of calling due to a language exception, the operations are performed according to the functions of the exception receiving unit.

Moreover, in the third embodiment, it is explained that each module independently holds a language exception handling mechanism. However, that is not the only possible case. For example, instead of each module holding a language exception handling mechanism, the configuration can be such that a platform on which the modules run includes a language exception handling mechanism, and each module generates an instance of that language exception handling mechanism and implements the instance.

Furthermore, in the third embodiment, it is explained that, in order to search for the exception handler, each module calls a language exception handling mechanism by issuing a mock language exception. However, that is not the only possible case. For example, alternatively, the exception receiving unit of each module can explicitly call a language exception handling mechanism using a command such as the call command.

Fourth Embodiment

Given below is the explanation of a fourth embodiment. In the fourth embodiment, the explanation is given regarding the operations corresponding to the function setjmp and the function longjmp that are provided in the C library. The function setjmp and the function longjmp are provided to enable execution of a mechanism for jumping to the outside of a function.

Figure 36:
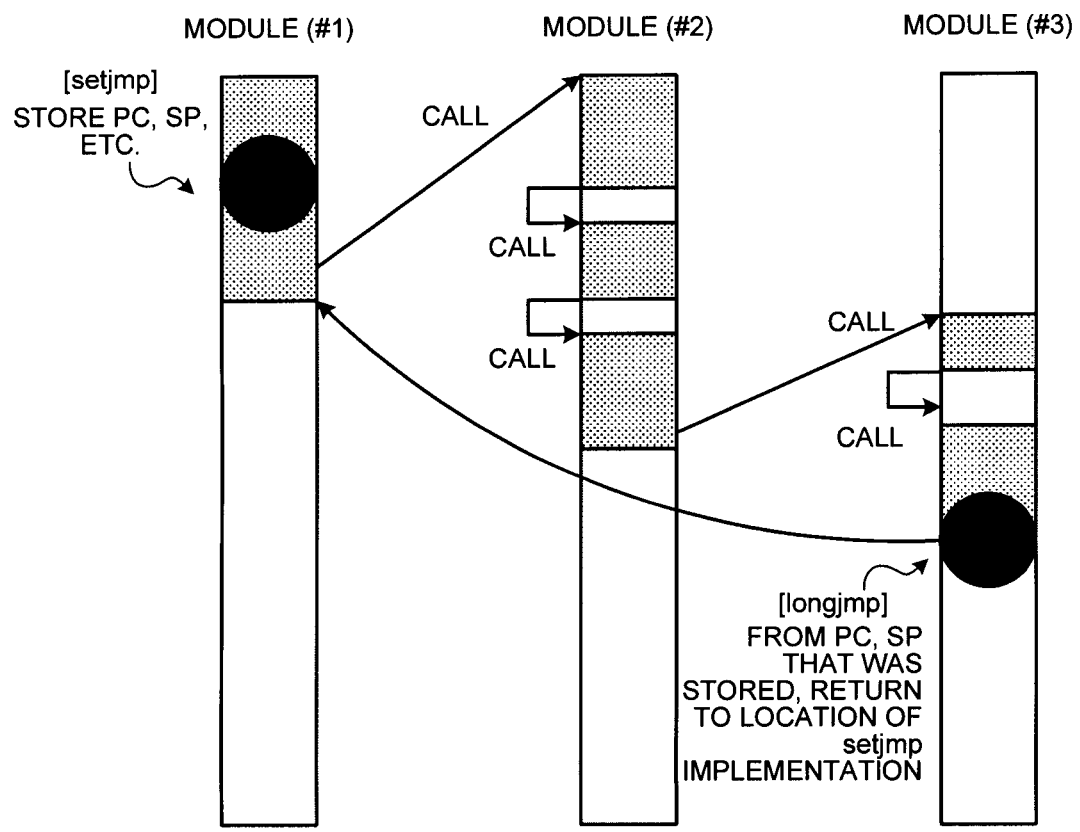
FIG. 36 is a diagram illustrating an example of operations performed using functions setjmp and longjmp.

FIG. 36 schematically illustrates an example of operations performed using the functions setjmp and longjmp. In the example illustrated in FIG. 36, three modules, namely, modules #1 to #3 are running; and the module #2 and the module #3 are called in that order from the module #1. While the module #1 is running, the function setjmp is executed; and while the module #3 is running, the function longjmp is executed.

The function setjmp holds context information, such as the program counter or the stack pointer, of the location at which the function setjmp is executed. The function longjmp refers to the context information stored in the function setjmp, and returns to the state just prior to executing the function setjmp. In the example illustrated in FIG. 36, in the function setjmp, the state just prior to executing the function setjmp in the module #1 is stored. In the function longjmp, the module #3 returns to the module #1, and the state of the module #1 is restored. In this way, the mechanism for jumping to the outside of a function is realized by obtaining the context information of the return destination and by overwriting the current context with the obtained context information.

In the secure processor assumed in the embodiment, as explained with reference to FIG. 3, each module manages a stack (context) in an independent manner. Hence, the mechanism for jumping to the outside of functions across the modules does not function in a proper manner.

This point is explained in more detail. In the case of executing the functions setjmp and longjmp within a module; typically, the context information can be obtained using the function setjmp, and a switchover to that context can be done using the function longjmp. However, in the case of executing the functions setjmp and longjmp across the modules; if the modules are managing contexts independent of each other, then it is not possible to directly overwrite the context of a different module. Hence, on the presumption that the modules manage contexts independent of each other, there are times when it is not possible to switch over to the context obtained using the function setjmp.

Herein, the modules manage the contexts independent of each other. Hence, in the case of performing context switchover using the function longjmp; all those modules which are called from the function setjmp prior to the execution of the function longjmp need to be returned to the states just prior to the execution of the function setjmp on the contexts. That is done to avoid a case in which, if the function longjmp is used to modify the context in only the module in which the function setjmp is executed, then the other modules happen to have the contexts at the stage of executing the function longjmp.

In the fourth embodiment, the functions setjmp and longjmp are executed among the modules that manage the contexts in an independent manner. In the fourth embodiment, a set of context information is managed using a module identifier and using a unique context number assigned to the context, but the context information is not directly communicated among the modules. Since it is highly likely that a set of context information contains information that needs to be kept confidential from other modules, the module identifiers and the context numbers are used in place of the context information.

In the fourth embodiment in which a secure processor is used, a context registering operation that is equivalent to the function setjmp is performed so as to register the current contexts and to obtain context numbers indicating context information. Moreover, a context setting operation that is equivalent to the function longjmp is performed so as to specify a module identifier and a context number for the purpose of setting the contexts in the registered context information.

Figure 37:
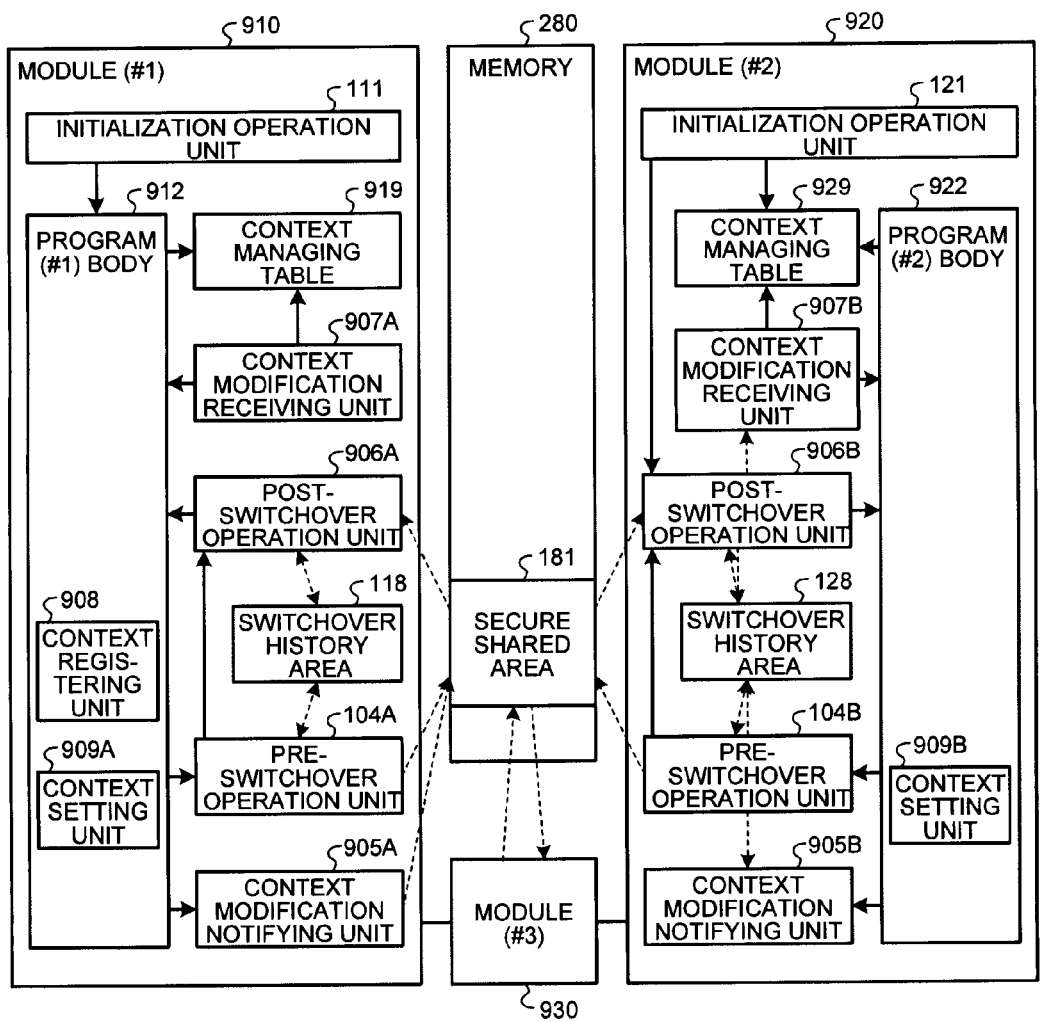
FIG. 37 is a functional block diagram of a module configuration according to a fourth embodiment.

FIG. 37 is a functional block diagram of an exemplary module configuration according to the fourth embodiment. In the description with reference to FIG. 37, the constituent elements identical to those according to the first embodiment are referred to by the same reference numerals and the explanation thereof is not repeated. Moreover, as far as the hardware configuration including a secure processor is concerned, the configuration explained with reference to FIG. 1 can be applied without modification. Hence, the explanation thereof is not repeated.

With reference to FIG. 37, a module (#1) 910 as well as a module (#2) 920 include a module switch mechanism according to the fourth embodiment. Herein, it is assumed that the module (#1) 910 is an application module and the module (#2) 920 is a library module. Along with a module (#3) 930 described later, the module (#1) 910 and the module (#2) 920 run cooperatively with each other.

In an identical manner to the configuration illustrated in FIG. 4, the module (#1) 910 includes the initialization operation unit 111, a program (#1) body 912, the pre-switchover operation unit 104A, and the switchover history area 118. In addition, the module (#1) 910 includes a post-switchover operation unit 906A that performs somewhat different operations than the post-switchover operation unit 106A illustrated in FIG. 4. Moreover, the module (#1) 910 also includes a context modification notifying unit 905A, a context modification receiving unit 907A, and a context managing table 919.

Similarly, the module (#2) 920 includes the initialization operation unit 121, a program (#2) body 922, the pre-switchover operation unit 104B, and the switchover history area 128. In addition, the module (#2) 920 includes a post-switchover operation unit 906B that performs somewhat different operations than the post-switchover operation unit 106B illustrated in FIG. 4. Moreover, the module (#2) 920 also includes a context managing table 929, as well as includes a context modification notifying unit 905B and a context modification receiving unit 907B that respectively perform the same operation performed by the context modification notifying unit 905A and the context modification receiving unit 907B of the module (#1) 910.

The program (#1) body 912 of the application module includes a context registering unit 908 and a context setting unit 909A. In contrast, the module (#2) 920 includes only a context setting unit 909B but not the context registering unit 908, in the program (#2) body 922. The same is the case regarding the module (#3) 930 that also functions as a library module. Meanwhile, the context registering unit 908 is equivalent to the function setjmp, and the context setting unit 909A is equivalent to the function longjmp.

Although not illustrated in detail in FIG. 37, the module (#3) 930 also has the same configuration as the module (#1) 910 and the module (#2) 920. The module (#1) 910, the module (#2) 920, and the module (#3) 930 share the secure shared area 181 established in the memory 280.

FIG. 38 illustrates an exemplary data configuration of the context managing table 919, the context managing table 929, and a context managing table (not illustrated) of the module (#3) 930. In the following explanation, unless otherwise specified, the context managing table 919, the context managing table 929, and the context managing table (not illustrated) of the module (#3) 930 are representatively explained as a context managing table.

In a context managing table, with context numbers serving as indices, n number of entries having indices from "#1" to "#n" are written. Each entry contains a module identifier field and a context information field. In the context information field, the program counters or the stack pointers are stored as context information.

Explained below with reference to FIG. 39 to FIG. 44 are the operations performed for context registration/context setting according to the fourth embodiment. Herein, the explanation is given for the following example: context registration is performed in the module (#1) 910; the module (#2) 920 is called from the module (#1) 910; the module (#3) 930 is called from the module (#2) 920; and context setting is performed in the module (#3) 930. Meanwhile, as far as the initialization operation is concerned, the operations explained with reference to FIG. 7 and FIG. 8 can be performed without modification. Hence, that explanation is not repeated.

Figure 39:
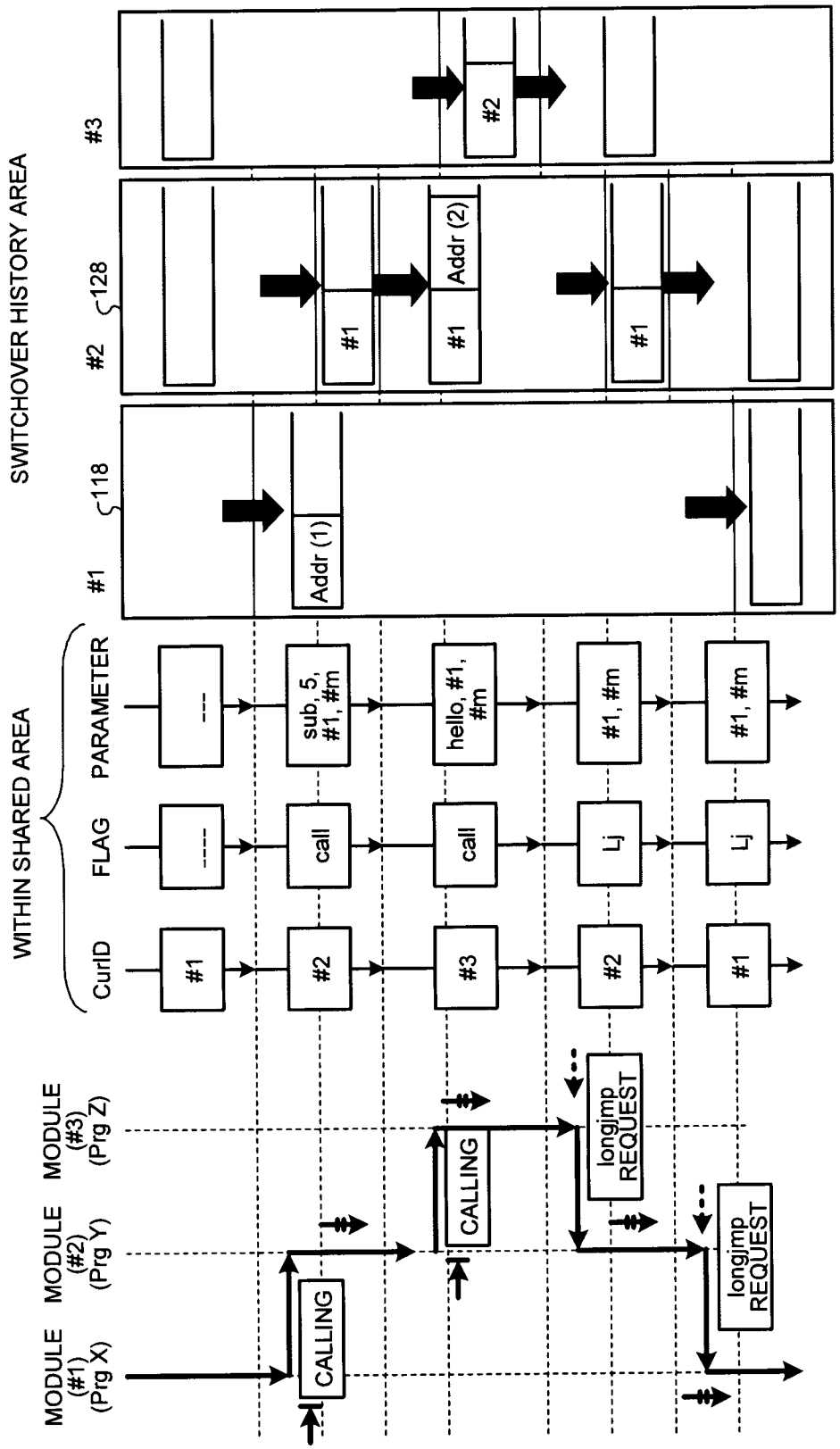
FIG. 39 is a diagram illustrating changes occurring in the state of a secure shared area and in the states of switchover history areas.

FIG. 39 corresponds to FIG. 11 described above and schematically illustrates an overview of the changes occurring in the state of the secure shared area 181, in which context registration/context setting is performed, and changes occurring in the states of the switchover history areas of the module (#1) 910, the module (#2) 920, and the module (#3) 930. At the point of time when the initialization operation is complete, the execution module identifier "#1" gets stored in the execution module identifier field 182 of the secure shared area 181. However, no information is stored in the switchover flag field 183 and the switchover parameter field 184 of the secure shared area 181. Moreover, no information is stored in the switchover history areas of the module (#1) 910, the module (#2) 920, and the module (#3) 930.

Figure 40:
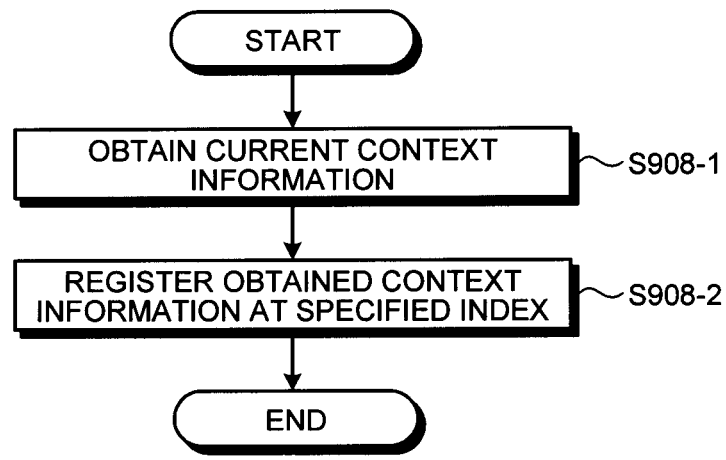
FIG. 40 is a flowchart for explaining a context registering operation according to the fourth embodiment.

The following explanation is given regarding the context registering operation. FIG. 40 is a flowchart for explaining an example of the context registering operation according to the fourth embodiment. In the module (#1) 910, the execution of the program (#1) body 912 starts. Then, in order to perform the operations equivalent to the function setjmp, the module (#1) 910 transfers the control to the context registering unit 908. At Step S908-1, the context registering unit 908 obtains current context information C in an identical manner when the commonly-used function setjmp is executed.

Then, at Step S908-2, the context registering unit 908 decides on a context number "#m" of an empty entry in the context managing table 919, and sends the context number "#m" back to the module (#1) 910. Subsequently, the context registering unit 908 stores the context information C, which has been obtained at Step S908-1, in the context information field of the entry having the context number "#m" in the context managing table 919.

In the commonly-used functions setjmp and longjmp, the contexts are directly transferred to other modules. In contrast, in the fourth embodiment, the contexts are managed using the context managing table, and only context setting information is transferred to other modules. Herein, when a set of context information is registered in the context managing table; the context setting information contains the module identifier, which is used in identifying the module to which the registered context belongs, and contains the context number, which is determined by the context registering unit 908.

In the fourth embodiment, while performing context setting, a module does not directly specify the context information but specifies the context setting information.

The following explanation is given regarding the calling operation performed to call a module. When context registration in the module (#1) 910 is complete, the module (#1) 910 calls the module (#2) 920 and in turn the module (#2) 920 calls the module (#3) 930. Herein, the operations performed by the pre-switchover operation unit 104A are identical to the operations explained with reference to FIG. 9. Hence, the explanation thereof is not repeated.

As a result of performing the pre-switchover operation, the caller address Addr1, the switchover flag "call" indicating the calling operation, and the execution module identifier "#2" indicating the execution module are respectively written in a call address field Addr1, the switchover flag field 183 of the secure shared area 181, and the execution module identifier field 182 of the secure shared area 181.

In the switchover flag field 183 of the secure shared area 181, the function name "sub" and the parameter "5" of the function in the calling destination module are written as the switchover parameters. In addition to that, according to the fourth embodiment, in the switchover flag field 183 of the secure shared area 181, the context setting information is also written. That is, the module identifier "#1", which indicates the module in which context registration is performed, and the context number "#m" are written in the switchover flag field 183 of the secure shared area 181. As a result, in the calling destination module, it becomes possible to perform context setting.

By performing the pre-switchover operation and the post-switchover operation, the module identifier "#1" and the context number "#m" are sequentially transferred to the calling destination module.

Figure 41:
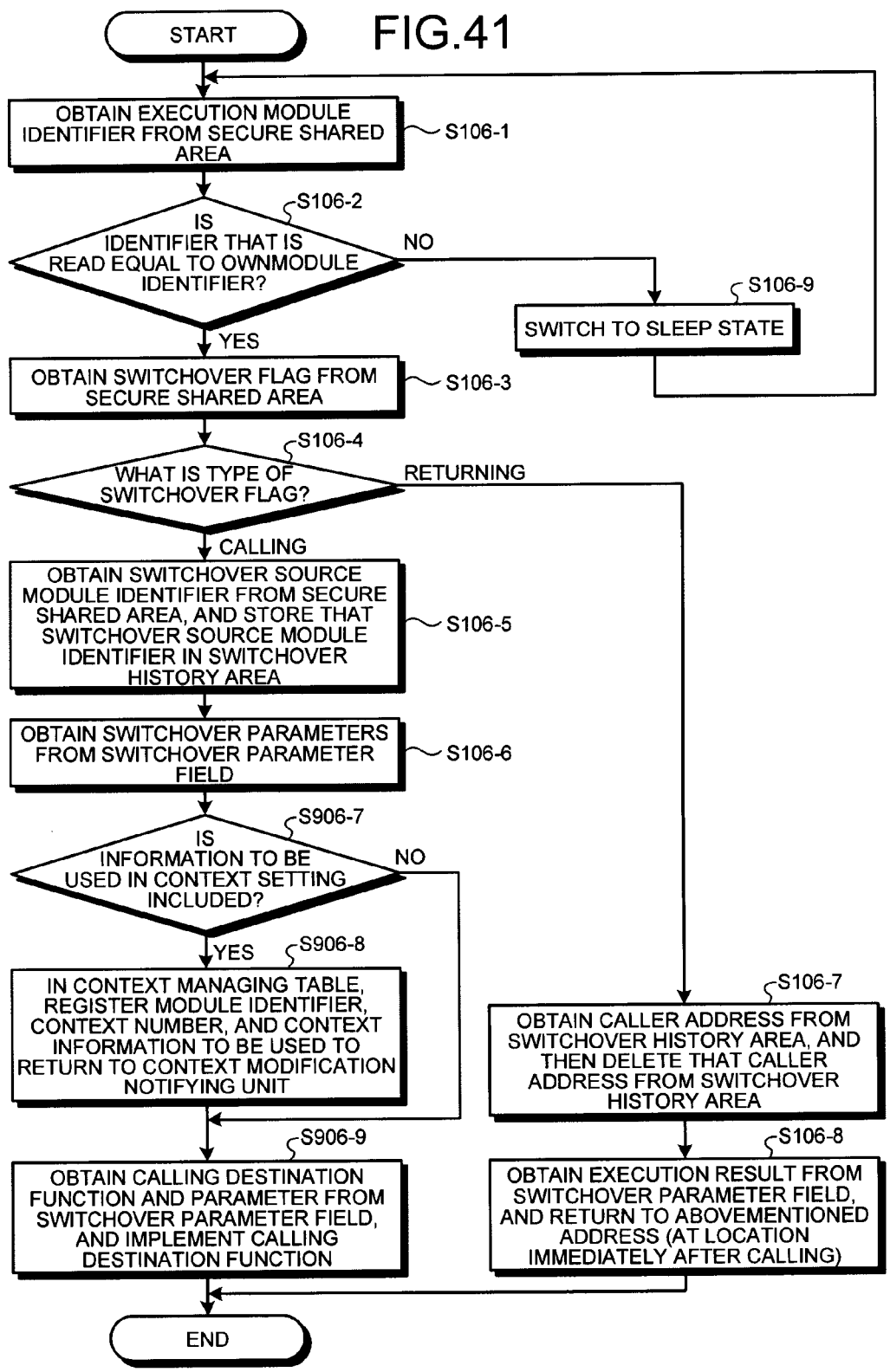
FIG. 41 is an exemplary flowchart for explaining the post-switchover operation.

FIG. 41 is an exemplary flowchart for explaining the post-switchover operation according to the fourth embodiment. With reference to FIG. 41, the steps that are identical to the steps explained with reference to FIG. 10 are referred to by the same step numbers and the explanation thereof is not repeated. When the module (#2) 920 is called from the module (#1) 910, the post-switchover operation unit 906B of the module (#2) 920 confirms whether the value "#2" is written in the execution module identifier field 182 of the secure shared area 181 (Step S106-1, Step S106-2).

Then, the post-switchover operation unit 906B obtains the switchover flag from the switchover flag field 183 of the secure shared area 181 (Step S106-3). By referring to the value "call" that is obtained, the post-switchover operation unit 906B gets to know that a function call is requested (Step S106-4). Then, at Step S106-5, the post-switchover operation unit 906B retrieves the module identifier "#1" from the switchover source module identifier field 185 of the secure shared area 181 and stores that module identifier in the switchover history area 128.

Subsequently, at Step S106-6, from the switchover parameter field 184 of the secure shared area 181, the post-switchover operation unit 906B obtains the function name "sub" and the parameter "5" written as calling information as well as obtains the module identifier "#1" and the context number "#m" for which the context registering operation was performed.

Then, at Step S906-7, the post-switchover operation unit 906B determines whether or not the obtained switchover parameters include the context setting information. If it is determined that the obtained switchover parameters do not include the context setting information, then the system control proceeds to Step S906-9. If it is determined that the obtained switchover parameters include the context setting information, then the system control proceeds to Step S906-8. Subsequently, at Step S906-8, of the switchover parameters obtained at Step S106-6 illustrated in FIG. 41, the post-switchover operation unit 906B stores the information included in the context setting information in the context managing table 929.

More particularly, at Step S906-8, the module identifier and the context number that are included in the context setting information are stored in the context managing table 929. Along with that, in the context information field of the context managing table 929 is stored the context information that is required to return to the caller module by performing the context setting operation (described later). That context information is also used in a context modification notifying operation (described later).

At that time, as illustrated in FIG. 39, in the secure shared area 181 is stored the execution module identifier "#2" and the switchover flag "call" that were written during the pre-switchover operation. In addition to that, in the secure shared area 181, as the switchover parameters, the function name "sub" and the parameter "5" as well as the module identifier "#1" and the context number "#m" are stored. In the switchover history area 118 of the module (#1) 910 is stored the caller address Addr1, while in the switchover history area 128 of the module (#2) is stored the module identifier "#1".

Subsequently, at Step S906-9, of the switchover parameters obtained at Step S106-6 described above, the post-switchover operation unit 906B starts executing the function sub( ) in the program (#2) body 922 based on the function name "sub" and the parameter "5" of the calling destination.

When the module (#3) 930 is called from the module (#2) 920, the same operations are performed. Once calling of the module (#3) 930 is complete, the context managing table of each of the module (#1), the module (#2) 920, and the module (#3) 930 happen to contain the entries of the module identifier "#1" and the context number "#m".

Moreover, in the context managing table 919 is stored the context information obtained at the point of time when context registration is performed by following the operations illustrated in FIG. 40. Furthermore, in the context managing table 929 as well as in the context managing table of the module (#3) 930 is stored the context information required for returning to the caller module.

At that time, as illustrated in FIG. 39, in the secure shared area 181 are stored the execution module identifier "#3" and the switchover flag "call" that were written during the pre-switchover operation. In addition to that, in the secure shared area 181, as the switchover parameters, a function name "hello", the module identifier "#1", and the context number "#m" are stored. In the switchover history area 128 of the module (#2) 920, the module identifier "#1" and the caller address Addr2 are stored. In the switchover history area of the module (#3) 930, the module identifier "#2" is stored. In the switchover history area 118 of the module (#1) 910, the caller address Addr1 is stored.

The following explanation is given regarding the context setting operation. In this example, as illustrated in FIG. 36, the context setting operation is performed in the module (#3) 930.

Figure 42:
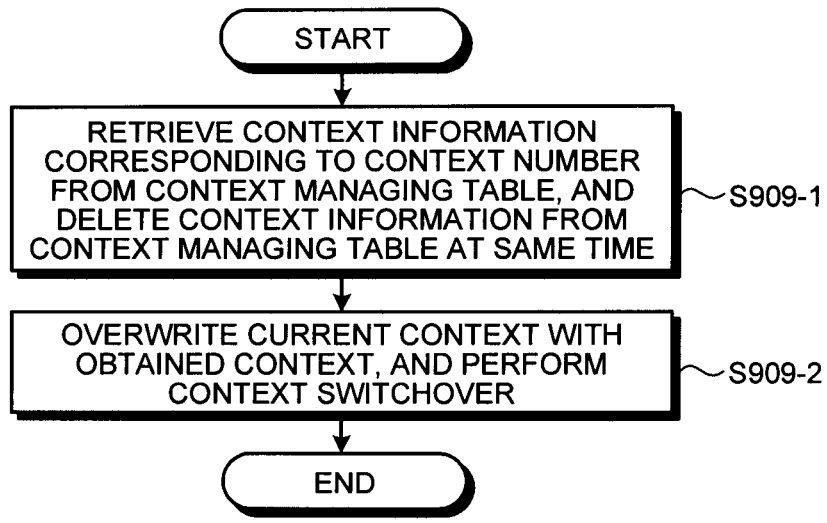
FIG. 42 is a flowchart for explaining a context setting operation.

FIG. 42 is a flowchart for explaining an example of the context setting operation according to the fourth embodiment. At Step S909-1, based on the module identifier "#1" and the context number "#m" that are included in the context setting information and that constitute the switchover parameters obtained from the secure shared area 181 at Step S106-6 illustrated in FIG. 41, the context setting unit of the module (#3) 930 refers to the context managing table of the module (#3) 930. Then, the context setting unit of the module (#3) 930 obtains the context information corresponding to the module identifier "#1" and the context number "#m", and deletes that context information from the context managing table.

Subsequently, at Step S909-2, the context setting unit of the module (#3) 930 overwrites the current context information in the module (#3) 930 with the context information obtained at Step S909-1. In this case, the context information obtained at Step S909-1 is required for returning to the module (#2) 920 that had called the module (#3) 930. Consequently, the module (#3) 930 transfers the control to the context modification notifying unit thereof.

Figure 43:
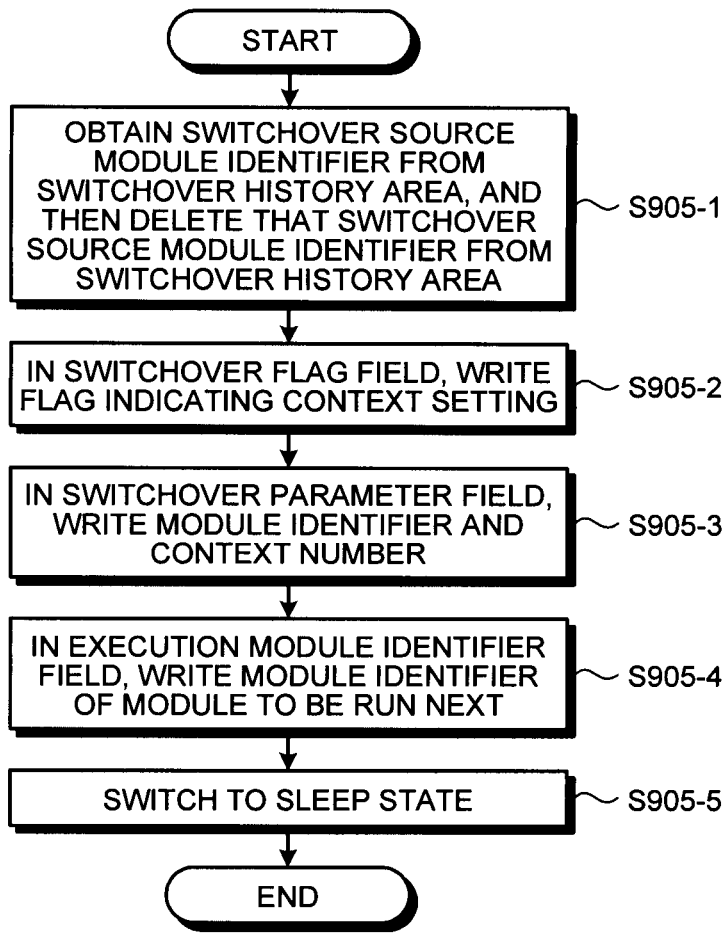
FIG. 43 is a flowchart for explaining a context modification notifying operation.

FIG. 43 is a flowchart for explaining an example of the context modification notifying operation according to the fourth embodiment. At Step S905-1, from the switchover history area of the module (#3) 930, the context modification notifying unit retrieves the module identifier "#2" that was stored at the time when the module (#3) 930 was called by the module (#2) 920; and then deletes the module identifier "#2" from the switchover history area.

Subsequently, at Step S905-2, in the switchover flag field 183 of the secure shared area 181, the context modification notifying unit of the module (#3) 930 writes a switchover flag "Lj", which indicates that the reason for module switch is "context setting". In other words, it can be said that the switchover flag "Lj" represents a value indicating a case other than a normal call, a normal call return, or a language exception. Moreover, at Step S905-3, in the switchover parameter field 184 of the secure shared area 181, the context modification notifying unit writes the module identifier "#1" and the context number "#m" as context setting information. In other words, it can be said that the context setting information indicates the reason for module switch.

Subsequently, at Step S905-4, in the execution module identifier field 182 of the secure shared area 181, the context modification notifying unit of the module (#3) 930 writes the module identifier "#2" indicating the caller module. Besides, at Step S905-6, the context modification notifying unit of the module (#3) 930 switches the module (#3) into the sleep state. By putting into the sleep state and stopping operations just prior to the pre-switchover operation, the module (#3) 930 prepares itself for being called again.

At that point of time, as illustrated in FIG. 39, in the secure shared area 181 are stored the execution module identifier "#2" and the switchover flag "Lj", which were written during the context modification notifying operation. Besides, the module identifier "#1" and the context number "#m" are stored as the switchover parameters in the secure shared area 181. In the switchover history area 118 of the module (#1) 910 is stored the caller address Addr1, while in the switchover history area 128 of the module (#2) 920 is stored the caller address Addr2. However, no information is stored in the switchover history area of the module (#3) 930.

Once the module (#3) 930 goes into the sleep state at Step S905-5, the module running rights are switched over to the OS 180. Then, because of the scheduler of the OS 180, the module running rights are transferred to the module (#2) 920. With that, the module (#2) 920 resumes running. Upon resuming running, when the module (#2) 920 receives a modification notification from the context modification notifying unit of the module (#3) 930, the control is transferred to the context modification receiving unit 907B.

Figure 44:
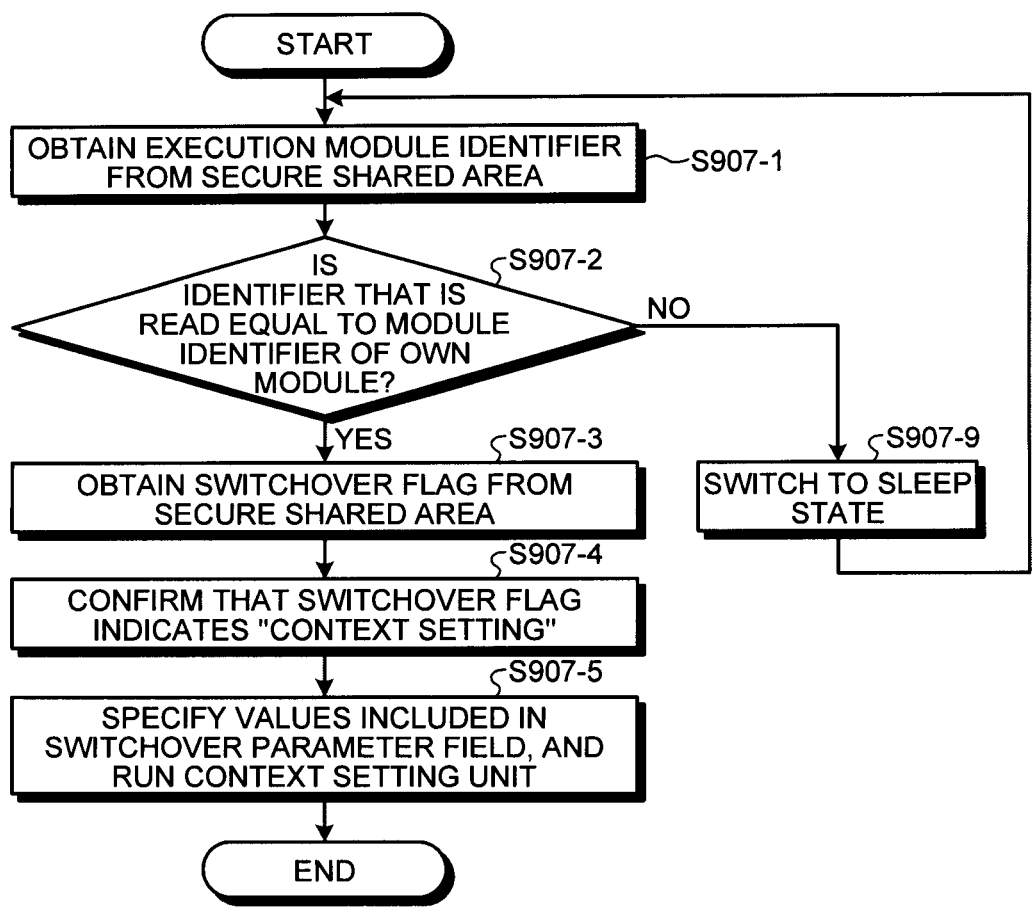
FIG. 44 is a flowchart for explaining a context modification receiving operation.

FIG. 44 is a flowchart for explaining an example of a context modification receiving operation according to the fourth embodiment. At Step S907-1, the context modification receiving unit 907B obtains the execution module identifier from the execution module identifier field 182 of the secure shared area 181. Then, at Step S907-2, the context modification receiving unit 907B determines whether the value of the execution module identifier that is obtained matches with the module identifier "#2" of the module (#2) 920. If it is determined that the value of the execution module identifier does not match with the module identifier "#2" of the module (#2) 920, the system control proceeds to Step S907-9 indicating the sleep state, and the module (#2) 920 goes into the sleep state and waits for being called again later. When the module (#2) 920 is called, the system control returns to Step S907-1 and the operations are started again.

On the other hand, at Step S907-2, if it is determined that the value of the execution module identifier matches with the value of the module identifier "#2" of the module (#2) 920, the system control proceeds to Step S907-3. In this example, the execution module identifier "#2" is stored in the execution module identifier field 182 of the secure shared area 181. That value matches with the module identifier "#2" of the module (#2) 920. Hence, it can be determined that the module (#2) 920 is to be run, and the system control proceeds to Step S907-3.

At Step S907-3, the context modification receiving unit 907B retrieves the switchover flag from the switchover flag field 183 of the secure shared area 181. Then, at Step S907-4, the context modification receiving unit 907B confirms whether or not the switchover flag has the value "Lj" indicating that "context setting" is the reason for module switch. Once it is confirmed that the switchover flag has the value "Lj", the system control proceeds to Step S907-5.

At Step S907-5, the context modification receiving unit 907B obtains the context setting information from the switchover parameter field 184 of the secure shared area 181, and then transfers the control to the context setting unit 909B.

With reference to FIG. 42, at Step S909-1, based on the module identifier "#1" and the context number "#m" that are included in the context setting information and that constitute the switchover parameters stored in the secure shared area 181, the context setting unit 909B refers to the context managing table 929. Then, the context setting unit 909B obtains the context information corresponding to the module identifier "#1" and the context number "#m", and deletes that context information from the context managing table 929.

The context information obtained at Step S909-1 is required for returning to the module (#1) 910 that had called the module (#2) 920. Hence, at Step S909-2, the module (#2) 920 transfers the control from the context setting unit 909B to the context modification notifying unit 905B.

With reference to FIG. 43, the context modification notifying unit 905B performs operations identical to the operations performed by the context modification notifying unit of the module (#3) 930. That is, the context modification notifying unit 905B writes the switchover flag "Lj" in the switchover flag field 183 of the secure shared area 181, writes the module identifier "#1" and the context number "#m" in the switchover parameter field 184 of the secure shared area 181, and writes the module identifier "#1" indicating the caller module in the execution module identifier field 182 of the secure shared area 181. Then, the context modification notifying unit 905B switches the module (#2) 920 into the sleep state (see Step S905-1 to Step S905-6 illustrated in FIG. 43).

At that point of time, as illustrated in FIG. 39, in the secure shared area 181 are stored the module identifier "#1" and the switchover flag "Lj" that were written during the context modification notifying operation. In addition to that, the module identifier "#1" and the context number "#m" are stored as the switchover parameters in the secure shared area 181. Moreover, in the switchover history area 118 of the module (#1) 910 is the caller address Addr1. However, no information is stored in the switchover history areas of the other modules.

Once the module (#2) 920 goes into the sleep state, the module running rights are switched over to the OS 180. Then, because of the scheduler of the OS 180, the module running rights are transferred to the module (#1) 910. With that, the module (#1) 910 resumes running. Upon resuming running, when the module (#1) 910 receives a modification notification from the context modification notifying unit 905B of the module (#2) 920, the control is transferred to the context modification receiving unit 907A.

The context modification receiving unit 907A performs identical operations to the operations performed by the context modification receiving unit 907B of the module (#2) 920. With reference to FIG. 44, the context modification receiving unit 907A confirms that the value "#1" is written in the execution module identifier field 182 of the secure shared area 181 (Step S907-1, Step S907-2).

Then, the context modification receiving unit 907A obtains the switchover flag from the switchover flag field 183 of the secure shared area 181, and confirms that the switchover flag has the value "Lj" indicating that "context setting" is the reason for module switch (Step S907-3, Step S907-4).

Then, at Step S907-5, from the switchover parameter field 184 of the secure shared area 181, the context modification receiving unit 907A obtains the context setting information included in the switchover parameters, and obtains the module identifier and the context number from the context setting information. Then, the context modification receiving unit 907A specifies the module identifier and the context number obtained from the context setting information, and transfers the control to the context setting unit 909A.

With reference to FIG. 42, at Step S909-1, based on the module identifier "#1" and the context number "#m" that are included in the context setting information and that constitute the switchover parameters stored in the secure shared area 181, the context setting unit 909A refers to the context managing table 919. Then, from the context managing table 919, the context setting unit 909A obtains the context information corresponding to the module identifier "#1" and the context number "#m"; and deletes that context information from the context managing table 919.

The context information obtained at Step S909-1 belongs to the location at which context registration was performed in the module (#1) 910 during the context registering operation. Hence, at Step S909-2, the module (#1) 910 returns the execution position to the location at which registration was performed during the context registering operation, and resumes the execution.

In this way, in a module in which context registration is performed, the context information obtained at the point of time of performing context registration is stored. Moreover, in the other modules other than the module in which context registration is performed, the values for context setting are written, and the context information that is obtained during the pre-switchover operation, which is performed at the time of switching over the execution to the caller module, is stored. Because of that, while returning according to the context setting, it becomes possible to return to the location of context registration simply by continually overwriting with the context information stored in the context managing tables.

Meanwhile, in the fourth embodiment, the context modification notifying unit and the pre-switchover operation unit are configured to be independent of each other. However, that is not the only possible case. Alternatively, it is possible to configure the pre-switchover operation unit to also have the functions of the context modification notifying unit. That is, in the pre-switchover operation unit, in the case of normal calling, the normal pre-switchover operation is performed; and in the case of context setting, the operations are performed according to the functions of the context modification notifying unit.

Similarly, in the fourth embodiment, the context modification receiving unit and the post-switchover operation unit are configured to be independent of each other. However, that is not the only possible case. Alternatively, it is possible to configure the post-switchover operation unit to also have the functions of the context modification receiving unit. That is, in the post-switchover operation unit, in the case of normal calling, the normal pre-switchover operation is performed; and in the case of context setting, the operations are performed according to the functions of the context modification receiving unit.

Moreover, in the fourth embodiment, it is explained that each module independently holds a context managing table. However, that is not the only possible case. For example, in an identical manner to the secure shared area, a context managing table can be maintained in an area shared by the modules running cooperatively. Furthermore, in the fourth embodiment, it is explained that a set of context information is managed using a module identifier and a context number. However, that is not the only possible case. That is, it is also possible to implement a method in which module identifiers and context numbers represent unique values used across the modules.

Fifth Embodiment

Given below is the explanation of a fifth embodiment. In the fifth embodiment, the explanation is given regarding a modification example of the operations corresponding to the function setjmp and the function longjmp that are provided in the C library. Herein, in an identical manner to that described above, the explanation is given for an example in which context registration is performed in a module #1 functioning as the application module, and context setting is performed in a module #3 functioning as a library module via a module #2 also functioning as a library module.

In the fifth embodiment, in an identical manner to the fourth embodiment, a set of context information is managed using a module identifier and a context number. Moreover, in the fifth embodiment, the context registering operation that is equivalent to the function setjmp is performed to obtain context numbers indicating context information. Furthermore, the context setting operation that is equivalent to the function longjmp is performed to specify a module identifier and a context number so as to switchover the context.

Figure 45:
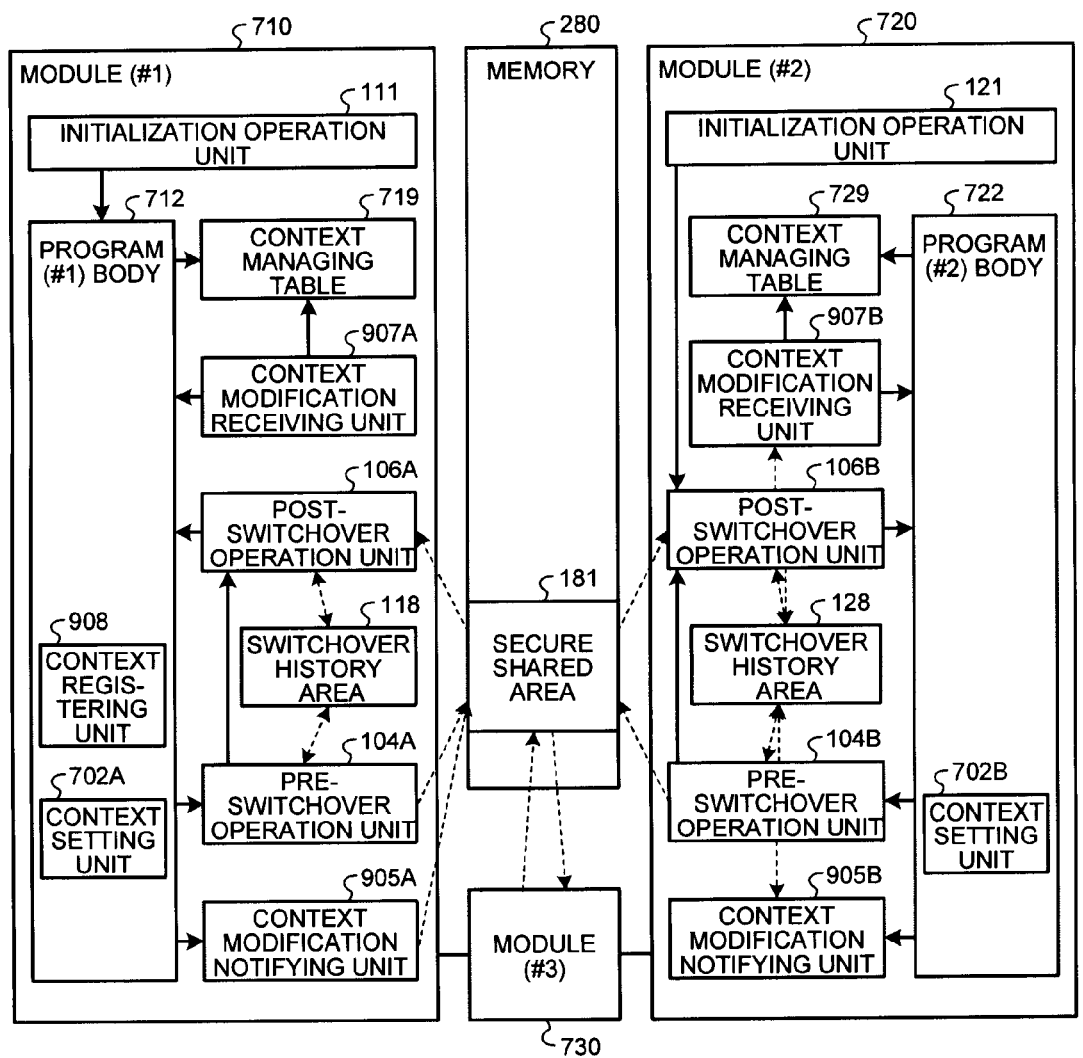
FIG. 45 is a functional block diagram of a module configuration according to a fifth embodiment.

FIG. 45 is a functional block diagram of an exemplary module configuration according to the fifth embodiment. In the description with reference to FIG. 45, the constituent elements identical to those illustrated in FIG. 37 are referred to by the same reference numerals and the explanation thereof is not repeated. Moreover, as far as the hardware configuration including a secure processor is concerned, the configuration explained with reference to FIG. 1 can be applied without modification. Hence, the explanation thereof is not repeated.

With reference to FIG. 45, a module (#1) 710 as well as a module (#2) 720 include a module switch mechanism according to the fifth embodiment. Herein, it is assumed that the module (#1) 710 is an application module and the module (#2) 720 is a library module. Along with a module (#3) 730 described later, the module (#1) 710 and the module (#2) 720 run cooperatively with each other.

The module (#1) 710 includes the initialization operation unit 111, a program (#1) body 712, the pre-switchover operation unit 104A, a post-switchover operation unit 706A, the switchover history area 118, the context modification notifying unit 905A, the context modification receiving unit 907A, and a context managing table 719. The program (#1) body 712 includes the context registering unit 908 and a context setting unit 702A. The context registering unit 908 is equivalent to the function setjmp, and the context setting unit 702A is equivalent to the function longjmp.

Of those constituent elements, the context setting unit 702A and the context managing table 719 correspond to, but have some different functions than, the context setting unit 902A and the context managing table 919, respectively, explained with reference to FIG. 37 according to the fourth embodiment.

Similarly, the module (#2) 720 includes the initialization operation unit 121, a program (#2) body 722, the pre-switchover operation unit 104B, the post-switchover operation unit 106B, the switchover history area 128, the context modification notifying unit 905B, the context modification receiving unit 907B, and a context managing table 729. The program (#2) body 722 includes a context setting unit 702B that is equivalent to the function longjmp.

In a similar manner to the module (#1) 710, of the constituent elements of the module (#2) 720, the context setting unit 702B and the context managing table 729 correspond to, but have some different functions than, the context setting unit 902B and the context managing table 929, respectively, explained with reference to FIG. 37 according to the fourth embodiment.

Although not illustrated in detail in FIG. 45, the module (#3) 730 also has the same configuration as the module (#2) 720. In the module (#3) 730, a program (#3) body includes a context setting unit (not illustrated). The module (#1) 710, the module (#2) 720, and the module (#3) 730 share the secure shared area 181 as, for example, the area Sh_mem1 established in the memory 280.

FIG. 46 illustrates an exemplary data configuration of the context managing table 719, the context managing table 729, and a context managing table (not illustrated) of the module (#3) 730. In the following explanation, unless otherwise specified, the context managing table 719, the context managing table 729, and the context managing table (not illustrated) of the module (#3) 730 are representatively explained as a context managing table.

In a context managing table, with context numbers serving as indices, n number of entries having indices from "#1" to "#n" are written. Each entry contains a context information field in which a program counter or a stack pointer is stored as context information.

Explained below with reference to FIG. 43, FIG. 44, FIG. 47, and FIG. 48 are the operations performed for context registration/context setting according to the fifth embodiment. Herein, the explanation is given for the following example: context registration is performed in the module (#1) 710; the module (#2) 720 is called from the module (#1) 710; the module (#3) 730 is called from the module (#2) 720; and context setting is performed in the module (#3) 730. Meanwhile, as far as the initialization operation is concerned, the operations explained with reference to FIG. 7 and FIG. 8 can be performed without modification. Hence, that explanation is not repeated.

Figure 47:
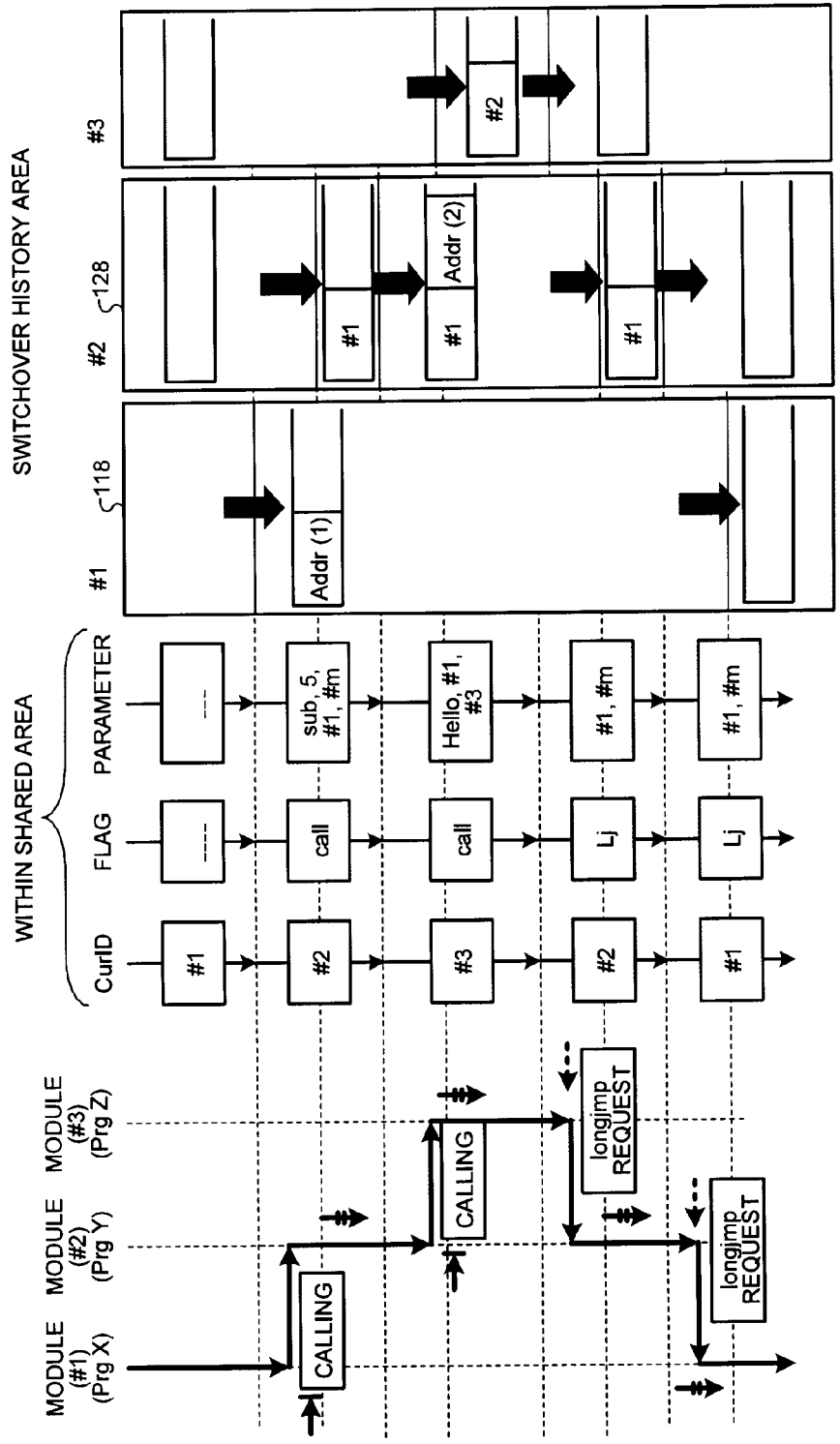
FIG. 47 is a diagram illustrating changes occurring in the state of a secure shared area and in the states of switchover history areas.

FIG. 47 corresponds to FIG. 11 described above and schematically illustrates an overview of the changes occurring in the state of the secure shared area 181 and in the states of the switchover history areas of the module (#1) 710, the module (#2) 720, and the module (#3) 730. At the point of time when the initialization operation is complete, the execution module identifier "#1" gets stored in the execution module identifier field 182 of the secure shared area 181. However, no information is stored in the switchover flag field 183 and the switchover parameter field 184 of the secure shared area 181. Moreover, no information is stored in the switchover history areas of the module (#1) 710, the module (#2) 720, and the module (#3) 730.

Firstly, in the module (#1) 710 functioning as the application module, the context registering operation is performed in the same sequence as the sequence of the context registering operation explained with reference to FIG. 40 according to the fourth embodiment. At that time, in the entry (#m) in the context managing table 719, the context present during the context registering operation is registered.

Once context registration is completed in the module (#1) 710, the module (#2) 720 is called from the module (#1) 710 and then the module (#3) 730 is called from the module (#2) 720. The operations performed by the pre-switchover operation unit 104A at the time of calling the module (#2) 720 from the module (#1) 710 as well as the operations performed by the pre-switchover operation unit 104B at the time of calling the module (#3) 730 from the module (#2) 720 are identical to the operations explained with reference to FIG. 7. Hence, the explanation thereof is not repeated.

As a result of performing the pre-switchover operation, the caller address Addr1, the switchover flag "call" indicating the calling operation, and the execution module identifier "#2" indicating the execution module are respectively written in a call address field Addr1, the switchover flag field 183 of the secure shared area 181, and the execution module identifier field 182 of the secure shared area 181.

In the switchover flag field 183 of the secure shared area 181, the function name "sub" and the parameter "5" of the function in the calling destination module are written as the switchover parameters. In addition to that, according to the fifth embodiment, in the switchover flag field 183 of the secure shared area 181, the context setting information is written. That is, the module identifier "#1", which indicates the module in which context registration is performed, and the context number "#m" are written in the switchover flag field 183 of the secure shared area 181. As a result, in the calling destination module, it becomes possible to perform context setting.

By performing the pre-switchover operation and the post-switchover operation, the module identifier "#1" and the context number "#m" are sequentially transferred to the calling destination module.

Once the pre-switchover operation is completed in the pre-switchover operation unit 104A and in the pre-switchover operation unit 104B, the caller module is called and the module to be run is switched. When the control is transferred to the module to be run, the post-switchover operation is performed in that module. Herein, the post-switchover operation is identical to the post-switchover operation explained with reference to FIG. 41, which in turn is identical to the post-switchover operation according to the first embodiment. Hence, the explanation of the post-switchover operation is not repeated.

Explained below with reference to FIG. 47 are the changes in the state of the secure shared area 181 and in the state of the switchover history area of each module occurring as a result of performing a calling operation performed to call a module. After the control is switched over from the module (#1) 710 to the module (#2) 720, at the point of time when the post-switchover operation is completed in the module (#2) 720, the execution module identifier "#2" and the switchover flag "call" are stored in the secure shared area 181. Along with that, in the secure shared area 181, as the switchover parameters, the function name "sub" and the parameter "5" as well as the module identifier "#1" and the context number "#m" are stored. Moreover, the caller address Addr1 is stored in the switchover history area 118 of the module (#1) 710, while the module identifier "#1" is stored in the switchover history area 128 of the module (#2) 720.

Similarly, after the control is switched over from the module (#2) 720 to the module (#3) 730, at the point of time when the post-switchover operation is completed in the module (#3) 730, the execution module identifier "#3" and the switchover flag "call" are stored in the secure shared area 181. In addition to that, in the secure shared area 181, as the switchover parameters, the function name "hello", the module identifier "#1", and the context number "#m" are stored. In the switchover history area 128 of the module (#2) 720, the module identifier "#1" and the caller module address Addr2 are stored. In the switchover history area of the module (#3) 730, the module identifier "#2" is stored. In the switchover history area 118 of the module (#1) 710, the caller address Addr1 is stored.

At that time, the context managing table 719 of the module (#1) 710 happens to include the entry of the context number "#m". On the other hand, no information is included in the context managing tables of the module (#2) 720 and the module (#3) 730. In this respect, the fifth embodiment differs from the fourth embodiment.

The following explanation is given regarding the context setting operation according to the fifth embodiment. In this example, as illustrated in FIG. 36, the context setting operation is performed in the module (#3) 730.

Figure 48:
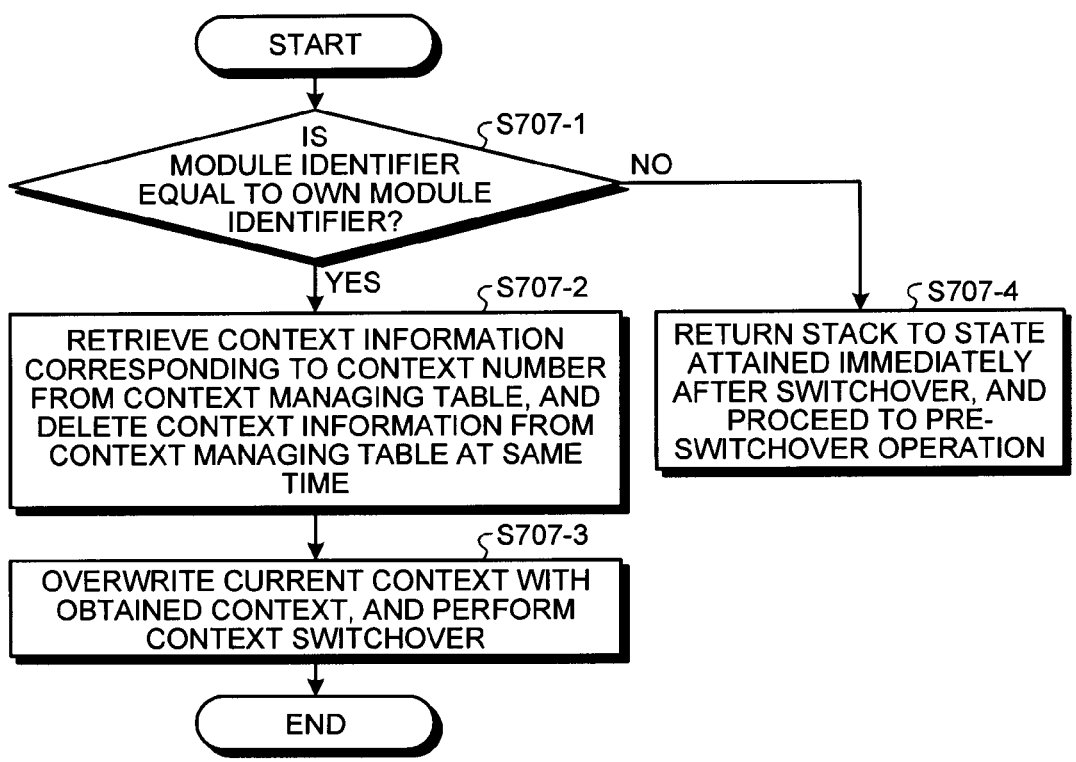
FIG. 48 is a flowchart for explaining a context setting operation.

FIG. 48 is a flowchart for explaining an example of the context setting operation according to the fifth embodiment. Firstly, the context setting unit of the module (#3) 730 refers to the context setting information (the module identifier and the context number), which is received from the caller module via the secure shared area 181, and accordingly performs the context setting operation. Firstly, at Step S707-1, the context setting unit of the module (#3) 730 determines whether or not the value of the module identifier matches with the module identifier indicating the module (#3) 730. If it is determined that the value of the module identifier matches with the module identifier indicating the module (#3) 730, then the system control proceeds to Step S707-2.

At Step S707-2, the context setting unit of the module (#3) 730 obtains the context information corresponding to the context number, and then deletes that context information from the context managing table. Subsequently, at Step S707-3, the context setting unit of the module (#3) 730 overwrites the current context information in the module (#3) 730 with the context information obtained at Step S707-1.

Meanwhile, at Step S707-1, if it is determined that the value of the module identifier does not match with the module identifier indicating the module (#3) 730, the system control proceeds to Step S707-4. In this case, returning to the caller module is determined to be necessary. Therefore, at Step S707-4, the context setting unit of the module (#3) 730 returns the context such as the stack of the module (#3) 730 to the state attained immediately after the switchover. Then, the control is transferred to the context modification notifying unit of the module (#3) 730.

In this example, since the module identifier "#1" is different than the module identifier "#3" of the module (#3) 730, the system control proceeds to Step S707-4 and the context such as the stack of the module (#3) 730 is returned to state attained prior to the switchover. Then, the control is transferred to the context modification notifying unit of the module (#3) 730. The operations performed by the context modification notifying unit are identical to those explained with reference to FIG. 43 according to the fourth embodiment. Hence, the explanation thereof is not repeated.

At that point of time, as illustrated in FIG. 47, in the secure shared area 181 are stored the execution module identifier "#2" and the switchover flag "Lj", which were written during the context modification notifying operation. Besides, the module identifier "#1" and the context number "#m" are stored as the switchover parameters in the secure shared area 181. In the switchover history area 118 of the module (#1) 710 is stored the caller address Addr1, while in the switchover history area 128 of the module (#2) 720 is stored the module identifier "#1" of the caller module. However, no information is stored in the switchover history area of the module (#3) 730.

Once the module (#3) 730 goes into the sleep state (see Step S905-5 illustrated in FIG. 43), the module running rights are switched over to the OS 180. Then, because of the scheduler of the OS 180, the module running rights are transferred to the module (#2) 720. With that, the module (#2) 720 resumes running. Upon resuming running, when the module (#2) 720 receives a modification notification from the context modification notifying unit 905B of the module (#3) 730, the control is transferred to the context modification receiving unit 907B.

The operations performed by the context modification receiving unit 907B are identical to those explained with reference to FIG. 44 according to the fourth embodiment. Hence, the explanation thereof is not repeated. Lastly, the context modification receiving unit 907B specifies the context setting information included in the obtained switchover parameters, and transfers the control to the context setting unit 702B (see Step S907-5 illustrated in FIG. 44).

With reference to FIG. 48, at Step S707-1, the context setting unit 702B determines that the module identifier obtained from the switchover parameters, which are obtained by the context modification receiving unit 907B, has the value "#1" but the module identifier of the module (#2) 720 has the value "#2". Thus, the two values are not matching. As a result, the system control proceeds to Step S707-4.

At Step S707-4, the context setting unit 702B returns the context such as the stack of the module (#2) 720 to the state attained immediately after the switchover. Then, the control is transferred to the context modification notifying unit 905B of the module (#2) 720. The operations performed by the context modification notifying unit 905B are identical to those explained with reference to FIG. 43 according to the fourth embodiment. Hence, the explanation thereof is not repeated.

At that point of time, as illustrated in FIG. 47, in the secure shared area 181 are stored the execution module identifier "#1" and the switchover flag "Lj", which were written during the context modification notifying operation. Besides, the module identifier "#1" and the context number "#m" are stored as the switchover parameters in the secure shared area 181. In the switchover history area 118 of the module (#1) 710 is stored the caller address Addr1. However, no information is stored in the switchover history areas of the module (#2) 720 and the module (#3) 730.

Once the module (#2) 720 goes into the sleep state (see Step S905-5 illustrated in FIG. 43), the module running rights are switched over to the OS 180. Then, because of the scheduler of the OS 180, the module running rights are transferred to the module (#1) 710. With that, the module (#1) 710 resumes running. Upon resuming running, when the module (#1) 710 receives a modification notification from the context modification notifying unit 905B of the module (#2) 720, the control is transferred to the context modification receiving unit 907A.

The operations performed by the context modification receiving unit 907A are identical to those explained with reference to FIG. 44 according to the fourth embodiment.

Hence, the explanation thereof is not repeated. Lastly, the context modification receiving unit 907A specifies the context setting information included in the obtained switchover parameters, and transfers the control to the context setting unit 702A (see Step S907-5 illustrated in FIG. 44).

With reference to FIG. 48, the context setting unit 702A determines whether or not the value of the module identifier, which is included in the context setting information received from the caller module via the secure shared area 181, matches with the value of the module identifier indicating the module (#1) 710. In this case, the value of the module identifier included in the context setting information has the value "#1" and the module identifier of the module (#1) 710 has the value "#1". Thus, the two values are matching. As a result, the context setting unit 702A can determine it to be necessary to return to the point of time at which context registration was issued in the module (#1) 710.

Then, the system control proceeds to Step S707-2. The context setting unit 702A retrieves the context number from the context setting information and obtains the context information corresponding to that context number from the context managing table 919. Subsequently, the context setting unit 702A deletes that context information from the context managing table 919. Then, at Step S707-3, the context setting unit 702A overwrites the current context information in the module (#1) 710 with the context information obtained at Step S707-2, and returns to the location of context registration.

In this way, in the fifth embodiment, during context registration, in place of a context, a module identifier and a context number are provided as the context setting information. Then, during context setting, the module identifier and the context number, which are included in the context setting information provided during context registration, are specified so as to enable returning to the caller modules in order. As a result, even across the modules that hold separate contexts and that are protected, it becomes possible to execute the functions equivalent to the functions setjmp and longjmp.

Meanwhile, in the fifth embodiment, the context modification notifying unit and the pre-switchover operation unit are configured to be independent of each other. However, that is not the only possible case. Alternatively, it is possible to configure the pre-switchover operation unit to also have the functions of the context modification notifying unit. That is, in the pre-switchover operation unit, in the case of normal calling, the normal pre-switchover operation is performed; and in the case of context setting, the operations are performed according to the functions of the context modification notifying unit.

Similarly, in the fifth embodiment, the context modification receiving unit and the post-switchover operation unit are configured to be independent of each other. However, that is not the only possible case. Alternatively, it is possible to configure the post-switchover operation unit to also have the functions of the context modification receiving unit. That is, in the post-switchover operation unit, in the case of normal calling, the normal pre-switchover operation is performed; and in the case of context setting, the operations are performed according to the functions of the context modification receiving unit.

Moreover, in the fifth embodiment, it is explained that each module independently holds a context managing table. However, that is not the only possible case. For example, in an identical manner to the secure shared area, a context managing table can be maintained in an area shared by the modules running cooperatively.

Furthermore, in the fifth embodiment, it is explained that a set of context information is managed using a module identifier and a context number. However, that is not the only possible case. That is, as long as module identifiers and context numbers represent unique values used across the modules, it is also possible to implement a method in which two different numbers are not used. For example, during the initialization operation, a method of using only the context numbers can be implemented. In that method, a range of the context numbers to be used across the modules is determined, and the module #1 is configured to use context numbers #1 to #100 and the module #2 is configured to use context numbers #101 to #200.

Alternatively, instead of determining the context numbers for modules during the initialization operation, the context numbers can be determined by making such adjustment that the context number for each module does not clash with another context number.

Other Applications of Embodiments

According to other applications of each embodiment described above, in a program, a first operation step includes, just prior to a switchover of operations from own module to another module and when the reason for switchover is calling, storing a caller address in a switchover history area; and a second operation step includes, immediately after a switchover of operations from another module and when a switchover flag indicates return from calling, obtaining the caller address from the switchover history area and resuming execution from that caller address.

Moreover, in the program, an initialization step includes determining module identifiers according to task identifiers, which are used by a microprocessor to identify modules.

Furthermore, in the program, the initialization step includes determining module identifiers from random numbers and confirming that there is no duplication of identifiers among modules that run cooperatively.

Moreover, in the program, the first operation step includes, just prior to a switchover from the own module to another module, specifying a shared key, encrypting the switchover flag as well as the switchover parameter with the specified shared key, and storing the encoded switchover flag and the encoded switchover parameter in a shared area; and the second operation step includes, immediately after a switchover from another module to the own module, specifying a shared key, decrypting the switchover flag and the switchover parameter that are stored in the shared area with the specified shared key, and executing a function inside the own module according to the decoded switchover flag and the decoded switchover parameter.

Furthermore, the shared area and an access control unit, which performs access control with respect to the shared area, are disposed in the microprocessor; and the program accesses the shared area via the access control unit.

Moreover, the access control unit, which performs access control with respect to the shared area, runs in the microprocessor and is disposed in a virtual machine monitor that runs a plurality of modules cooperatively; and the program accesses the shared area from the virtual machine monitor via the access control unit.

According to an aspect of an embodiment, it becomes possible to efficiently and reliably prevent changes from being made in the execution sequence by a third party.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A computer program product comprising a non-transitory computer-readable storage medium including a program embodied therein, which when executed by a computer, causes the computer to have a plurality of modules including a first module and a second module run by the computer, wherein
   the computer includes a memory having a shared area,
      the shared area being an area accessible by only those modules which run cooperatively, and storing therein execution module identifiers which serve as identifiers of modules running in an operation system (OS) from among the modules which run cooperatively, and
   each of the modules include:
      a first operation configured to store, just prior to a switchover of operations to the second module that runs cooperatively, an identifier of the second module as the execution module identifier in the shared area; and
      a second operation configured to execute, when the execution module identifier stored in the shared area matches with an identifier of the first module immediately after a switchover of operations from the second module, a function inside the first module.

2. The computer program product according to claim 1, wherein
   the first operation further includes storing, in the shared area, a switchover flag which indicates a reason for the switchover, and a switchover parameter which contains necessary information for the switchover, and
   the second operation includes executing the function inside the first module according to the switchover flag and the switchover parameter stored in the shared area.

3. The computer program product according to claim 2, wherein
   the first operation includes storing, when the reason for the switchover is calling, the switchover flag which indicates the calling, and the switchover parameter which at least contains calling information that indicates a calling location inside the second module in which the switchover occurs due to the calling, in the shared area, and
   the second operation includes executing, when the switchover flag indicates the calling, a calling operation inside the first module according to the calling information included in the switchover parameter.

4. The computer program product according to claim 3, wherein
   the first operation includes storing, when the reason for the switchover is returning from calling, the switchover flag which indicates the returning, and the switchover parameter which indicates returning-from-calling information that indicates an execution result of the first module in which the switchover occurred due to the calling, in the shared area, and
   the second operation includes resuming, when the switchover flag indicates the returning, execution for the first module to return to the location of the calling according to the returning-from-calling information included in the switchover parameter.

5. The computer program product according to claim 4, further including
   a third operation configured to include storing, just prior to the switchover of operations to the second module that runs cooperatively and when the reason for the switchover is other than the calling or the returning, a switchover flag which indicates a reason other than the calling or the returning, and the switchover parameter which at least contains switchover reason information indicating details of the reason for the switchover, in the shared area; and
   a fourth operation configured to include executing, immediately after the switchover of operations from the second module and when the switchover flag indicates a reason other than the calling or the returning, an operation corresponding to the reason indicated by the switchover reason information included in the switchover parameter.

6. The computer program product according to claim 5, wherein
   the third operation includes storing, when the reason for the switchover is a language exception, the switchover flag which indicates the language exception, and the switchover parameter which at least contains language exception information that is required for notifying the language exception, in the shared area, and
   the fourth operation includes throwing, when the switchover flag indicates the language exception, a language exception to the first module according to the language exception information included in the switchover parameter.

7. The computer program product according to claim 6, further including
   a context setting configured to include
      obtaining, from a managing table that manages the identifier, a context number, each of which is unique to each of the contexts, and context information, each of which represents each of the contexts in a corresponding manner on a one-to-one basis, the context information corresponding to the context number being designated by the second module, and overwriting a current context of the first module with the obtained context information, wherein the third operation includes deleting, just prior to the switchover and when the reason for the switchover is the context setting, the context information corresponding to the identifier and the context number from the managing table, and storing the switchover flag which indicates the context setting, and the switchover parameter which at least contains a set of context setting information indicating a context that is set at the context setting, in the shared area just prior to the switchover, and the fourth operation includes registering, immediately after the switchover as well as when the switchover flag indicates the calling and when the switchover parameter contains the context setting information, the identifier indicating the second module, the context number indicated by the second module, and context information required for returning to the first operation in the managing table, and transferring, when the switchover flag indicates the context setting, a control to the context setting according to the context setting information included in the switchover parameter.

8. The computer program product according to claim 6, further including registering configured to include registering, by a registering unit, context information in a managing table that manages the identifier, a context number, each of the context numbers being unique to each of the contexts, and the context information representing the contexts in a corresponding manner on a one-to-one basis, and returning back the context number corresponding to the context information; and context setting configured to include obtaining, when the identifier designated by the first module matches with the identifier of the first module, the context information corresponding to the context number designated by the first module from the managing table, and overwriting the context of the first module with the obtained context information, and overwriting, when the identifier designated by the first module does not match with the identifier of the first module, the context of the first module with the context that is present just prior to performing the first operation, wherein the third operation includes storing, when the reason for the switchover is context setting, the switchover flag, which indicates context setting, and the switchover parameter, which at least contains a set of context setting information indicating a context that is set at the context setting, in the shared area just prior to the switchover, and the fourth operation includes transferring, when the switchover flag indicates the context setting, control to the context setting immediately after the switchover and according to the context setting information included in the switchover parameter.

9. The computer program product according to claim 2, wherein the shared area is further configured to store a switchover source identifier that indicates a switchover source module, the first operation includes storing, when the reason for the switchover is calling, the identifier indicating the first module as the switchover source identifier in the shared area just prior to the switchover, and obtaining, when the reason for the switchover is returning from calling, the identifier indicating the switchover source module from a switchover history area that holds information resulting from the switchover, and storing the obtained identifier as the switchover source identifier in the shared area, and the second operation includes obtaining, when the switchover flag is a value indicating the calling, the switchover source identifier immediately after the switchover, and storing the obtained switchover source identifier in the switchover history area.

10. An information processing apparatus comprising:

a plurality of modules including a first module and a second module; and a memory having a shared area that is an area accessible by only those modules from among the plurality of modules which run cooperatively and that is used to store execution module identifiers which serve as identifiers of running modules from among the plurality of modules which run cooperatively, wherein each of the plurality of modules includes a first operation unit that, just prior to a switchover of operations to the second module that runs cooperatively, stores an identifier of the second module as the execution module identifier in the shared area; and a second operation unit that, when the execution module identifier stored in the shared area matches with an identifier of the first module immediately after a switchover of operations from the second module, executes a function inside the first module.

11. The apparatus according to claim 10, wherein the first operation unit further stores, in the shared area, at least a switchover flag which indicates a reason for the switchover and a switchover parameter which contains necessary information for the switchover, and the second operation unit executes the function inside the first module according to the switchover flag and the switchover parameter stored in the shared area.

12. The apparatus according to claim 11, wherein when the reason for the switchover is calling, the first operation unit stores, in the shared area, the switchover flag which indicates the calling and the switchover parameter which at least contains calling information that indicates a calling location inside the second module in which the switchover occurs due to the calling, and when the switchover flag indicates the calling, the second operation unit executes a calling operation inside the first module according to the calling information included in the switchover parameter.

13. The apparatus according to claim 12, wherein when the reason for the switchover is returning from calling, the first operation unit stores, in the shared area, the switchover flag which indicates the returning and the switchover parameter which at least includes returning-from-calling information that indicates an execution result of the first module in which the switchover occurred due to the calling, and when the switchover flag indicates the returning, the second operation unit resumes execution for the first module to return to the location of the calling according to the returning-from-calling information included in the switchover parameter.

14. The apparatus according to claim 13, further comprising:
a third operation unit that stores, just prior to the switchover of operations to the second module that runs cooperatively and when the reason for the switchover is other than the calling or the returning, a switchover flag which indicates a reason other than the calling or the returning and the switchover parameter which at least contains switchover reason information indicating the reason for the switchover, in the shared area; and
a fourth operation unit that executes, immediately after the switchover of operations from the second module and when the switchover flag indicates a reason other than the calling or the returning, an operation corresponding to the reason indicated by the switchover reason information included in the switchover parameter.

15. The apparatus according to claim 14, wherein
when the reason for the switchover is a language exception, the third operation unit stores, in the shared area, the switchover flag which indicates the language exception and the switchover parameter which at least contains language exception information that is required for notifying the language exception, and
when the switchover flag indicates the language exception, the fourth operation unit throws a language exception to the first module according to the language exception information included in the switchover parameter.

16. The apparatus according to claim 15, further comprising a setting unit that obtains, from a managing table that manages the identifier, a context number, each of which is unique to each of the contexts, and context information, each of which represents each of the contexts in a corresponding manner on a one-to-one basis, the context information corresponding to the context number being designated by the second module, and that overwrites a current context of the first module with the obtained context information, wherein
just prior to the switchover and when the reason for the switchover is the context setting, the third operation unit deletes the context information corresponding to the identifier and the context number from the managing table, and stores, in the shared area, the switchover flag which indicates the context setting and the switchover parameter which at least contains context setting information indicating a context that is set by the setting unit, and
immediately after the switchover as well as when the switchover flag indicates the calling and when the switchover parameter contains the context setting information, the fourth operation unit registers the identifier indicating the second module, the context number indicated by the second module, and context information required for returning to the first operation unit in the managing table, and, when the switchover flag indicates the context setting, the fourth operation unit transfers a control to the context setting according to the context setting information included in the switchover parameter.

17. The apparatus according to claim 15, further comprising:
a registering unit that registers context information in a managing table, which manages the identifier, a context number, each of which is unique to each of the contexts, and the context information, each of which represents each of the contexts in a corresponding manner on a one-to-one basis, and that returns back the context number corresponding to the context information; and
a setting unit that, when the identifier designated by the first module matches with the identifier of the first module, obtains the context information corresponding to the context number designated by the first module from the managing table and overwrites the context of the first module with the obtained context information, and, when the identifier designated by the first module does not match with the identifier of the first module, overwrites the context of the first module with the context that is present just prior to performing operations of the first operation unit, wherein
when the reason for the switchover is context setting, the third operation unit stores, in the shared area just prior to the switchover, the switchover flag which indicates context setting and the switchover parameter which at least contains context setting information indicating a context that is set by the setting unit, and
when the switchover flag indicates the context setting, the fourth operation unit transfers a control to the context setting immediately after the switchover and according to the context setting information included in the switchover parameter.

18. The apparatus according to claim 11, wherein
the shared area is further configured to store a switchover source identifier that indicates a switchover source module,
when the reason for the switchover is calling, the first operation unit stores the identifier indicating the first module as the switchover source identifier in the shared area just prior to the switchover and, when the reason for the switchover is returning from calling, the first operation unit obtains the identifier, which indicates the switchover source module from a switchover history area that holds information resulting from the switchover, and stores the obtained identifier as the switchover source identifier in the shared area, and
when the switchover flag is a value indicating the calling, the second operation unit obtains the switchover source identifier from the shared area immediately after the switchover and stores the obtained switchover source identifier in the switchover history area.

19. An information processing method that causes a computer to execute a program having a plurality of modules including a first module and a second module, wherein
the computer includes a memory having a shared area, the shared area being an area accessible by only those modules which run cooperatively and storing therein execution module identifiers which serve as identifiers of modules running in an operation system (OS) from among the modules which run cooperatively, and
each of the modules includes
a first operation configured to store, just prior to a switchover of operations to the second module that is included in the modules which run cooperatively, an identifier of the second module as the execution module identifier in the shared area; and
a second operation configured to execute, when the execution module identifier stored in the shared area matches with an identifier of the first module immediately after a switchover of operations from the second module, a function inside the first module.

20. The computer program product according to claim 1, wherein the second operation includes a determining operation to determine whether the execution module identifier stored in the shared area matches with the identifier of the first module immediately after the switchover of operations from the second module; and the second operation executes, when the execution module identifier is determined to match with the identifier of the first module at the determining operation, the function inside the first module.

* * * * *